US 8,201,229 B2

(12) United States Patent
Ruppert et al.

(10) Patent No.: US 8,201,229 B2
(45) Date of Patent: Jun. 12, 2012

(54) USER AUTHORIZATION SYSTEM AND METHODS

(75) Inventors: Ryan Ruppert, Reno, NV (US); Haiyang Deng, Chatham (CA)

(73) Assignee: Bally Gaming, Inc., Las Vegas, NV (US)

( * ) Notice: Subject to any disclaimer, the term of this patent is extended or adjusted under 35 U.S.C. 154(b) by 617 days.

(21) Appl. No.: 12/269,673

(22) Filed: Nov. 12, 2008

(65) Prior Publication Data

US 2009/0183243 A1   Jul. 16, 2009

Related U.S. Application Data

(63) Continuation-in-part of application No. 12/112,410, filed on Apr. 30, 2008.

(60) Provisional application No. 60/987,338, filed on Nov. 12, 2007.

(51) Int. Cl.
G06F 7/04 (2006.01)
G06F 15/16 (2006.01)
G06F 17/30 (2006.01)
H04L 29/06 (2006.01)

(52) U.S. Cl. ......................................................... 726/5
(58) Field of Classification Search .................... 726/5
See application file for complete search history.

(56) References Cited

U.S. PATENT DOCUMENTS

| 4,339,798 A | 7/1982 | Hedges et al. ................ 364/412 |
| 4,373,726 A | 2/1983 | Churchill et al. ......... 273/138 A |
| 4,592,377 A | 6/1986 | Paulsen et al. ................. 133/5 R |
| 4,725,079 A | 2/1988 | Koza et al. ........................ 283/73 |
| 4,832,341 A | 5/1989 | Muller et al. ................... 273/139 |
| 4,948,138 A | 8/1990 | Pease et al. ................ 273/138 A |
| 5,083,800 A | 1/1992 | Lockton ......................... 273/439 |
| 5,179,517 A | 1/1993 | Sarbin et al. .................. 364/410 |
| 5,199,710 A | 4/1993 | Lamle ........................ 273/149 R |
| 5,258,837 A | 11/1993 | Gormley ........................ 358/140 |
| 5,275,400 A | 1/1994 | Weingardt et al. ......... 273/85 CP |
| 5,321,241 A | 6/1994 | Craine ............................ 235/380 |
| 5,324,035 A | 6/1994 | Morris et al. .............. 273/138 A |
| 5,326,104 A | 7/1994 | Pease et al. ................ 273/138 A |
| 5,386,103 A | 1/1995 | DeBan et al. ................... 235/379 |
| 5,398,932 A | 3/1995 | Eberhardt et al. ......... 273/138 A |
| 5,472,194 A | 12/1995 | Breeding et al. .......... 273/138 A |

(Continued)

FOREIGN PATENT DOCUMENTS

DE   199 40 954 A1   3/2001

(Continued)

OTHER PUBLICATIONS

Bally Technologies, Inc., iVIEW, http://ballytech.com/systems/product.cfm?id=9, download date Nov. 6, 2007, 2 pages.

(Continued)

*Primary Examiner* — Kambiz Zand
*Assistant Examiner* — Stephen Sanders
(74) *Attorney, Agent, or Firm* — Seed IP Law Group PLLC

(57) ABSTRACT

A slot management system including a download and configuration server-based sub-system and method is disclosed for use with game devices, systems, and methods is provided to enable users to monitor, control, and modify game devices and other related activities. A computerized authorization system authorizes users access to the slot management system.

13 Claims, 35 Drawing Sheets

U.S. PATENT DOCUMENTS

| | | | |
|---|---|---|---|
| 5,493,613 A | 2/1996 | Denno et al. | 380/24 |
| 5,505,449 A | 4/1996 | Eberhardt et al. | 273/138 A |
| 5,507,489 A | 4/1996 | Reibel et al. | 273/138 A |
| 5,562,284 A | 10/1996 | Stevens | 273/139 |
| 5,580,311 A | 12/1996 | Haste, III | 463/29 |
| 5,605,334 A | 2/1997 | McCrea, Jr. | 273/309 |
| 5,605,506 A | 2/1997 | Hoorn et al. | 463/47 |
| 5,613,680 A | 3/1997 | Groves et al. | 273/138.2 |
| 5,613,912 A | 3/1997 | Slater | 463/25 |
| 5,643,086 A | 7/1997 | Alcorn et al. | 463/29 |
| 5,655,961 A | 8/1997 | Acres et al. | 463/27 |
| 5,707,287 A | 1/1998 | McCrea, Jr. | 463/27 |
| 5,737,418 A | 4/1998 | Saffari et al. | 380/9 |
| 5,741,183 A | 4/1998 | Acres et al. | 463/42 |
| 5,745,110 A | 4/1998 | Ertemalp | 345/340 |
| 5,759,102 A | 6/1998 | Pease et al. | 463/42 |
| 5,770,533 A | 6/1998 | Franchi | 463/42 |
| 5,779,545 A | 7/1998 | Berg et al. | 463/22 |
| 5,813,912 A | 9/1998 | Shultz | 463/25 |
| 5,823,879 A | 10/1998 | Goldberg et al. | 463/42 |
| 5,830,067 A | 11/1998 | Graves et al. | 463/40 |
| 5,830,068 A | 11/1998 | Brenner et al. | 463/42 |
| 5,850,447 A | 12/1998 | Peyret | 380/25 |
| 5,851,149 A | 12/1998 | Xidos et al. | 463/42 |
| 5,890,963 A | 4/1999 | Yen | 463/42 |
| 5,911,626 A | 6/1999 | McCrea, Jr. | 463/27 |
| 5,957,776 A | 9/1999 | Hoehne | 463/25 |
| 5,971,851 A | 10/1999 | Pascal et al. | 463/24 |
| 5,999,808 A | 12/1999 | LaDue | 455/412 |
| 6,001,016 A | 12/1999 | Walker et al. | 463/42 |
| 6,042,150 A | 3/2000 | Daley | 283/86 |
| 6,068,553 A | 5/2000 | Parker | 463/27 |
| 6,077,161 A | 6/2000 | Wisler | 463/11 |
| 6,080,063 A | 6/2000 | Khosla | 463/42 |
| 6,089,980 A | 7/2000 | Gauselmann | 463/27 |
| 6,093,103 A | 7/2000 | McCrea, Jr. | 463/27 |
| 6,102,799 A | 8/2000 | Stupak | 463/27 |
| 6,104,815 A | 8/2000 | Alcorn et al. | 380/251 |
| 6,106,396 A | 8/2000 | Alcorn et al. | 463/29 |
| 6,110,041 A | 8/2000 | Walker et al. | 463/20 |
| 6,110,043 A | 8/2000 | Olsen | 463/27 |
| 6,117,012 A | 9/2000 | McCrea, Jr. | 463/27 |
| 6,135,887 A | 10/2000 | Pease et al. | 463/42 |
| 6,146,273 A | 11/2000 | Olsen | 463/27 |
| 6,149,522 A | 11/2000 | Alcorn et al. | 463/29 |
| 6,152,824 A | 11/2000 | Rothschild et al. | 463/42 |
| 6,165,069 A | 12/2000 | Sines et al. | 463/12 |
| 6,166,763 A | 12/2000 | Rhodes et al. | 348/143 |
| 6,168,523 B1 | 1/2001 | Piechowiak et al. | 463/26 |
| 6,183,366 B1 | 2/2001 | Goldberg et al. | 463/42 |
| 6,186,892 B1 | 2/2001 | Frank et al. | 463/19 |
| 6,210,277 B1 | 4/2001 | Stefan | 463/27 |
| 6,217,447 B1 | 4/2001 | Lofink et al. | 463/12 |
| 6,219,836 B1 | 4/2001 | Wells et al. | 717/11 |
| 6,234,898 B1 | 5/2001 | Belamant et al. | 463/25 |
| 6,244,958 B1 | 6/2001 | Acres | 463/26 |
| 6,251,014 B1 | 6/2001 | Stockdale et al. | 463/16 |
| 6,254,484 B1 | 7/2001 | McCrea, Jr. | 463/27 |
| 6,264,561 B1 | 7/2001 | Saffari et al. | 463/42 |
| 6,275,586 B1 | 8/2001 | Kelly | 380/46 |
| 6,287,202 B1 | 9/2001 | Pascal et al. | 463/42 |
| 6,346,044 B1 | 2/2002 | McCrea, Jr. | 463/27 |
| 6,383,076 B1 | 5/2002 | Tiedeken | 463/40 |
| 6,394,900 B1 | 5/2002 | McGlone et al. | 463/20 |
| 6,400,272 B1 | 6/2002 | Holtzman et al. | 340/572.1 |
| 6,409,602 B1 | 6/2002 | Wiltshire et al. | 463/42 |
| 6,439,996 B2 | 8/2002 | LeMay et al. | 463/29 |
| 6,443,839 B2 | 9/2002 | Stockdale et al. | 463/16 |
| 6,460,848 B1 | 10/2002 | Soltys et al. | 273/149 R |
| 6,464,584 B2 | 10/2002 | Oliver | 463/25 |
| 6,488,581 B1 | 12/2002 | Stockdale | 463/29 |
| 6,488,585 B1 | 12/2002 | Wells et al. | 463/43 |
| 6,503,147 B1 | 1/2003 | Stockdale et al. | 463/29 |
| 6,505,772 B1 | 1/2003 | Mollett et al. | 235/379 |
| 6,508,709 B1 | 1/2003 | Karmarkar | 463/42 |
| 6,508,710 B1 | 1/2003 | Paravia et al. | 463/42 |
| 6,517,435 B2 | 2/2003 | Soltys et al. | 463/25 |
| 6,517,436 B2 | 2/2003 | Soltys et al. | 463/29 |
| 6,520,857 B2 | 2/2003 | Soltys et al. | 463/29 |
| 6,527,271 B2 | 3/2003 | Soltys et al. | 273/148 R |
| 6,527,638 B1 | 3/2003 | Walker et al. | 463/25 |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,575,833 B1 | 6/2003 | Stockdale | 463/29 |
| 6,578,847 B1 | 6/2003 | Hedrick et al. | 273/138.2 |
| 6,579,180 B2 | 6/2003 | Soltys et al. | 463/25 |
| 6,579,181 B2 | 6/2003 | Soltys et al. | 463/25 |
| 6,581,747 B1 | 6/2003 | Charlier et al. | 194/214 |
| 6,595,857 B2 | 7/2003 | Soltys et al. | 463/29 |
| 6,607,441 B1 | 8/2003 | Acres | 463/25 |
| 6,609,978 B1 | 8/2003 | Paulsen | 463/42 |
| 6,612,928 B1 | 9/2003 | Bradford et al. | 463/29 |
| 6,629,184 B1 | 9/2003 | Berg et al. | 710/306 |
| 6,638,170 B1 | 10/2003 | Crumby | 463/42 |
| 6,641,484 B2 | 11/2003 | Oles et al. | 463/47 |
| 6,645,077 B2 | 11/2003 | Rowe | 463/42 |
| 6,652,378 B2 | 11/2003 | Cannon et al. | 463/20 |
| 6,656,048 B2 | 12/2003 | Olsen | 463/25 |
| 6,663,490 B2 | 12/2003 | Soltys et al. | 463/25 |
| 6,675,152 B1 | 1/2004 | Prasad et al. | 705/64 |
| 6,676,522 B2 | 1/2004 | Rowe et al. | 463/42 |
| 6,682,421 B1 | 1/2004 | Rowe et al. | 463/25 |
| 6,682,423 B2 | 1/2004 | Brosnan et al. | 463/29 |
| 6,685,567 B2 | 2/2004 | Cockerille et al. | 463/43 |
| 6,688,979 B2 | 2/2004 | Soltys et al. | 463/25 |
| 6,699,128 B1 | 3/2004 | Beadell et al. | 463/46 |
| 6,712,695 B2 | 3/2004 | Mothwurf et al. | 463/25 |
| 6,712,696 B2 | 3/2004 | Soltys et al. | 463/25 |
| 6,718,361 B1 | 4/2004 | Basani et al. | 709/201 |
| 6,728,740 B2 | 4/2004 | Kelly et al. | 708/250 |
| 6,743,102 B1 | 6/2004 | Fiechter et al. | 463/42 |
| 6,746,330 B2 | 6/2004 | Cannon | 463/25 |
| 6,752,312 B1 | 6/2004 | Chamberlain et al. | 235/375 |
| 6,755,741 B1 | 6/2004 | Rafaeli | 463/25 |
| 6,758,751 B2 | 7/2004 | Soltys et al. | 463/29 |
| 6,800,029 B2 | 10/2004 | Rowe et al. | 463/25 |
| 6,811,488 B2 | 11/2004 | Paravia et al. | 463/42 |
| 6,817,948 B2 | 11/2004 | Pascal et al. | 463/42 |
| 6,823,419 B2 | 11/2004 | Berg et al. | 710/306 |
| 6,837,789 B2 | 1/2005 | Garahi et al. | 463/29 |
| 6,846,238 B2 | 1/2005 | Wells | 463/39 |
| 6,848,994 B1 | 2/2005 | Knust et al. | 463/25 |
| 6,866,581 B2 | 3/2005 | Martinek et al. | 463/16 |
| 6,866,586 B2 | 3/2005 | Oberberger et al. | 463/42 |
| 6,884,173 B2 | 4/2005 | Gauselmann | 463/42 |
| 6,884,174 B2 | 4/2005 | Lundy et al. | 463/42 |
| 6,896,618 B2 | 5/2005 | Benoy et al. | 463/25 |
| 6,899,627 B2 | 5/2005 | Lam et al. | 463/40 |
| 6,905,411 B2 | 6/2005 | Nguyen et al. | 463/25 |
| 6,908,387 B2 | 6/2005 | Hedrick et al. | 463/31 |
| 6,962,530 B2 | 11/2005 | Jackson | 463/29 |
| 6,971,956 B2 | 12/2005 | Rowe et al. | 463/25 |
| 6,993,587 B1 | 1/2006 | Basani et al. | 709/229 |
| 6,997,803 B2 | 2/2006 | LeMay et al. | 463/20 |
| 7,025,674 B2 | 4/2006 | Adams et al. | 463/1 |
| 7,035,626 B1 | 4/2006 | Luciano, Jr. | 455/414.1 |
| 7,050,056 B2 | 5/2006 | Meyringer | 345/440 |
| 7,062,470 B2 | 6/2006 | Prasad et al. | 705/64 |
| 7,086,947 B2 | 8/2006 | Walker et al. | 463/25 |
| 7,099,035 B2 | 8/2006 | Brooks et al. | 358/1.15 |
| 7,112,138 B2 | 9/2006 | Hedrick et al. | 463/29 |
| 7,114,718 B2 | 10/2006 | Grauzer et al. | 273/149 R |
| 7,116,782 B2 | 10/2006 | Jackson et al. | 380/251 |
| 7,168,089 B2 | 1/2007 | Nguyen et al. | 726/4 |
| 7,179,170 B2 | 2/2007 | Martinek et al. | 463/29 |
| 7,186,181 B2 | 3/2007 | Rowe | 463/42 |
| 7,197,765 B2 | 3/2007 | Chan et al. | 726/8 |
| 7,198,571 B2 | 4/2007 | LeMay et al. | 463/25 |
| RE39,644 E | 5/2007 | Alcorn et al. | 380/251 |
| 7,291,068 B2 | 11/2007 | Bryant et al. | 463/25 |
| 7,309,065 B2 | 12/2007 | Yoseloff et al. | 273/292 |
| 7,311,605 B2 | 12/2007 | Moser | 463/25 |
| 7,329,185 B2 | 2/2008 | Conover et al. | 463/25 |
| 7,330,822 B1 | 2/2008 | Robson et al. | 705/9 |
| 7,331,520 B2 | 2/2008 | Silva et al. | 235/381 |

| Patent/Pub No. | Date | Inventor | Class |
|---|---|---|---|
| 7,346,682 B2 | 3/2008 | Basani et al. | 709/224 |
| 7,349,920 B1 | 3/2008 | Feinberg et al. | 707/102 |
| 7,351,147 B2 | 4/2008 | Stockdale et al. | 463/29 |
| 7,356,770 B1 | 4/2008 | Jackson | 715/736 |
| 7,363,342 B1 | 4/2008 | Wang et al. | 709/204 |
| 7,364,510 B2 | 4/2008 | Walker et al. | 463/42 |
| 7,370,282 B2 | 5/2008 | Cary | 715/772 |
| 7,384,339 B2 | 6/2008 | LeMay et al. | 463/30 |
| 7,398,327 B2 | 7/2008 | Lee | 709/250 |
| 7,419,428 B2 | 9/2008 | Rowe | 463/25 |
| 7,427,236 B2 | 9/2008 | Kaminkow et al. | 463/26 |
| 7,434,805 B2 | 10/2008 | Grauzer et al. | 273/149 R |
| 7,435,179 B1 | 10/2008 | Ford | 463/42 |
| 7,438,643 B2 | 10/2008 | Brosnan et al. | 463/42 |
| 7,455,591 B2 | 11/2008 | Nguyen | 463/42 |
| 7,460,863 B2 | 12/2008 | Steelberg et al. | 455/419 |
| 7,465,231 B2 | 12/2008 | Lewin et al. | 463/37 |
| 7,483,394 B2 | 1/2009 | Chang et al. | 370/254 |
| 7,500,915 B2 | 3/2009 | Wolf et al. | 463/27 |
| 7,510,474 B2 | 3/2009 | Carter, Sr. | 463/29 |
| 7,515,718 B2 | 4/2009 | Nguyen et al. | 380/278 |
| 7,534,169 B2 | 5/2009 | Amaitis et al. | 463/39 |
| 7,549,576 B2 | 6/2009 | Alderucci et al. | 235/380 |
| 7,559,080 B2 | 7/2009 | Bhargavan et al. | 726/1 |
| 7,575,234 B2 | 8/2009 | Soltys | 273/149 R |
| 7,577,847 B2 | 8/2009 | Nguyen et al. | 713/186 |
| 7,585,217 B2 | 9/2009 | Lutnick et al. | 463/16 |
| 7,611,407 B1 | 11/2009 | Itkis et al. | 463/29 |
| 7,611,409 B2 | 11/2009 | Muir et al. | 463/29 |
| 7,634,550 B2 | 12/2009 | Wolber et al. | 709/220 |
| 7,637,810 B2 | 12/2009 | Amaitis et al. | 463/25 |
| 7,644,861 B2 | 1/2010 | Alderucci et al. | 235/382 |
| 7,648,414 B2 | 1/2010 | McNutt et al. | 463/25 |
| 7,684,874 B2 | 3/2010 | Schlottmann et al. | 700/9 |
| 7,690,995 B2 | 4/2010 | Frankulin et al. | 463/41 |
| 7,699,697 B2 | 4/2010 | Darrah et al. | 463/16 |
| 7,699,703 B2 | 4/2010 | Muir et al. | 463/29 |
| 7,730,198 B2 | 6/2010 | Ruppert et al. | 709/230 |
| 7,747,741 B2 | 6/2010 | Basani et al. | 709/224 |
| 7,762,888 B2 | 7/2010 | Rowe | 463/29 |
| 7,769,877 B2 | 8/2010 | McBride et al. | 709/230 |
| 7,778,635 B2 | 8/2010 | Crookham et al. | 455/426.1 |
| 7,780,526 B2 | 8/2010 | Nguyen et al. | 463/29 |
| 7,841,946 B2 | 11/2010 | Walker et al. | 463/42 |
| 7,846,020 B2 | 12/2010 | Walker et al. | 463/29 |
| 7,850,528 B2 | 12/2010 | Wells | 463/42 |
| 7,862,425 B2 | 1/2011 | Cavagna | 463/25 |
| 7,867,081 B2 | 1/2011 | Schneider et al. | 463/25 |
| 7,874,921 B2 | 1/2011 | Baszucki et al. | 463/43 |
| 7,898,679 B2 | 3/2011 | Brack et al. | 358/1.15 |
| 7,901,294 B2 | 3/2011 | Walker et al. | 463/42 |
| 7,937,464 B2 | 5/2011 | Ruppert et al. | 709/224 |
| 2001/0019966 A1 | 9/2001 | Idaka | 463/40 |
| 2002/0111213 A1 | 8/2002 | McEntee et al. | 463/42 |
| 2002/0113371 A1 | 8/2002 | Snow | 273/292 |
| 2002/0115487 A1 | 8/2002 | Wells | 463/42 |
| 2002/0142825 A1 | 10/2002 | Lark et al. | 463/16 |
| 2002/0173354 A1 | 11/2002 | Winans et al. | 463/20 |
| 2003/0004871 A1 | 1/2003 | Rowe | 705/39 |
| 2003/0006554 A1 | 1/2003 | Grebler et al. | 273/290 |
| 2003/0022714 A1 | 1/2003 | Oliver | 463/25 |
| 2003/0028480 A1 | 2/2003 | Rowe | 705/39 |
| 2003/0032474 A1 | 2/2003 | Kaminkow | 463/25 |
| 2003/0042679 A1 | 3/2003 | Snow | 273/292 |
| 2003/0045354 A1 | 3/2003 | Giobbi | 463/40 |
| 2003/0064798 A1 | 4/2003 | Grauzer et al. | 463/29 |
| 2003/0075869 A1 | 4/2003 | Breeding et al. | 273/292 |
| 2003/0078103 A1 | 4/2003 | LeMay et al. | 463/43 |
| 2003/0078789 A1 | 4/2003 | Oren | 705/1 |
| 2003/0090064 A1 | 5/2003 | Hoyt et al. | 273/292 |
| 2003/0104865 A1 | 6/2003 | Itkis et al. | 463/39 |
| 2003/0130024 A1 | 7/2003 | Darby | 463/13 |
| 2003/0137968 A1 | 7/2003 | Lareau et al. | 370/349 |
| 2003/0203755 A1 | 10/2003 | Jackson | 463/42 |
| 2003/0206548 A1 | 11/2003 | Bannai et al. | 370/389 |
| 2003/0224858 A1 | 12/2003 | Yoseloff et al. | 463/43 |
| 2003/0228912 A1 | 12/2003 | Wells et al. | 463/43 |
| 2003/0232651 A1 | 12/2003 | Huard | 463/42 |
| 2004/0002388 A1 | 1/2004 | Larsen et al. | 463/43 |
| 2004/0029635 A1 | 2/2004 | Giobbi | 463/30 |
| 2004/0043815 A1 | 3/2004 | Kaminkow | 463/25 |
| 2004/0043820 A1 | 3/2004 | Schlottmann | 463/43 |
| 2004/0048671 A1 | 3/2004 | Rowe | 463/42 |
| 2004/0068654 A1 | 4/2004 | Cockerille et al. | 713/168 |
| 2004/0082385 A1 | 4/2004 | Silva et al. | 463/40 |
| 2004/0092310 A1 | 5/2004 | Brosnan et al. | 463/42 |
| 2004/0106452 A1 | 6/2004 | Nguyen et al. | 463/42 |
| 2004/0110119 A1 | 6/2004 | Riconda et al. | 434/350 |
| 2004/0127291 A1 | 7/2004 | George et al. | 463/42 |
| 2004/0133485 A1 | 7/2004 | Schoonmaker et al. | 705/30 |
| 2004/0142744 A1 | 7/2004 | Atkinson et al. | 463/29 |
| 2004/0166918 A1 | 8/2004 | Walker et al. | 463/16 |
| 2004/0166940 A1* | 8/2004 | Rothschild | 463/42 |
| 2004/0185936 A1 | 9/2004 | Block et al. | 463/42 |
| 2004/0254010 A1 | 12/2004 | Fine | 463/25 |
| 2005/0043094 A1 | 2/2005 | Nguyen et al. | 463/42 |
| 2005/0054438 A1 | 3/2005 | Rothschild et al. | 463/29 |
| 2005/0054445 A1 | 3/2005 | Gatto et al. | 463/42 |
| 2005/0055113 A1 | 3/2005 | Gauselmann | 700/91 |
| 2005/0070358 A1 | 3/2005 | Angell et al. | 463/39 |
| 2005/0119052 A1 | 6/2005 | Russell et al. | 463/42 |
| 2005/0143166 A1 | 6/2005 | Walker et al. | 463/25 |
| 2005/0153778 A1 | 7/2005 | Nelson et al. | 463/42 |
| 2005/0181856 A1 | 8/2005 | Cannon et al. | 463/16 |
| 2005/0181864 A1 | 8/2005 | Britt et al. | 463/25 |
| 2005/0221882 A1 | 10/2005 | Nguyen et al. | 463/16 |
| 2005/0222891 A1 | 10/2005 | Chan et al. | 705/9 |
| 2005/0239542 A1 | 10/2005 | Olsen | 463/27 |
| 2005/0282626 A1 | 12/2005 | Manfredi et al. | 463/25 |
| 2006/0004618 A1 | 1/2006 | Brixius | 705/8 |
| 2006/0009282 A1 | 1/2006 | George et al. | 463/29 |
| 2006/0015716 A1* | 1/2006 | Thornton et al. | 713/155 |
| 2006/0026699 A1 | 2/2006 | Weddle | 715/503 |
| 2006/0035707 A1 | 2/2006 | Nguyen et al. | 463/29 |
| 2006/0046849 A1 | 3/2006 | Kovacs | 463/39 |
| 2006/0066444 A1 | 3/2006 | Steeves | 340/10.5 |
| 2006/0079310 A1 | 4/2006 | Friedman et al. | 463/16 |
| 2006/0116208 A1 | 6/2006 | Chen et al. | 463/43 |
| 2006/0121970 A1 | 6/2006 | Khal | 463/16 |
| 2006/0183541 A1 | 8/2006 | Okada et al. | 463/29 |
| 2006/0195847 A1 | 8/2006 | Amano et al. | 718/103 |
| 2006/0205508 A1 | 9/2006 | Green | 463/40 |
| 2006/0217185 A1 | 9/2006 | Cavagna | 463/25 |
| 2006/0247013 A1 | 11/2006 | Walker et al. | 463/20 |
| 2006/0247057 A1 | 11/2006 | Green et al. | 463/42 |
| 2006/0248161 A1 | 11/2006 | O'Brien et al. | 709/217 |
| 2006/0277491 A1 | 12/2006 | Poulsen et al. | 715/772 |
| 2006/0281556 A1 | 12/2006 | Solomon et al. | 463/43 |
| 2006/0287077 A1 | 12/2006 | Grav et al. | 463/27 |
| 2007/0006329 A1 | 1/2007 | Morrow et al. | 726/34 |
| 2007/0015583 A1 | 1/2007 | Tran | 463/40 |
| 2007/0033247 A1 | 2/2007 | Martin | 709/201 |
| 2007/0054740 A1 | 3/2007 | Salls et al. | 463/42 |
| 2007/0057453 A1 | 3/2007 | Soltys et al. | 273/149 P |
| 2007/0057454 A1 | 3/2007 | Fleckenstein | 273/149 R |
| 2007/0057469 A1 | 3/2007 | Grauzer et al. | 273/309 |
| 2007/0060259 A1 | 3/2007 | Pececnik | 463/16 |
| 2007/0060307 A1 | 3/2007 | Mathis et al. | 463/25 |
| 2007/0060365 A1 | 3/2007 | Tien et al. | 463/42 |
| 2007/0077990 A1 | 4/2007 | Cuddy et al. | 463/25 |
| 2007/0077995 A1 | 4/2007 | Oak et al. | 463/42 |
| 2007/0082737 A1 | 4/2007 | Morrow et al. | 463/42 |
| 2007/0093298 A1 | 4/2007 | Brunet | 463/42 |
| 2007/0105628 A1 | 5/2007 | Arbogast et al. | 463/42 |
| 2007/0111775 A1 | 5/2007 | Yoseloff | 463/16 |
| 2007/0111791 A1 | 5/2007 | Arbogast et al. | 463/40 |
| 2007/0111794 A1 | 5/2007 | Hogan et al. | 463/42 |
| 2007/0117608 A1 | 5/2007 | Roper et al. | 463/16 |
| 2007/0124483 A1 | 5/2007 | Marples et al. | 709/228 |
| 2007/0150329 A1 | 6/2007 | Brook et al. | 705/8 |
| 2007/0167235 A1 | 7/2007 | Naicker | 463/42 |
| 2007/0191102 A1 | 8/2007 | Coliz et al. | 463/42 |
| 2007/0192748 A1 | 8/2007 | Martin et al. | 715/856 |
| 2007/0198418 A1 | 8/2007 | MacDonald et al. | 705/52 |
| 2007/0208816 A1 | 9/2007 | Baldwin et al. | 709/206 |
| 2007/0218998 A1 | 9/2007 | Arbogast et al. | 463/42 |
| 2007/0235521 A1 | 10/2007 | Mateen et al. | 235/379 |
| 2007/0241497 A1 | 10/2007 | Soltys et al. | 273/149 R |

| | | | |
|---|---|---|---|
| 2007/0241498 A1 | 10/2007 | Soltys | 273/149 R |
| 2007/0243925 A1 | 10/2007 | LeMay et al. | 463/20 |
| 2007/0243927 A1 | 10/2007 | Soltys | 463/25 |
| 2007/0243935 A1 | 10/2007 | Huizinga | 463/42 |
| 2007/0259709 A1 | 11/2007 | Kelly et al. | 463/20 |
| 2007/0259711 A1 | 11/2007 | Thomas | 463/22 |
| 2007/0287535 A1 | 12/2007 | Soltys | 463/29 |
| 2007/0298868 A1 | 12/2007 | Soltys | 463/25 |
| 2008/0004108 A1 | 1/2008 | Klinkhammer | 463/29 |
| 2008/0026832 A1 | 1/2008 | Stevens et al. | 463/26 |
| 2008/0026848 A1 | 1/2008 | Byng | 463/42 |
| 2008/0038035 A1 | 2/2008 | Shuldman et al. | 400/76 |
| 2008/0045341 A1 | 2/2008 | Englman | 463/42 |
| 2008/0045344 A1 | 2/2008 | Schlottmann et al. | 463/25 |
| 2008/0064501 A1 | 3/2008 | Patel | 463/40 |
| 2008/0076572 A1 | 3/2008 | Nguyen et al. | 463/42 |
| 2008/0090651 A1 | 4/2008 | Baerlocher | 463/27 |
| 2008/0096659 A1 | 4/2008 | Kreloff et al. | 463/39 |
| 2008/0108433 A1 | 5/2008 | DiMichele et al. | 463/40 |
| 2008/0113764 A1 | 5/2008 | Soltys | 463/22 |
| 2008/0113773 A1 | 5/2008 | Johnson et al. | 463/25 |
| 2008/0119284 A1 | 5/2008 | Luciano, Jr. et al. | 463/42 |
| 2008/0146337 A1 | 6/2008 | Halonen et al. | 463/42 |
| 2008/0153599 A1 | 6/2008 | Atashband et al. | 463/42 |
| 2008/0153600 A1 | 6/2008 | Swarna | 463/43 |
| 2008/0154916 A1 | 6/2008 | Atashband | 707/10 |
| 2008/0155665 A1 | 6/2008 | Ruppert et al. | 726/5 |
| 2008/0162729 A1 | 7/2008 | Ruppert | 709/249 |
| 2008/0171588 A1 | 7/2008 | Atashband | 463/20 |
| 2008/0171598 A1 | 7/2008 | Deng | 463/40 |
| 2008/0200255 A1 | 8/2008 | Eisele | 463/42 |
| 2008/0243697 A1 | 10/2008 | Irving et al. | 705/54 |
| 2008/0261701 A1 | 10/2008 | Lewin et al. | 463/43 |
| 2008/0287197 A1 | 11/2008 | Ruppert et al. | 463/42 |
| 2008/0293494 A1 | 11/2008 | Adiraju et al. | 463/42 |
| 2008/0311971 A1 | 12/2008 | Dean | 463/20 |
| 2008/0318685 A9 | 12/2008 | Oak et al. | 463/42 |
| 2009/0005176 A1 | 1/2009 | Morrow et al. | 463/43 |
| 2009/0011833 A1 | 1/2009 | Seelig et al. | 463/42 |
| 2009/0029775 A1 | 1/2009 | Ruppert et al. | 463/42 |
| 2009/0031008 A1 | 1/2009 | Elliott et al. | 709/220 |
| 2009/0115133 A1 | 5/2009 | Kelly et al. | 273/274 |
| 2009/0117994 A1 | 5/2009 | Kelly et al. | 463/25 |
| 2009/0118001 A1 | 5/2009 | Kelly et al. | 463/29 |
| 2009/0118005 A1 | 5/2009 | Kelly et al. | 463/31 |
| 2009/0118006 A1 | 5/2009 | Kelly et al. | 463/31 |
| 2009/0124392 A1 | 5/2009 | Ruppert et al. | 463/42 |
| 2009/0124394 A1 | 5/2009 | Swarna | 463/43 |
| 2009/0125603 A1 | 5/2009 | Atashband et al. | 709/207 |
| 2009/0131144 A1 | 5/2009 | Allen | 463/20 |
| 2009/0131163 A1 | 5/2009 | Arbogast et al. | 463/29 |
| 2009/0132720 A1 | 5/2009 | Ruppert et al. | 709/231 |
| 2009/0170594 A1 | 7/2009 | Delaney et al. | 463/25 |
| 2009/0176556 A1 | 7/2009 | Gagner et al. | 463/25 |
| 2009/0176580 A1 | 7/2009 | Herrmann et al. | 463/43 |
| 2009/0181776 A1 | 7/2009 | Deng | 463/42 |
| 2009/0253483 A1 | 10/2009 | Pacey et al. | 463/25 |
| 2009/0270170 A1 | 10/2009 | Patton | 463/36 |
| 2009/0275394 A1 | 11/2009 | Young et al. | 463/25 |
| 2009/0275400 A1 | 11/2009 | Rehm et al. | 463/27 |
| 2009/0275401 A1 | 11/2009 | Allen et al. | 463/29 |
| 2009/0275402 A1 | 11/2009 | Backover et al. | 463/29 |
| 2009/0276341 A1 | 11/2009 | McMahan et al. | 705/30 |
| 2009/0298583 A1 | 12/2009 | Jones | 463/29 |
| 2009/0307069 A1 | 12/2009 | Meyerhofer | 705/14.12 |
| 2010/0016067 A1 | 1/2010 | White et al. | 463/25 |
| 2010/0016068 A1 | 1/2010 | White et al. | 463/25 |
| 2010/0029385 A1 | 2/2010 | Garvey et al. | 463/35 |
| 2010/0048291 A1 | 2/2010 | Warkentin | 463/25 |
| 2010/0130280 A1 | 5/2010 | Arezina et al. | 463/20 |
| 2010/0151926 A1 | 6/2010 | Ruppert et al. | 463/1 |
| 2010/0161798 A1 | 6/2010 | Ruppert et al. | 709/225 |
| 2010/0248842 A1 | 9/2010 | Ruppert | 463/42 |
| 2011/0009184 A1 | 1/2011 | Byng | 463/20 |
| 2011/0124417 A1 | 5/2011 | Baynes et al. | 463/43 |

FOREIGN PATENT DOCUMENTS

| | | |
|---|---|---|
| EP | 1 074 955 A2 | 2/2001 |
| GB | 2 380 143 A | 4/2003 |
| JP | 8255059 | 10/1996 |
| KR | 2001-0084838 | 9/2001 |
| KR | 2002-0061793 | 7/2002 |
| KR | 2003-0091635 | 12/2003 |
| WO | 02/05914 A1 | 1/2002 |
| WO | 03/060846 A2 | 7/2003 |
| WO | 2005/035084 | 4/2005 |
| WO | 2007/033207 A2 | 3/2007 |

OTHER PUBLICATIONS

Bally TMS, "MP21—Automated Table Tracking/Features," 2 pages, Nov. 2005.

Bally TMS, "MPBacc—Specifications/Specifications," 2 pages, Nov. 2005.

Bally TMS, "MPLite—Table Management System/Features," 2 pages, Nov. 2005.

Bulaysky, J., "Tracking the Tables," *Casino Journal*, May 2004, pp. 44-47, accessed Dec. 21, 2005, URL = http://www.ascendgaming.com/cj/vendors_manufacturers_table/Trackin916200411141AM.htm, 5 pages.

Burke, A., "Tracking the Tables," reprinted from *International Gaming & Wagering Business*, Aug. 2003, 4 pages.

Gros, R., "All You Ever Wanted to Know About Table Games," reprinted from *Global Gaming Business*, Aug. 1, 2003, 2 pages.

MagTek, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Terdiman, D., "Who's Holding the Aces Now?", reprinted from *Wired News*, Aug. 18, 2003, 2 pages.

Singh et al., U.S. Appl. No. 12/271,337, filed Nov. 14, 2008, 35 pages.

Crowder, U.S. Appl. No. 12/271,736, filed Nov. 14, 2008, 35 pages.

Rajaraman et al., U.S. Appl. No. 12/500,298, filed Jul. 9, 2009, 50 pages.

Atashband et al., U.S. Appl. No. 12/620,402, filed Nov. 16, 2009, 46 pages.

Ruppert et al., U.S. Appl. No. 12/620,404, filed Nov. 16, 2009, 70 pages.

Winkler, C., "Product Spotlight: MindPlay," reprinted from *Gaming and Leisure Technology*, Fall 2003, 2 pages.

Office Action dated Aug. 18, 2010 relating to U.S. Appl. No. 12/112,410, 31 pages.

Amendment dated Nov. 18, 2010 relating to U.S. Appl. No. 12/112,410, 12 pages.

Final Office Action dated Jan. 7, 2011 relating to U.S. Appl. No. 12/112,410, 19 pages.

Amendment after Final dated Mar. 3, 2011 relating to U.S. Appl. No. 12/112,410, 12 pages.

Advisory Action dated Apr. 5, 2011 relating to U.S. Appl. No. 12/112,410, 4 pages.

Amendment dated Jun. 1, 2011 relating to U.S. Appl. No. 12/112,410, 8 pages.

International Search Report and Written Opinion dated Dec. 14, 2009 relating to International Patent Application No. PCT/US2009/042155, 7 pages.

\* cited by examiner illustrates a single assignment on a Scheduler Panel
presenting a graphical display of Download and
Configuration jobs scheduled in a gaming system
in accordance with one or more embodiments.

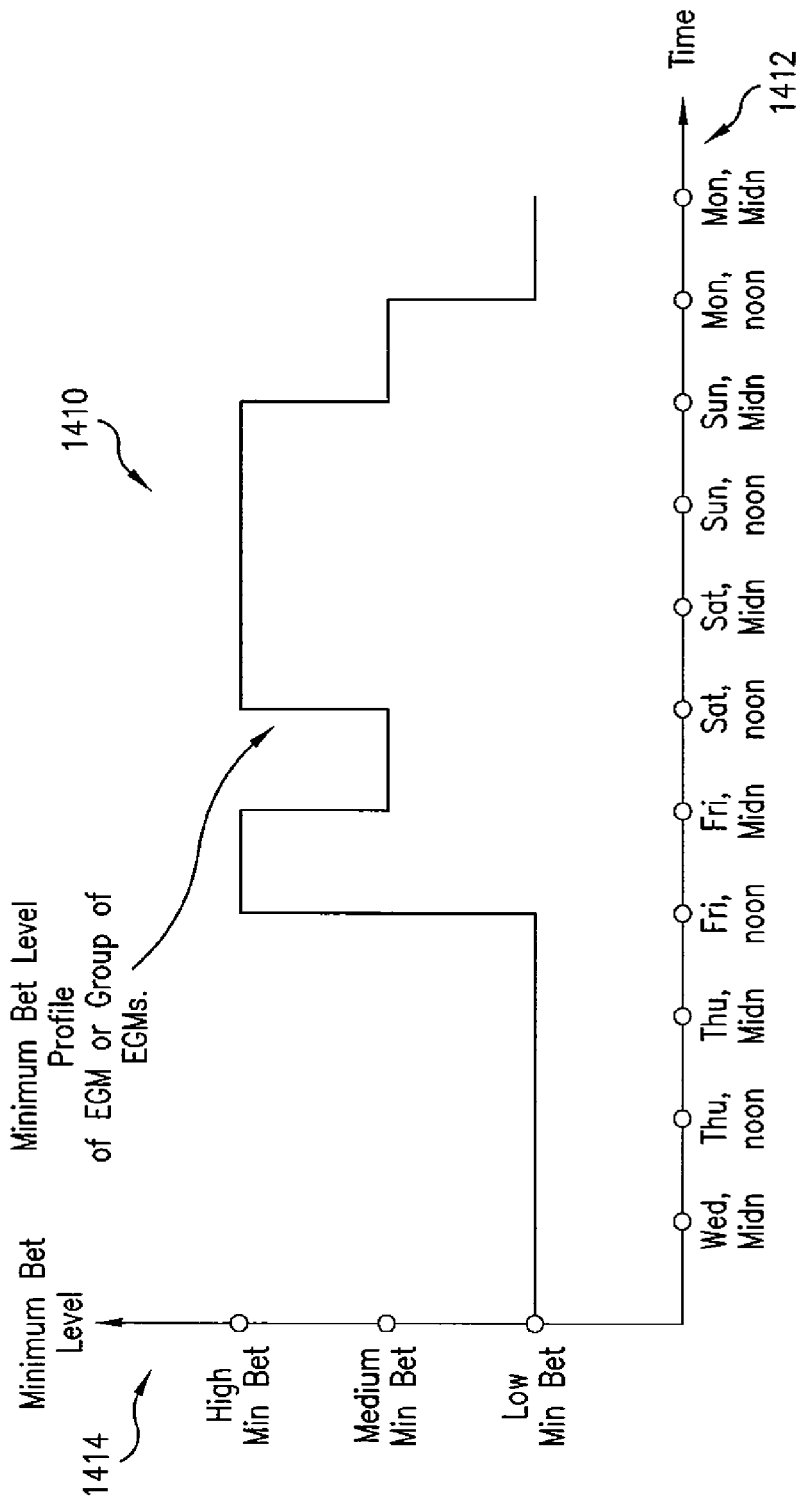
FIG. 14B illustrates a time versus minimum bet profile that may be generated from a gaming machine in accordance with one or more embodiments.

illustrates a Graphical User Interface (GUI) display panel is shown where the user gives the assignment a name using an Assignment template.

2100a — Fast Reel Speed

Identification
Use this tab to name the assignment so you can refer to it later. Enter any description you like. Version is incremented automatically with each save.

Name: Fast Reel Speed
Description: Set the reel speed fast

Permitted Actions:
☑ Validate Compatibility
☑ Apply Configuration Changes 2102
2114 — Version
2104

Add as Favorite

Save — 2106
< Back — 2108
Next > — 2110
Cancel — 2112

FIG. 21

Illustrates a GUI display panel with the final step which is to review the completed and applied assignment. 2100e

Final Review
Review the assignment. Shows a summary of what will be affected and how. Unless the assignment is approved and scheduled, no changes will be applied to any EGMs.

Status (Only approved changes may take effect on EGMs)
○ Draft  ⦿ Submitted for Approval  ○ Approved — 2134

Summary of Effects

Fast Reel Speed [27]
- Version: 1
- Type: Config
- State: Draft
- Description: Set the reel speed fast Workflow
- Create Date: 11/1/2007 2:35:12 PM
- Update by: testing
- on: 11/6/2007 3:58:07 PM
- Approved by: n/a
- on: n/a

[Add as Favorite]  [Save] 2106  [< Back] 2108  [Finish] 2136  [Cancel] 2112

FIG. 25 illustrates a networked gaming system including a DCM engine including a User Authorization Web Service.

USER AUTHORIZATION SYSTEM AND METHODS

CROSS-REFERENCE TO RELATED APPLICATIONS

This application claims benefit under 35 U.S.C. 119(e) from U.S. provisional patent application Ser. No. 60/987,338, filed on Nov. 12, 2007, which is incorporated herein by reference in its entirety. This application is a continuation-in-part of U.S. patent application Ser. No. 12/112,410, filed on Apr. 30, 2008 which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention pertains generally to management systems and methods. More particularly, the present invention relates to a computerized method and system for authorizing user access.

2. Description of the Related Art

Various networked gaming systems have been developed over the years beginning at least in the 1980's. With acceptance and utilization, users such as casino operators have found it desirable to increase the computer management of their facilities and expand features available on networked gaming systems. For instance, there are various areas in the management of casinos that is very labor intensive, such as reconfiguring gaming machines, changing games on the gaming machines, and performing cash transactions for customers.

BRIEF SUMMARY OF THE INVENTION

In accordance with one or more aspects of the invention, a computerized download and configuration management server-based system and method for use with game devices, systems, and methods is provided to enable users to monitor, control, and modify game devices and other related activities.

An authorization system to selectively provide user access to a download and configuration system in a casino may be summarized as including a plurality of gaming machines coupled to a first communications network in a casino; a download and configuration system, communicatively coupled to the first communications network and to a second communications network, that provides content that modifies a respective gaming machine of the plurality of gaming machines, wherein the respective gaming machine receives content from the download and configuration system; a plurality of control devices communicatively coupled to the second communications network; a security store that stores a plurality of security credentials and a plurality of user access lists, each respective security credential associated with a respective user account, and each user access list associated with a respective user account, the security store configured to provide a respective security response in response to receiving a respective security query, wherein for a valid security query, the security response includes at least one of a respective credential or a respective user access list, wherein a respective security credential provides authorization for the user account associated therewith to logon to the download and configuration system, and wherein a respective access list grants the user account associated therewith an amount of authorization to access at least a portion of the download and configuration system; a user-authorization system communicatively coupled to the download and configuration system, the security store and the plurality of control devices, user-authorization system configured provide a respective security query to the secure store in response to receiving, from a respective control device, a logon request for a respective user account and configured to selectively grant or deny the respective user account access to the download and configuration system in response to a respective security response from the security store. The security store may be accessible only through the user-authorization system. A given user may use a given control device of the plurality of control devices to send a given logon request for a given user account to the user-authorization system, wherein the user-authorization system initiates a given user security session for the given user account in response to receiving a given security response carrying a given security credential that is associated with the given user account, and the user-authorization system includes a buffer that buffers the given security credential associated with the given user account while the given user security session is active. The given control device that sent the given logon request may create a logon lease in response to the user-authorization system granting the given user account access to the download and configuration system, wherein the given user security session for the given user account is active during a time period in which the logon lease has not expired. From time to time, the given control device may provide the user-authorization system with session information to request a renewal of the given logon lease, and the given control device may determine whether to renew the given logon lease based at least on given security session information provided from the user-authorization system.

The user-authorization system may be configured to respond to a respective request to renew a respective logon lease for a respective user account by providing a respective security query to the security store which responds by providing a respective security response, and the user-authorization system may be further configured to determine whether to create, or not to create, another user security session or to extend, or not to extend, a current user security session based at least on the respective security response and at least on the respective buffered security credential associated with the respective user account, and the user-authorization system may be further configured to determine whether to provide, or not, respective security session information granting renewal of the respective logon lease based at least on .the respective security response and at least on the respective buffered security credential associated with the respective user account. A respective control device may be configured to provide a respective user account at the respective control device with an amount of access to the download and configuration system based at least on a respective user access list associated with the respective user account, wherein the respective user access list is loaded onto the respective control device. The user-authorization system may be configured to determine whether to provide a respective user access list associated with a respective user account to a respective control device based at least on the buffered security credential associated with the respective user account, where the user account associated with the respective user access list is accessing the download and configuration system from the respective control device.

A computer implemented method of selectively providing user access to a download and configuration system in a casino may be summarized as including receiving a respective logon request that includes respective logon credentials from a user account at a respective control device of a plurality of control devices at a user-authorization system, wherein the user account is one of a plurality of user accounts, and wherein the respective logon request is for accessing a download and configuration system that modifies gaming machines in a casino; receiving, at the user-authorization system, a respective security response that carries information indicative of whether access to the download and configuration system should be granted from a security store that stores a plurality of user security credentials and a plurality of user access lists, wherein each user security credential is associated with a respective user account of the plurality of user accounts and each user access list is associated with a respective user account of the plurality of user accounts; determining whether to grant the respective logon request based at least on the information carried by the respective security response at the user-authorization system; if the determination of whether to grant the respective logon request is to grant the respective logon request, buffering the respective user security credential associated with the respective user account that sent the respective logon request in a buffer of the user-authorization system, and providing the respective user account with security session information. Determining whether to grant the respective logon request based at least on the information carried by the respective security response at the user-authorization system may include determining to grant the respective logon request based at least on the respective user security credential associated with the respective user account that sent the respective logon request, wherein the information carried by the respective security response includes the respective user security credential associated with the respective user account that sent the respective logon request.

The method may include sending a respective security query from the user-authorization system to the security store in response to receiving the respective logon request, wherein the respective security query includes information indicative of the logon credentials carried by the respective logon request; comparing the information indicative of the logon credentials with valid logon credential information associated with the user account that sent the respective logon request; determining whether the respective logon request is valid based at least on the comparison of the information indicative of the logon credentials with valid logon credential information; determining whether to include the respective user security credential associated with the respective user account that sent the respective logon request in the respective security response based at least on a determination that the respective logon request is valid; and sending the respective security response from the security store to the user-authorization system, wherein the respective security response carries the respective user security credential associated with the respective user account that sent the respective logon request, and wherein the respective security response carries the respective user security credential associated with the respective user account that sent the respective logon request only if the respective logon request is valid.

The method may include creating, at the user-authorization system, a respective user security session for the respective user account that sent the respective logon request in response to determining to grant the respective logon request.

The method may include from time to time, receiving a respective logon lease renewal request from a respective user account that is logged in and granted access to the download and configuration system; retrieving from the buffer of the user-authorization system a respective user security credential that is associated with the respective user account; determining whether to grant the respective logon lease renewal based at least on the retrieved respective user security credential; and if the determination of whether to grant the respective logon lease renewal is to grant the respective logon lease renewal, providing the respective user account with security session information indicative of a renewed logon lease. The respective logon lease renewal may include respective logon credentials, and wherein determining whether to grant the respective logon lease renewal based at least on the retrieved respective user security credential includes comparing the respective logon credentials with valid login credential information associated with the respective user account.

The method may include receiving a respective user access list from the security store for the respective user account that sent the respective logon request; and providing the respective user account with the respective user access list, wherein the respective user access list limits an amount of access to the download and configuration system granted to the respective user account.

Further aspects, features and advantages of various embodiments of the invention will be apparent from the following detailed disclosure, taken in conjunction with the accompanying sheets of drawings.

BRIEF DESCRIPTION OF THE SEVERAL VIEWS OF THE DRAWINGS

FIG. 14B is a graph of a minimum bet profile according to one nonlimiting embodiment.

FIG. 21 is a screen print showing a graphical user interface (GUI) display panel of an assignment-creator/modifier program according to one nonlimiting embodiment.

FIG. 25 is a screen print showing a graphical user interface (GUI) display panel of an assignment-creator/modifier program according to one nonlimiting embodiment.

Figure 1:
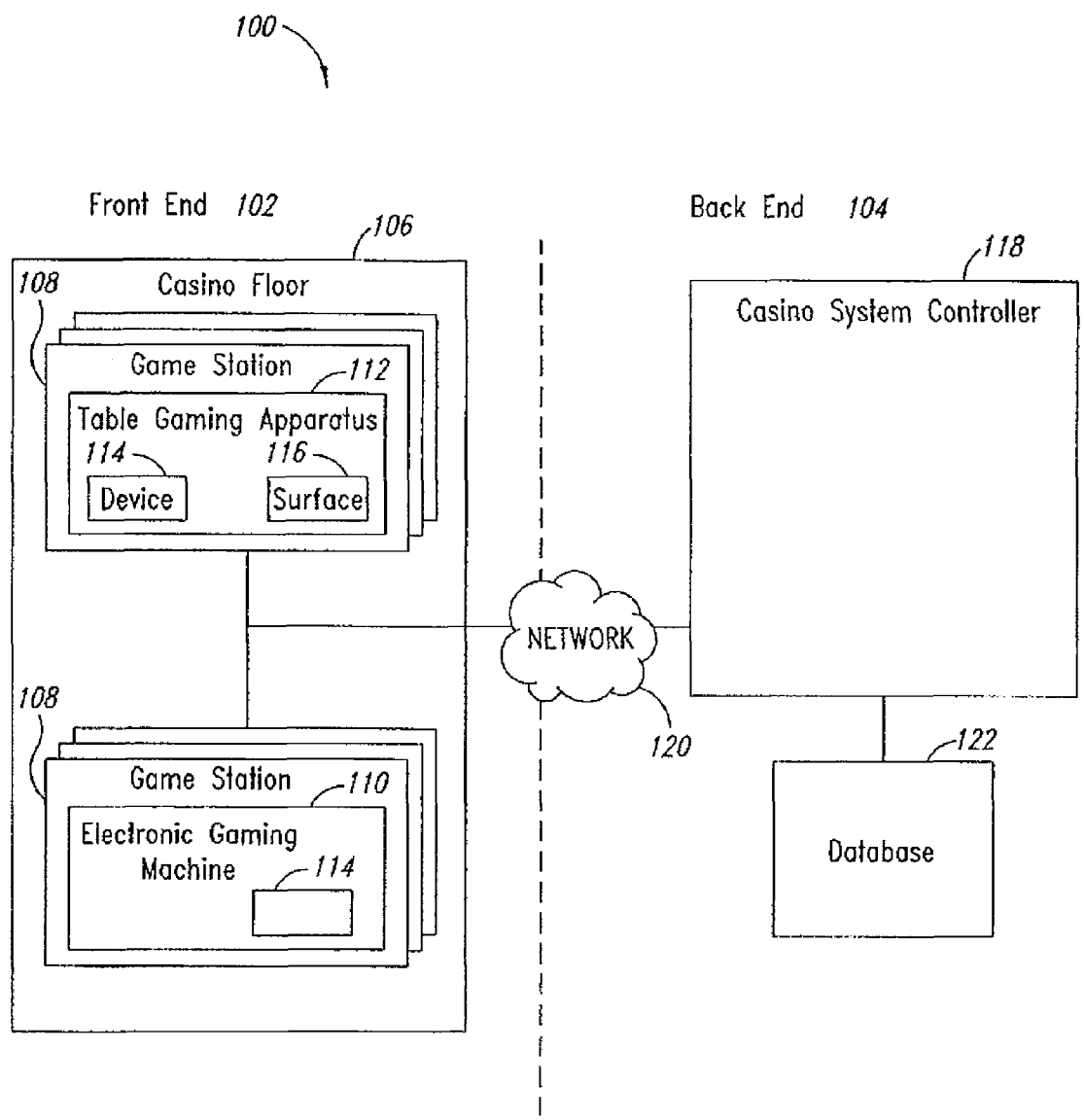
FIG. 1 is a schematic view of a gaming environment according to one nonlimiting embodiment.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with servers, networks, displays, and/or with computer type devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Any process descriptions or blocks in flowcharts described below may be understood as representing modules, segments, or portions of code which include one or more executable instructions for implementing specific logical functions. In alternative embodiments, various logical functions, or acts may be executed out of order from that shown or discussed, including substantially concurrently or in reverse order, and/or manually, depending on the functionality involved, as would be understood by those reasonably skilled in the art.

Various embodiments are directed to a networked gaming system including one or more download and configuration management servers, one or more game and player monitoring components, and at least one user control station enabling the monitoring and modification of networked gaming machines. The embodiments are illustrated and described herein, by way of example only, and not by way of limitation. Referring now to the drawings, and more particularly to FIGS. 1-30, there are shown illustrative examples of various GUI displays which may be generated on a user control stations to monitor and modify game and player activity, gaming networks including one or more user control stations with download and configuration features, and methods associated therewith, in accordance with various aspects of the invention.

Game-Entertainment Environment

FIG. 1 shows a game-entertainment environment 100 according to one non-limiting illustrated embodiment. The game-entertainment environment 100 may include a front end 102 and a back end 104. The game-entertainment environment 100 may be a casino or other gaming environment. For the sake of clarity, the game-entertainment environment 100 is described below as a casino, but the game-entertainment environment 100 is not limited as such.

The front end 102 includes a casino floor 106 having a number of game stations 108. Each one of the gaming stations 108 may include at least one electronic gaming machine (EGM) 110 and at least one table gaming apparatus 112. EGMs 110 may electronically provide various games of chance and/or skill. Non-exhaustive and non-limiting examples of the EGMs 110 include slot machines, pachinko machines, video lottery terminals, video poker terminals, bingo machines, lotto machines, video keno terminals, video roulette terminals, video blackjack terminals, multi-game machines, arcade games, and so forth.

Table gaming apparatus 112 may include at least one electronic device 114 and a playing surface 116 on which various games of chance and/or of skill that may be played such as, but not limited to poker, blackjack, baccarat, roulette, keno, etc. Among other things, the device 114 may be adapted to provide information to casino personnel and/or to players. In one embodiment, the device 114 may be used by a player to place wagers. In one embodiment, the device 114 may be used in a system to provide bonuses to a player, where a bonus is an item, credit, good, or service that is provided in addition to payouts for successful wagers placed by the player. In one embodiment, the device 114 may be reconfigurable such that the device 114 operates in a post-reconfiguration mode that is different from a pre-reconfiguration mode.

In some embodiments, the EGMs 110 include disparate gaming machines, such as but not limited to: gaming machines that each play different games (e.g., slot machines, bingo, etc.), gaming machines made by different manufacturers, gaming machines that play the same game but are of different versions/models by the same manufacturer, or any other EGMs 110 that may have similarities and differences as compared to other ones of the EGMs 110. Moreover in one embodiment, machines or devices 114 alternatively or additionally to the EGMs 110 can be provided with configuration changes. Examples of such machines/devices can include, but not be limited to, player interface unit 310 such as an iView displays, signage displays, kiosks, audio systems, and so forth.

According to one embodiment, the back end 104 includes a casino system controller 118 that is communicatively coupled to the devices 114 and the EGMs 110 of the game stations 108 by a network 120. The network 120 can include wired and/or wireless communication links. Examples of the network 106 can include a local area network (LAN), virtual private network (VPN), an Internet connection, and/or any other network configuration that is capable to enable the casino system controller 118 to communicate with the EGMs 110 and the devices 114. The network 120 may provide two-way communications between the front end 102 components, e.g., devices 114 and EGMs 110, and the casino system controller 118.

According to one embodiment, the back end 104 also includes a database 122 that is communicatively coupled to the casino system controller 118. The database 122 may include modules, software routines, structured logic, structured data, etc., which, when executed by the casino system controller 118 enable the casino system controller 118 to, among other things, apply business logic in scheduling, controlling and monitoring the casino floor 106 and/or configuring/reconfiguring EGMs 110 and/or devices 114 and/or controlling and monitoring downloads to the EGMs 110 and/or devices 114.

Scheduler Panel

Figure 2A:
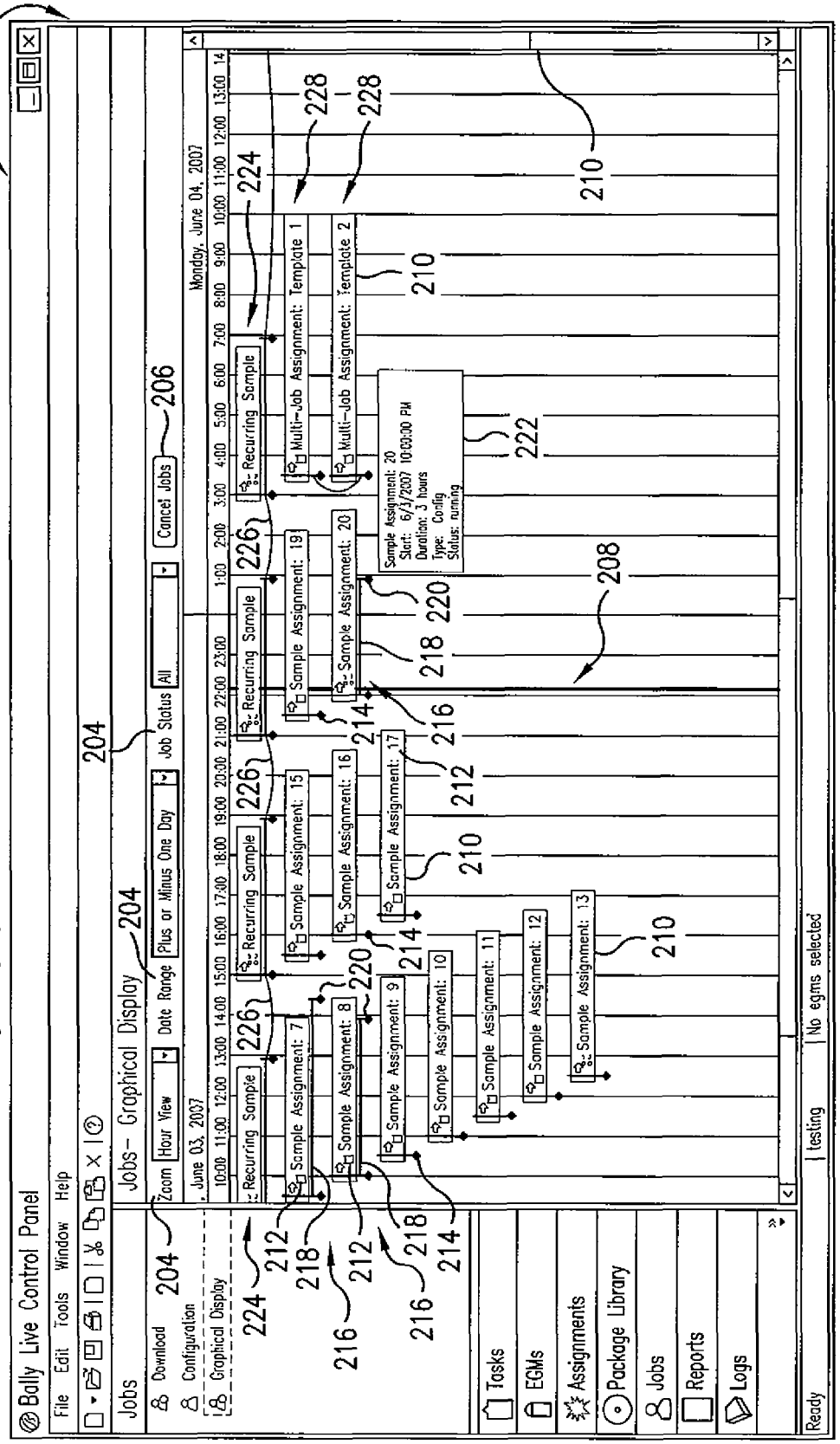
FIGS. 2A and 2B are screen prints of a scheduler panel presenting a graphical display of download and configuration jobs scheduled in a gaming system according to one nonlimiting embodiment.

Referring to FIG. 2A, a window or screen, scheduler panel, 200 is shown that presents a graphical display of download and configuration assignments scheduled in a gaming system, such as may be displayed at a user control station (also referred to as a Control Panel herein) in accordance with one or more embodiments.

The scheduler panel 200 may be implemented as a GUI (graphical user interface) which may be integrated with a Control Panel, such as a Bally Technologies Control Panel, which may include a display, keyboard, and mouse for use by a casino operator. The scheduler panel 200 provides an easy, intuitive way for operators to view, monitor status and manipulate assignment such as download jobs and configuration jobs. Each assignment may be presented on a timeline showing the start of the assignment. There may be a vertical bar, which may be any color such as lime-green, indicating the current time as a reference. The entire content can be scrolled in any direction, however when scrolling vertically, the header showing the dates and hours remain visible, and in some embodiments, the dates and hours may always remain visible.

The Toolbar:

Operating similarly to conventional toolbars, such as those provided in a Microsoft Windows Operating System, a toolbar 202 of the scheduler panel 200 may include filters 204 and a cancel assignment button 206. In the embodiment illustrated in FIG. 2A, the scheduler panel 200 includes three filters 204: Zoom, Date Range, and Assignment Status:

Zoom—Controls how much detail may be shown on the timeline. Typical choices include; Hour, Day and Week view;

Date Range—Allows user to specify how much time before and after the current time, data should be displayed. Typical choices include; Today Only, Plus or Minus One Day, Plus or Minus One Week, Plus or Minus One Month. The user may use a report look at activity in the past outside of this range;

Assignment Status—Allow the user to only show assignments matching specified status criteria. Anticipated Typical choices include; All, Active, Running, Pending Cancel Assignments—The user selects assignments that have not yet been completed, and cancel them using the cancel button 206.

Assignments:

In the embodiment illustrated in FIG. 2A, the scheduler panel 200 shows a plurality of assignments 208. Each one of the assignments 208 may be color coded to indicate a respective status, such as green, amber, and red. The assignments 208 may be represented by an icon 210. The icon 210 of one of the assignments 208 may be associated with a type of job such as a download job or a configuration job and may be the same icon used in other GUI interfaces such as in an assignment navigator.

The scheduler panel 200 may show various assignments 208 as a graphic bar 222. A title 212 may be derived from a name of a respective assignment 208. A start time may be indicated by a vertical black bar 214 on the left that may have a diamond ending. If an assignment is an override assignment 216, then a horizontal line 218, which extends from the left side vertical bar 214 to a right side vertical bar 220, indicates an amount of time that an override is in effect, i.e., the override duration. The right side vertical bar 220 may have a second diamond ending.

Figure 2B:
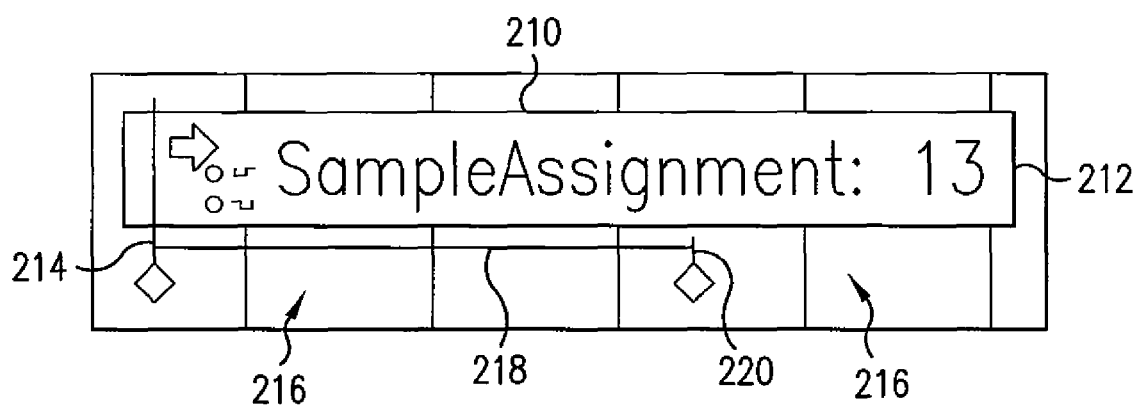

Referring to FIG. 2B, an exemplary three hour configuration override assignment 216 is shown. If the override assignment 216 results in an error, an assignment graphic bar may be displayed to indicate that there was an error. The assignment graphic bar and/or the icon may flash or blink or have a specific color such as red to indicate the occurrence of the error. If the assignment is in progress, then a progress bar (not shown) may also be shown to show the percentage of completion of the assignment and the time elapsed. If the assignment is on time, then the progress bar may be green, if it is a little late, then it may be amber, and if the assignment is either stopped incomplete or a delay has caused a conflict with another assignment bar, then the progress bar may be red, may flash, and may display a warning message to alert a user.

Hovering a mouse cursor over an assignment 208 may bring up a tool tip 220 with additional details, as shown in FIG. 2A. In the embodiment shown in FIG. 2, the tool tip 220 includes additional details such as a start time which may include date and time (e.g., Jun. 3, 2007), override duration (e.g., 3 hours), type of job (e.g., configuration) and status (e.g., running). In some embodiments, there may be more detail in the tooltip than shown in this screen shot, such as progress of particular gaming machines associated with the assignment. In the event that some EGMs 110 have completed the assignment or some have not, this information may be obtained by clicking the assignment graphic bar to obtain a summary of the status of the EGMs affected.

Linked Assignments:

In the embodiment shown in FIG. 2A, the scheduler panel 200 shows recurring assignments 224. Temporally sequential assignments 224 are linked by a recurrence indicator 226. Each recurrence indicator 226 links the previous assignment 224 with the next occurrence the assignment 224.

Multi-Job Assignments:

In the embodiment shown in FIG. 2, the scheduler panel 200 shows multi-job assignment 228 starting at about 3:30 am on Monday. The multi-job assignment 228 represents an assignment that was set up to run two jobs in sequence such as two downloads. However, the multi-job assignment 228 may be a download followed by a configuration, or any combination of two or more jobs.

In some embodiments, assignments may be changed so that they schedule one or more jobs describing what to do. In that case, configuration or download instructions about what to configuration or download may be shared at different times or for different EGMs 110 such that the instruction don't need to be re-entered.

In some embodiments, double-clicking on icon 210 or opening an assignment may open a detail window with a view similar to the tooltip 222, and the detail window may be focused only on an assignment in question. The detail window may show the individual status for each EGM 110 and in the case of configurations, for each option. Two or more of these may be opened at once to aid in comparing results.

Coding:

Assignments 208 which include override assignment 216, recurring assignments 224 and multi-job assignments 228 are displayed at locations in the scheduler panel 200 so as to keep the display of the assignments 208 compact while at the same time avoiding overlaps. In the embodiment illustrated in FIG. 2A, all recurring assignments 224 scheduled during a time period of interest may be displayed near the top and may be horizontally aligned. Then each one of the recurring assignments 224 during the time period of interest may be taken in start time order and displayed beginning at the top left corner. Initially, each one recurring assignments 224 during the time period of interest may be displayed one row below the ones already displayed until the start time has shifted forward far enough that it can be drawn in a new column without overwriting the previous ones. At this point, the current row may be reset to the top and this may be repeated for each subsequent ones of the recurring assignments 224 during the time period of interest.

In some embodiments, a displayed assignment 208 may also include one or more 'progress' indicators that may show how much of the job has completed. Because a 'job' could involve more than one EGM 110, the percentage shown may be the average percent complete for all EGMs, or the percent complete for the one that is least complete (in order to give operator some idea of how much longer it will take to complete the job), or some other useful measure of completion. The scheduler panel 200 may also provide some readily apparent indicator that an assignment has encountered a kind of error. The error indicator may be clicked on that indicator to see details of the error, such as identify one or more EGMs (gaming machines) that have been unable to receive or have encountered delays in receiving a download or reconfiguration or have refused the download or reconfiguration because of an incompatibility issue.

Figure 3A:
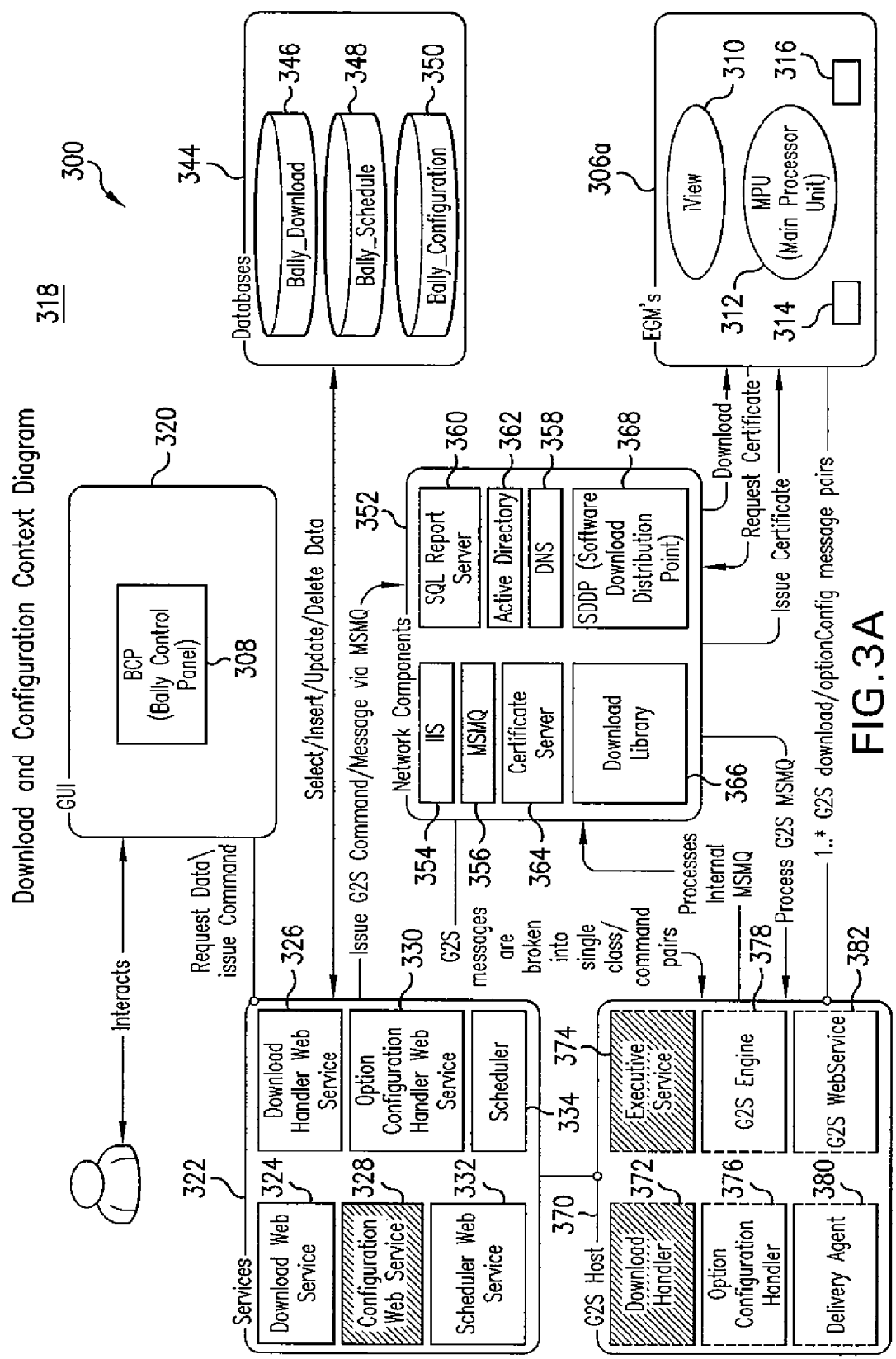
FIG. 3A is a download and configuration context diagram according to one nonlimiting embodiment.
Figure 3B:
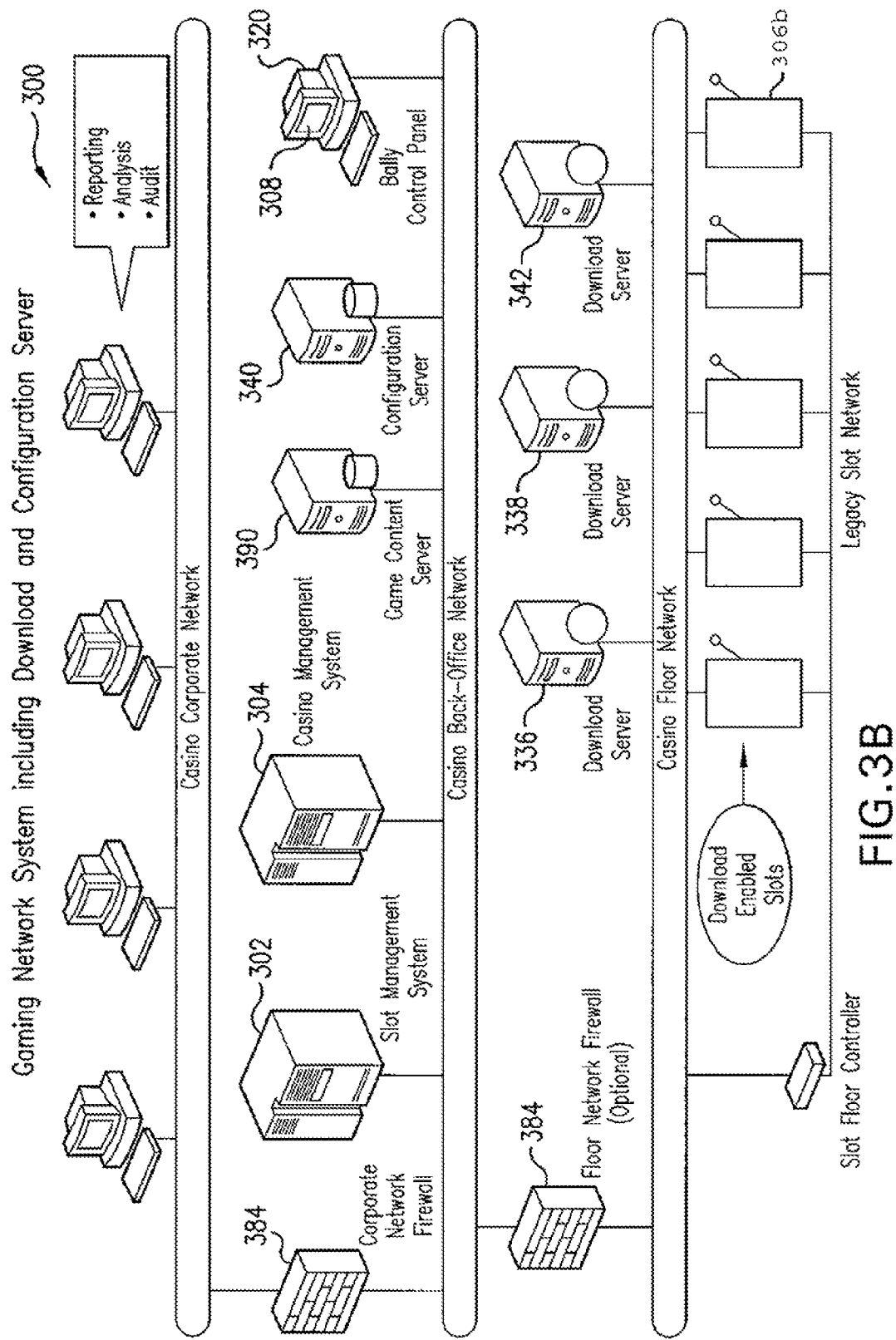
FIG. 3B is a download and configuration network diagram according to one nonlimiting embodiment.
Figure 3C:
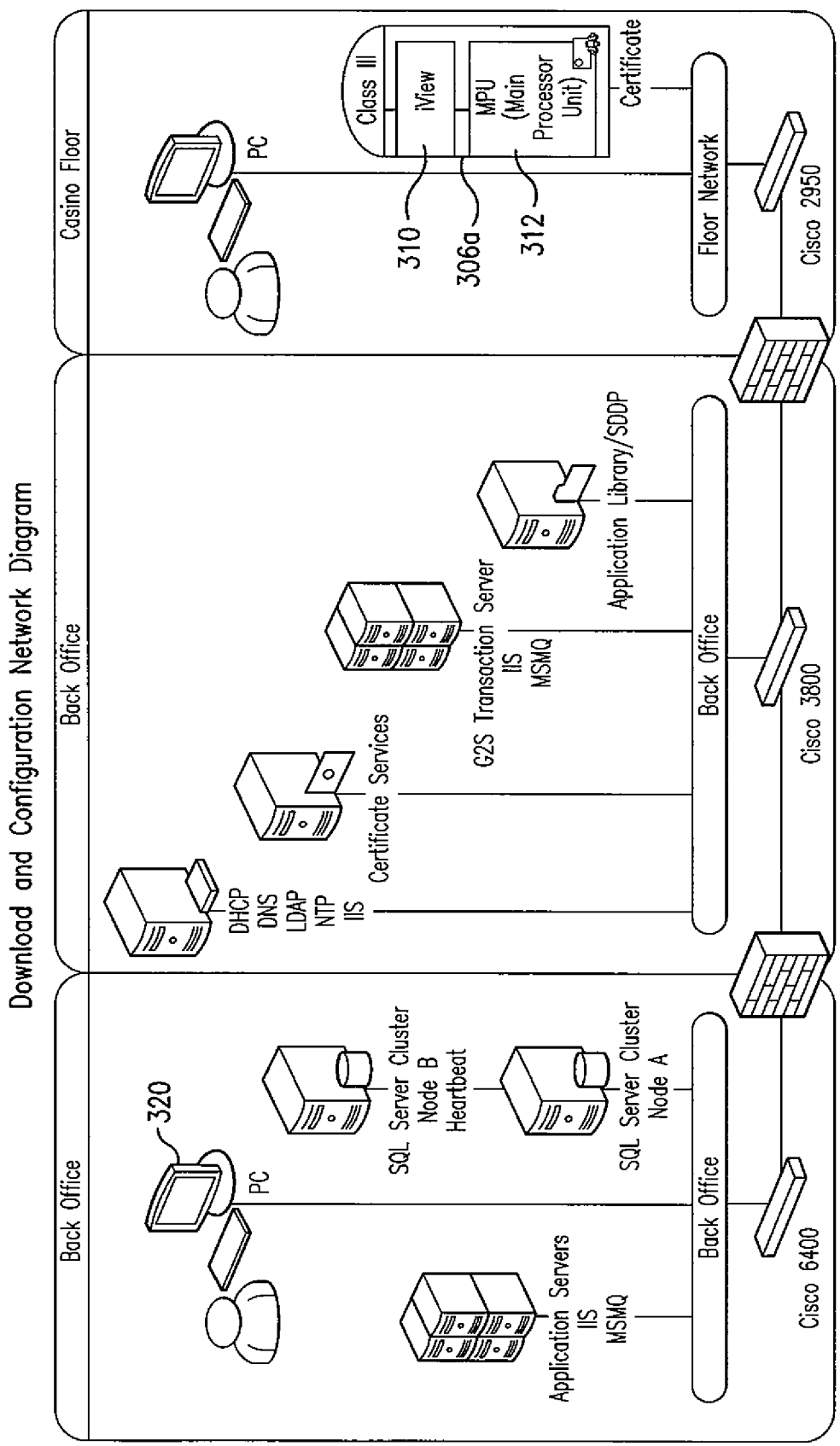
FIG. 3C is a download and configuration network diagram according to one nonlimiting embodiment.

Referring to FIGS. 3A, 3B and 3C, an exemplary gaming network 300, which may be used in the environment of the casino 100, is shown. The gaming network 300 may provide, among other things, download and configuration functionality. The gaming network 300 may include computer systems such as a slot management system 302 (see FIG. 3B) and a casino management system 304 (see FIG. 3B) networked to gaming machines, which includes electronic gaming machines 306a and legacy gaming machines 306b and which are collectively referenced as 306.

The electronic gaming machines 306a may include a player interface unit 310 (such as Bally iView), a main gaming processor unit (MPU) 312, a game monitoring unit (GMU) 314, and possibly other network enabled gaming components such as a game controller 316 which may each connect to the network and may connect to each other to communicate as needed, such as communications related to the status of the gaming machine or game play.

Referring to FIG. 3A, and generally to FIGS. 3B and 3C, the gaming network 300 includes a download and configuration management (DCM) server system 318. A user may interact with the download and configuration management server system 318 via a control station 320 which may have a graphical user interface displaying a control panel such as commercially available Bally control panel (BCP) 308.

The download and configuration management server system 318 includes download and configuration services block 322 (see FIG. 3A), which may include a Web accessible download service 324, a Web accessible download handler service 326, a Web accessible configuration service 328, an option configuration handler server 330, a Web accessible scheduler service 332 and a Web accessible scheduler handler service 334 (See FIG. 3A). In some embodiments (see FIG. 3B), the download and configuration services block 322 may be implemented by a download server 336, a download handler server 338, a configuration server 340, an option configuration handler server 342, a scheduler server (not shown) and a scheduler handler server (not shown).)

The download and configuration management server system 318 may also include download and configuration database 344 (including for example conventional storage depositories such as containing a download database 346, a schedule database 348, and a configuration database 350), network components 352 (for example, conventional hardware and software to support internet information services (IIS) 354, Microsoft Message Queing (MSMQ) 356, and domain name system (DNS) 358, a structured query language (SQL) report server 360, an active directory 362, a certificate server 364, a download library 366, and an SDDP (Software Download Distribution Point) 368), G2S (Game-to-Server) host 370 (including for example a download handler 372, an executive service 374, an option configuration handler 376, a G2S engine 378, a delivery agent 380, and a G2S Web accessible service 382), and EGMs 306 (including for example a facility floor of network connected gaming machines and tables which may each include a player interface unit 310 such as commercially available Bally iView or similar product features and/or a gaming main processor unit 312 which are individually identifiable and addressable over the network. (The referenced Web service utilizes a secure (HTTP(s) transmission protocol used to communicate with the slot management service and vice-versa. This system operates using web protocol and web services to serve information and process transactions. It does not serve web pages in the traditional sense.)

Download an configuration management server system 318 enables the transmission of software files, packages or modules to one or more clients, such as gaming machines or tables, via, for example, a casino network using the Gaming Standard Association's (GSA's) Game to System (G2S) message protocols. The download and configuration management server system 318 includes configuration functionality that enables the selecting of specific settings and options on one or more clients using GSA's G2S message protocols, such as to modify the Alpha operating system on conventionally available gaming machines or third party gaming machine or table operating systems. Subsystems of download and configuration management server system 318 connect to control station 320, which includes a common user interface application such as a control panel application, so that a user can request data and issue commands for the processing of download and configuration operations throughout the network.

Download and configuration management server system 318 provides for the following G2S download class features:
  The G2S download class provides a standardized protocol to manage the downloaded content on all G2S compliant gaming machines or tables (EGMs 306) from all G2S compliant host systems;
  The G2S download class enables installation of downloaded packages;
  The G2S download class enables the removal of software (uninstall);
  The G2S download class enables scheduling of installation and/or removal of software including enabling scheduling options that relate to a specific time, EGM state, or interaction with a host server or technician;
  The G2S message class supports reading an inventory of downloaded packages and installed modules. This provides the capability to effectively manage the content on the EGM;
  The G2S message class enables recording transaction logs for packages and scripts on a transaction database accessible through control station 320. This feature provides an audit capability or transaction tracer for determining how content came to be on an EGM.

The download and configuration management server system 318 also provides the following G2S option configuration (optionConfig) class features which allows for the selection of various configuration options:
  The optionConfig class provides a convenient and efficient mechanism to remotely configure EGMs 306.
  The G2S optionConfig class provides for downloading options available from within an EGM 306.

Download and configuration management server system 318 implemented G2S classes (optionConfig, download, and scheduler) are also integrate-able through secondary displays, such as the iView, by incorporating, for example an iView transaction server. Thus, download, configuration, and configuration options may be implemented at selected EGMs 306 through their respective MPU (Main Processor Unit) 312 or player interface unit 310 or iView. In the case of the respective player interface units 310 of the EGMs 306 being embodied in a respective Bally iView and using the Bally iViews for network communications, a separate processor board may be provided along with a display and user interfaces. Communication channels are connectable between the iViews and the MPU to enable the download, configuration, and configuration option processes. Some definitions of terms and components follow:

Databases—The databases return information based on the results of a stored procedure call. By example, the following databases, which are descriptively named, may be utilized: Core; Configuration; Download; Activity; and Schedule.

BCP (Control Panel)—As an example, the control panel application 308, such as Bally Control Panel, may be a smart client implemented on control station 320 encapsulating all the functionality to support the command and control portions of the download and configuration features of a facility or facilities. Downloads and configuration options may be remotely scheduled or deployed immediately by a user through control station 320. Notifications, approvals, searches, and reports produced through download and configuration management server system 318 may be viewed by a user through a display or through hardcopy provided by a connected printer to control station 320.

Control station 320 may take a variety of forms such as, but not limited to, a Dell or Sun computer workstation that includes a display, keyboard, and networked operating system software.

Control station 320 may be utilized for remote downloading and configuration of games and game operating systems of connected EGMs 306. Also, control station 320 may be utilized to download content to or to configure the player interface unit 310 such as an iView (or similar components) and second game displays or monitors (for instance, in cases in which an EGM 306 has two or more major displays) (which may also include an additional processor unit such as for example in the case of multiple games operable on a single EGM 306 on separate displays), as well as peripheral software for components in the games like bill validators and ticket printers.

Control station 320 may be utilized for the throttling of system resources based on the requested changes. For example if the user requests several high bandwidth consuming jobs be initiated concurrently, the control station 320 would advise the user that this would utilize more than allocated bandwidth and require changes to the proposed schedule. In some embodiments, the control station 320 may recommend changes to the schedule to ease the work requirement for the user.

Control station 320 may be utilized for the broad based change to gaming floors to support special events. For example on Halloween a specialized background or theme could be downloaded or configured on all capable games and devices for the duration of the event. Broad based change to gaming floors may be further extended to enabling specialized bonus games on other player centric activities relating to the special event or holiday. This allows a user of control station 320 to fully customize the property without the manual effort required with current systems and technologies.

Control station 320 may be utilized to fully view in a graphical fashion gaming floor configurations that have occurred in the past or are proposed for the future. This allows the user of control station 320 to easily and quickly compare past gaming floor configurations to configurations proposed for the future in an easy to understand graphical manner. In some embodiments, these configurations be animated in a manner that realistically depicts the activity on the gaming floor over a period of time allowing the user of control station 320 to 'watch' the impact of the proposed changes.

Control station 320 may be utilized to view machine utilization information over time to determine where certain groups of players spend their time while at the property. For example if certain demographic groups are inclined to utilize machines configured at 0.25 per play and this control station 320 capability can illustrate the fact that during certain times of the day this machine configuration is completely utilized and that a large group of this demographic is scheduled to visit the property, the casino manager could opt to enable more of this type of game so players are not waiting for an opportunity to play. In some embodiments, this feature is presented in an animated fashion such that the user of control station 320 may select a date range and analyze in real time game usage by time of day and by player demographic. This features also requires control station 320 have access to and have the capability to process information from the player marketing system or have access to the data stream feeding the player marketing system.

Control station 320 has the capability to allow groups of gaming devices be identified and operated upon via a number of query options. This aids the user in quickly and effectively finding the machines to apply changes to. In some embodiments, advanced selection criteria such as performance over the last 30 days be considered as a query parameter. The control station 320 can provide the capability to utilize a graphical representation of the gaming floor. This allows selected groups of games to graphically represented on this floor map as well as in a list form.

Control station 320 can utilize historical slot game performance data to provide guidance for new floor configuration options. The historical data may be accessed in the download system data stores or from an external business intelligence system. In some embodiments, the control station 320 may be programmed to allow for automated floor configuration changes based on the historical performance data. This capability may be applied automatically or via an interface requiring only approval from the user prior to applying the changes.

Database Web Services—These are world-wide Web (Web) services that are conventionally available to be re-used by other user interfaces and service applications connected to slot management system 302. In other words, this is a secure closed system network using web services connected on demand with the slot management system.

Handlers—These are the logic libraries that are responsible for executing the business logic of the system.

Network Components—The following list of network components, or portions thereof, may be implemented and/or required by download and configuration management server system 318: Certificate Server 364; DNS 358; DHCP, firewalls 384, which may include applications, hardware, or combinations thereof, and Network Load Balancers Third Party Software Applications—the following list of $3^{rd}$ party applications my be utilized or required by the download and configuration server system 318: IIS 354, MSMQ 356, SQL Report Server 360, SQL Server Reporting Services, Active Directory 362, Microsoft Windows 2003 Server.

G2S Engine 378—This service receives G2S messages from EGMs 306 and dispatches them to a respective subsystem of download and configuration server system 318 based on the message component type.

EGMs—Electronic Gaming Machine 306, which may include tables and/or legacy machines with processor and/or display components.

Player interface unit (iView)—For example, a conventional apparatus providing a player user interface and display at EGMs 306 connected to the network including the player tracking server and enabling a player to request and receive information, to receive award notifications, to transfer credits, and to conduct such activities through the apparatus as is enabled on slot management system 302. One usage of an iView-type apparatus may be to display marketing and player tracking information and various shows on the occurrence of an award or win by a player. Such apparatuses may also be utilized as vessels for gaming, such as with server-based games or even independent games stored on their respective processor boards. Thus, separate games may be implemented through the iView-type device, apart from the main game of EGM 306 controlled by the MPU. In turn, the content of the player interface unit 310 such as an iView may be separately modified as through downloads or configurations or configuration options.

Control station 320 is able to retrieve from the database and view all login attempts to the server both successful and failed. A user may be locked out of access to the control panel application at control station 320 after too many failed login attempts. The recorded transaction log may include the login ID, data, time of login and duration.

The Web services may support functionality between control station 320 and database 207. The Web services may also support unsolicited messages between the G2S handlers and control station 320.

Download and configuration management server system 318 may maintain a record or transaction log of login attempts to the server both successful and failed. The log may include the login ID, data, time of login and duration. Download and configuration management server system 318 may also maintain a transaction record or log of all events and activity occurring on download and configuration management server system 318. The log may include a record of which login session in which the event occurred.

Download and configuration management server system 318 may also maintain a log of communication events with any EGM 306. Download and configuration management server system 318 may also maintain the status of each EGM 306 including: Game history data; Download status (available, requested, downloading, applied, rejected); Package information (available for install, requested, being downloaded, downloaded, installed); Hardware information; Software Module Information; and/or Error conditions.

Download and configuration management server system 318 may dynamically build packages to be downloaded based on EGM 306 inventory and available updates, fixes and new data for EGMs 306. Download and configuration management server system 318 may verify requests from EGM 306 including whether or not EGM 306 is valid and that it is in a state to make the request. Requests may be logged and contain EGM 306's identification number, time and date, specific request, and EGM status. Download and configuration management server system 318 may communicate with Software Distribution Point servers (SDDP) to maintain a list of packages that are available for supported EGMs 306. Download and configuration management server system 318 may supply the location of the SDDP when instructing EGM 306 to add a package. Download and configuration management server system 318 may verify that all required hardware and software for a package to be sent to an EGM exists before instructing EGM 306 to retrieve the package. Download and configuration management server system 318 may support multiple EGMs 306 in multiple sites and/or facilities and EGMs 306 produced by multiple manufacturers. Download and configuration management server system 318 may verify, using the information in the package header and the information stored about selected of EGM 306, that a software package can be installed on a selected EGM 306 before instructing EGM 306 to add a package. Download and configuration management server system 318 may be able to track which packages are installed on any given EGM 306 and verify the data by requesting a selected EGM 306 to send package install information. Download and configuration management server system 318 may report bad images and errors and log them when failed package installation information is received from an EGM 306. Download and configuration management server system 318 and SDDP may be used to control all network pacing, bandwidth, error recovery, and monitoring. Download and configuration management server system 318 may be utilized for maintaining the location of all SDDP and the packages available on each.

Software Download Distribution Point (SDDP) server 368 may be utilized to maintain all downloaded software packages in a secure library with the required number of secure backups defined by a jurisdiction. The SDDP server 368 may be used to restrict access to the library that stores all software download packages to only authorized personnel. The access may limit access, such as to only allow write access to those authorized to add, delete, and update packages and read access for all others authorized to access the library. The SDDP server 368 may provide secure software level firewalls to restrict access to everything saved on the server. The SDDP server 368 may maintain a log of login attempts to the server both successful and failed. The log may include the login ID of a user, data, time of login and duration. The SDDP server 368 may maintain a log of all events and activity occurring on download and configuration management server system 318. The log may include which login session in which an event occurred.

Software packages added to the software library may be verified from the package data using an MD5 or SHA1 hashing algorithm to validate the data or some other verification tool. The verification string may be added to a package header and used to re-verify the package when it is downloaded to the EGM 306.

All verification failures and related errors may be logged and the log entry may contain the date and time, the ID of the person running the process at the time, and the specific type of error that occurred. They may also be displayed on the correct display area.

The SDDP server 368 may be utilized to provide selected EGMs 306 with the communications port location and IP address used for sending software package data to the EGM 306. All data within a download package may be compressed using conventional compression techniques and transmitted in compressed format. On receipt, EGM 306 may decompress the downloaded software package.

Referring to FIGS. 3B and 3C, gaming network 300 is shown in representative form. The download and configuration management server system 318 may be a portion of the slot management system 302 which provides a suite of subsystems designed to provide customizable solutions by allowing users to select products within the suite to meet their needs for particular facilities, such as a casino manager seeking to manage a single or multiple properties. Download and Configuration (Download and Config) are two of the subsystems offered in the suite that provides a user, such as the Slot Operations staff, an efficient mechanism to remotely configure electronic gaming machine (EGM).

The download and configuration software utilized together with the apparatuses as shown in the figures may be used to enable a casino's staff such as slot operations staff to schedule and change a game(s) on the casino floor from a keyboard.

Using the control panel (BCP) interface, casino personnel may schedule, configure, download and activate changes to games on the floor, without touching an EGM 306 on the floor. download and configuration software application may be loaded on control station 320 to enable the sending of information over the casino network using G2S & HTTPS standardized message protocols that manage the downloaded content. From control station 320, a user, such as casino staff, can change cabinet or game options, or games in respective EGMs 306. There may be numerous selections that the staff can schedule to configure or make a minor change. Table 1 below list some examples of the types of software that may be downloaded or options which may be re-configured:

TABLE 1

Downloadable Software and Options

| Cabinet Options | Game Options | Download Options |
| --- | --- | --- |
| Sound | Game/Theme | Change a game, theme, |
| Reel spin speed | Paytable | &/or |
| Background color | Denomination | paytable |
| Attract mode | | Change game operating system |

In order to implement the download and configuration features, one approach is to install slot management system 302 at a facility, such as the commercially available Bally_Live slot management system. The implementation of the download and configuration features further contemplates the implementation of server hardware and related equipment as shown in the figures, and particularly FIGS. 3A-3C, including software to perform the needed functions for communicating relevant data and instructions, the implementation of download ready EGMs, such as EGMs 306 with an Alpha operating system with remote download and configuration capability. An example system for implementing the download and configuration management server system 318 may be a commercially available Bally One System together with a commercially available Bally Live Floor program. Another example implementation of the download and configuration management server system 318 may be in conjunction with other slot management systems incorporating a commercially available Bally Live Core program.

An exemplary process for using the download and configuration server system 318 is as follows: a casino operator decides to change game themes on one or more EGMs 306 such as V20D-20 EGMs. The software game themes may be located on the SDDP Server 368. Download management tools may be located on an Application/Database Server System. One or more servers separate from the SDDP Server 368 may contain the game theme software, such as for security or redundancy purposes. The Alpha EGMs are identified on the casino floor using the BCP 308. A download management tool, such as the BCP scheduler 200 may be used through a menu to identify: the date and time to download the game packages; i.e., the game packages to send to the specific EGMs; the date and time to automatically activate the games on the EGMs after the download. At the selected date and time, the EGM may open communication with the Download Database. The EGM request software from the SDDP server 368. The SDDP server 368 downloads the specified game information to the EGM using a secure transmission protocol such as HTTPS. The download to the EGM may occur in the background operation of the Alpha OS, so that game play is not interfered with. The EGM may de-activate game operation a pre-determined amount of time subsequent to the last play on the EGM, such as five minutes, and issue a message on one of its display panels that it is temporarily offline, at which point the EGM can initiate installation of the downloaded software. A record of the transmissions and corresponding activity of the EGM is relayed to a retrievable storage on the network, such that a privileged user may operate the BCP 308 to run the reports identifying the old and new games, date changed, and by whom. User privileges may be restricted as discussed previously to provide additional levels of security and flexibility within the system and for the casino operator or users of slot management system 302 and download and configuration server network 318.

The download and configuration management server system 318 may a plurality, for example 10 EGMs, through a single Cisco 2950 switch. As the number of EGMs increases, the type and/or number of servers, switches, firewalls, and pipelines may be changed to accommodate higher traffic volumes and improve or avoid degradation of performance.

In one embodiment, the following apparatuses and software may be incorporated:

| Example Components | Example Hardware | Example Software |
|---|---|---|
| SDDP Server (SDDP may be placed on its own server to comply with some jurisdiction requirements.) | Pentium IV 2 GB RAM 100 GB SATA 2 NIC cards | OS - Microsoft Windows 2003 Microsoft SQL 2005 |
| Application Library Server | Pentium IV 2 GB RAM 100 GB SATA 2 NIC cards | OS - Microsoft Windows 2003 Microsoft SQL 2005 |
| Databases: • Scheduler • Download • Configuration | Pentium IV 2 GB RAM 100 GB SATA 2 NIC cards | OS - Microsoft Windows 2003 Microsoft SQL 2005 |
| Networking | Cisco 2950 Switch, 24-port Cisco ASA 5510 (firewall) | |
| Connecting wiring between devices | CAT-5 cables 15 feet long 2 cables per EGM | |

Discovery method to dynamically find gaming networked components using DHCP, DNS, LDAP, and Active Directory to locate services within the gaming network that are available in a casino.

Figure 4:
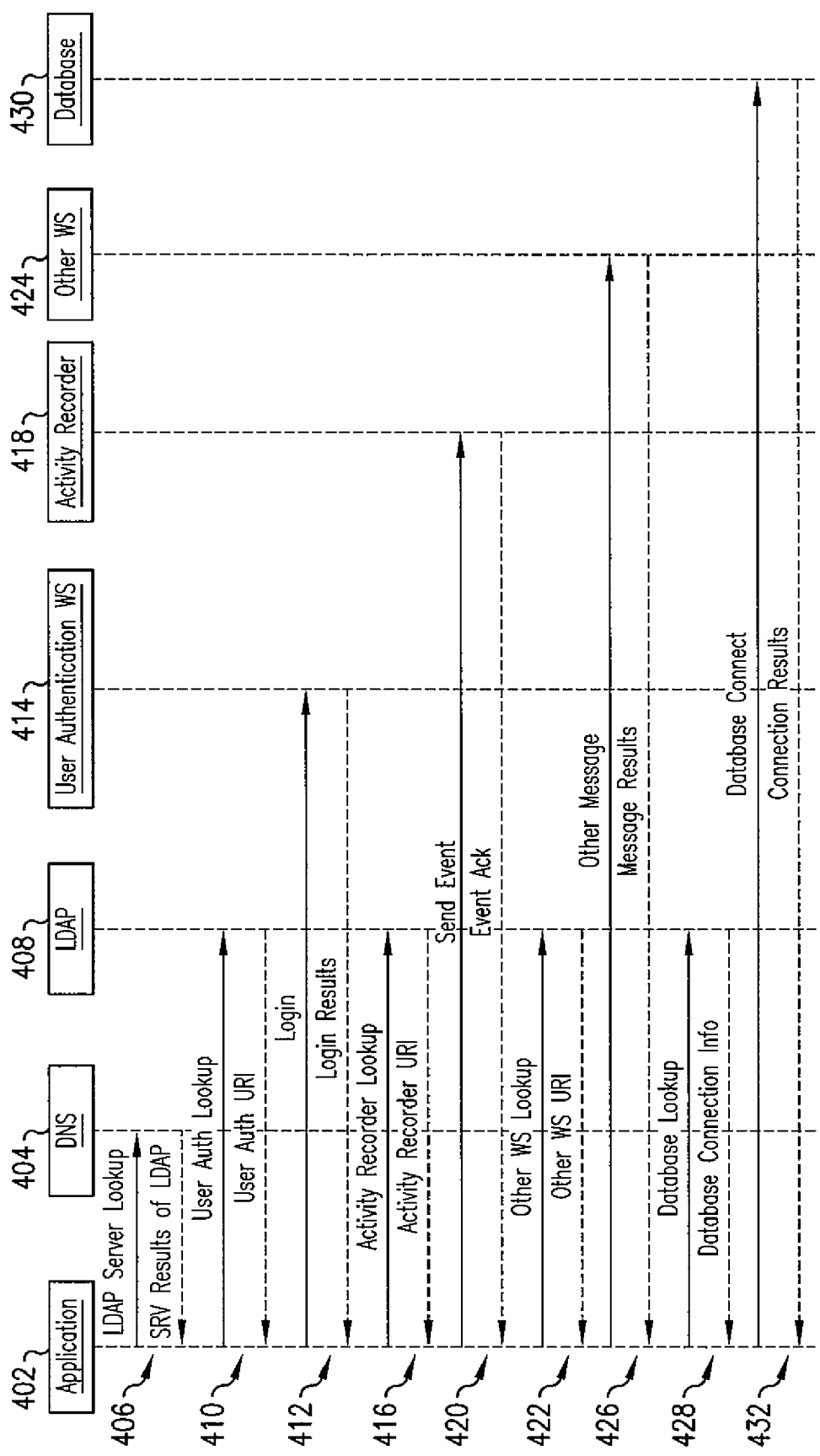
FIG. 4 is flow diagram of a process of networked component discovery that may be utilized by a gaming network according to one nonlimiting embodiment.

FIG. 4 shows an exemplary flow diagram of a process 400 of networked component discovery that may be utilized by a gaming network in accordance with one or more embodiments.

In one embodiment, the exemplary process of networked component discovery may take advantage of network infrastructure available on a Windows network, such as the Bally One slot management system:

An application 402 finds a DNS server 404, which is referred to by the network setup. The network setup may have been manual or by DHCP.

At 406, the application 402 then does a look-up of a specific name of an LDAP server 408 in a scope guaranteed to be at all casinos if the service is available and receives the results.

At 410, the application 402 queries the LDAP server 408 for the assigned name of the resource (database entry, or web service entry) and receives results therefrom. The entry may include the user name and password to use to connect to the database or may specify that the user is to use their own credentials.

At 412, the application 402 may use the information from the LDAP server 408 to login with a user authentication web service 414.

At 416, the application 402 queries the LDAP server 408 for the assigned name of an activity recorder 418 and receives results therefrom, and at 420, the application 402 connects to the activity recorder 418.

At 422, the application 402 queries the LDAP server 408 for the assigned name of other web services 424 and receives results therefrom, and at 426, the application 402 connects to the web services 424.

At 428, the application 402 queries the LDAP server 408 for the assigned name of database 430 and receives results therefrom, and at 432, the application 402 connects to the database 430.

There may be any number of DNS or LDAP servers to handle the process of networked component discovery. Also, the data returned back from the LDAP or DNS servers may be different from results returned to other machines based off of information obtained from the network card connecting to the network. For example, the north-east portion of the casino may force all requests to a different web service than the South-east portion. The LDAP server may be implemented by a third party vendor (such as Microsoft) or by the system vendor (such as Bally Technologies). The same is true of the DNS server. The results may also be returned by the version of the software the client is able to support. For example, the results may indicate a first server for version 1.0 of a protocol and a second server for version 2.0 of the same protocol.

Benefits and features of the discovery process and mechanism may include one or more of the following:

Benefit 1. Currently every server and workstation such as control station 320 may need to be configured manually, which may cause a significant workload on casino personnel. In addition, the potential for mis-configuration, which may be the result of manual configuration, may cause serious side effects including system downtime.

Benefit 2. The discovery process allows for dynamic configuration based on server availability and load. The system can report into the LDAP server the performance information about load and server availability. The LDAP server can then make decisions based on this information to route new connections to servers better able to handle the load.

Benefit 3. The discovery process allows for upgrading a small part of the casino to a new version of code and not have everyone go to it until the code has proven itself in a live environment. This provides a staged deployment capability that does not require the casino to be down during an upgrade process. It also allows for field trial capability without risking the entire casino operation.

Benefit 4. Resources can be spread throughout the casino. Not all servers need to be in the server room. There can be several closets on the floor with servers running. The servers can handle a section of the floor. This prevents a disaster in the computer room from downing the entire casino.

Benefit 5. If a closet handling a section of the floor is no longer available, a different closet can then take over.

System and Method for one-way delivery of notifications from server-to-clients using a modified UDP multicast.

In a strict client-server system, a server doesn't initiate communications with its clients. Instead, the server responds to requests from the clients. In a strict client-server system, when the server has knowledge a change in a system or component of a system, the server cannot notify the clients that might be interested in or need to know of the change. Similarly, the server cannot notify clients of events or current status of events. One technique to overcome these issues is for the clients to poll the server.

Figure 5:
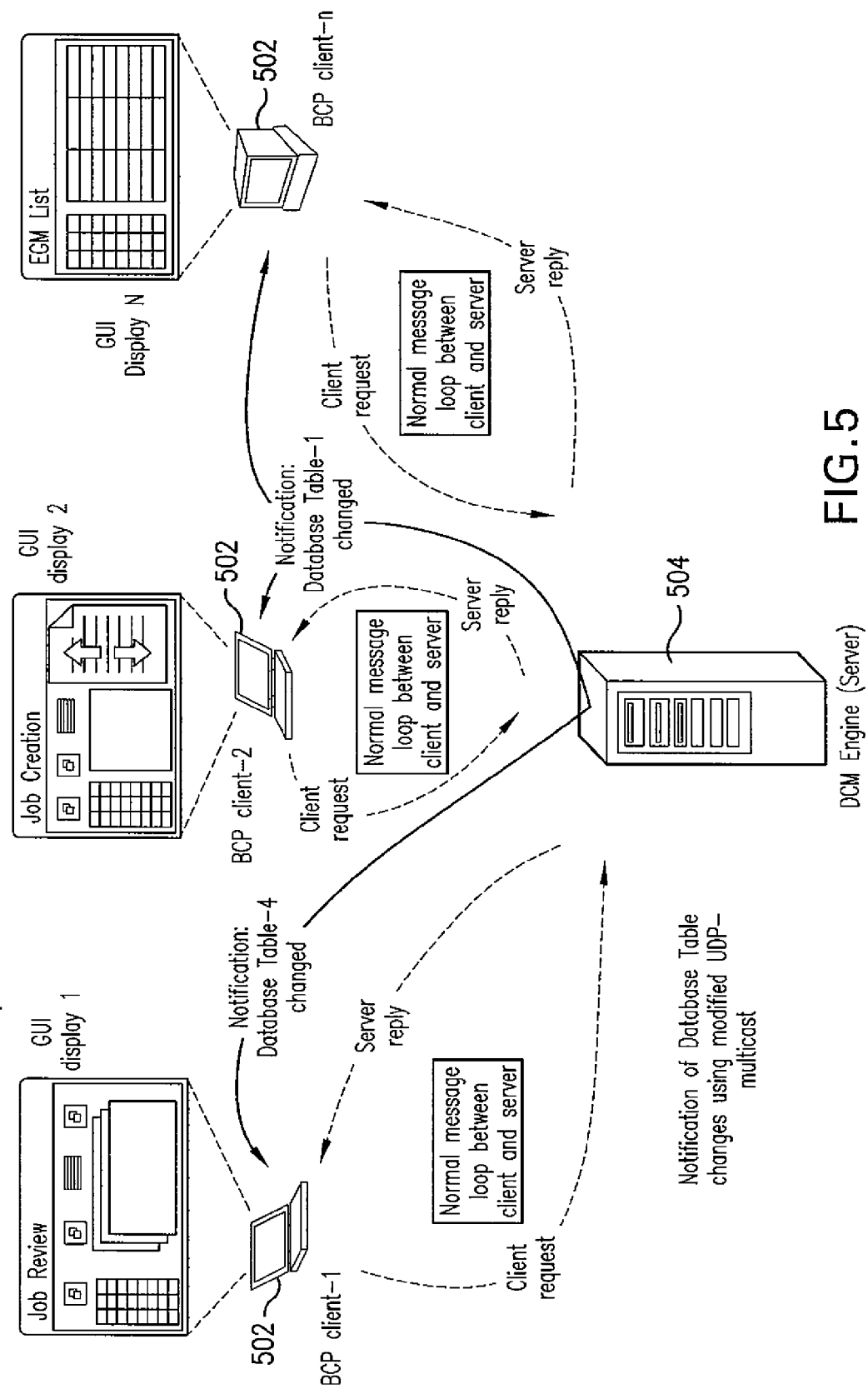
FIG. 5 is a schematic of a notification process within a client-server architecture system with multiple clients according to one nonlimiting embodiment.
Figure 6:
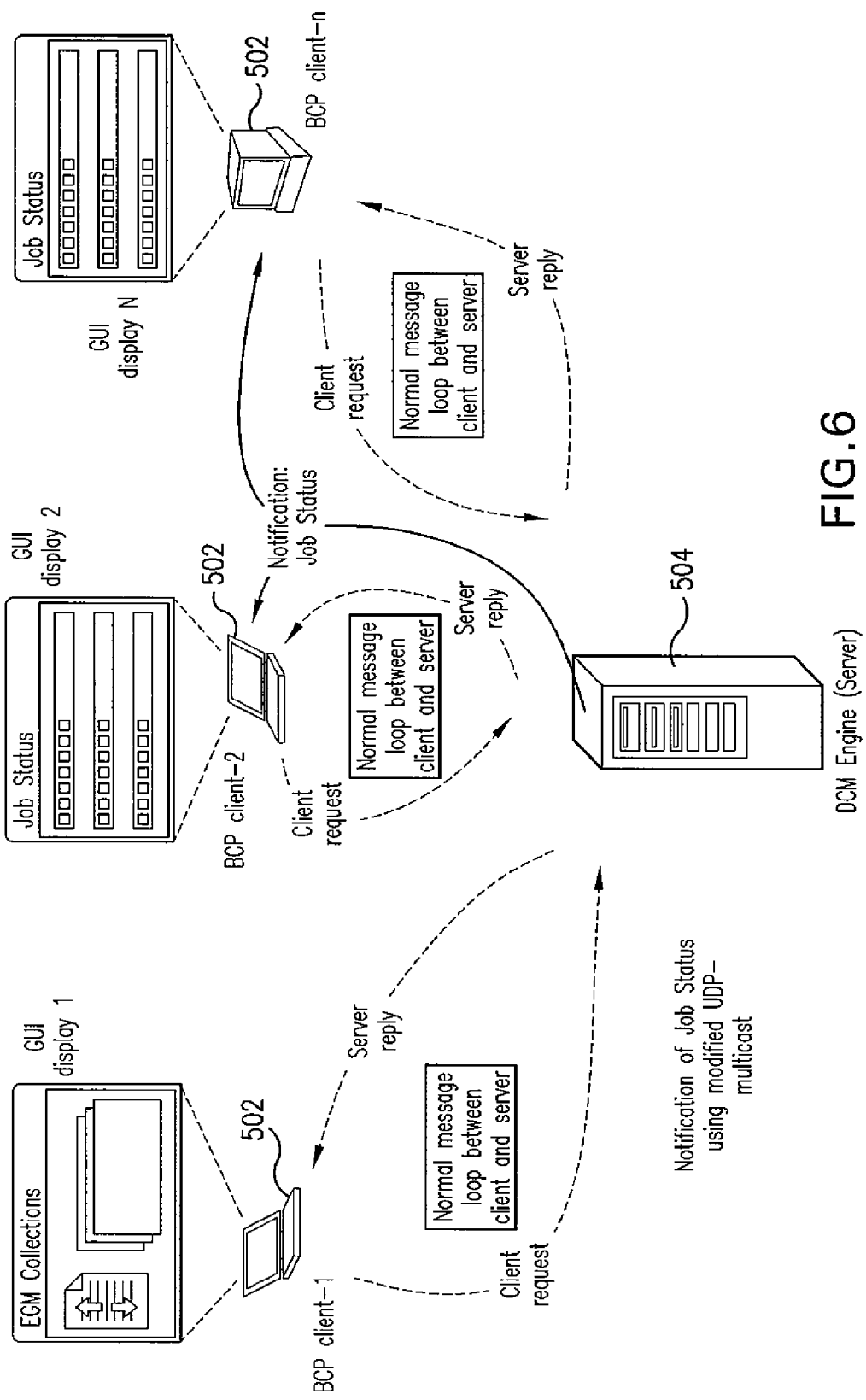
FIG. 6 is a schematic of a notification process within a client-server architecture system with multiple clients according to one nonlimiting embodiment.

FIGS. 5 and 6 show an exemplary client-server system 500 with multiple clients, individually referenced as BCP client 1-*n* and collectively referenced as clients 502, and a server 504 that is configured to respond to client-requests and configured to selectively provide notifications of changes and/or notifications of events and/or status of events. The notifications from the server 504 are not provided to the clients 502 as a direct response to a request from the selected clients. In one embodiment, the server 504 may employ a modified form of a UDP-multicast protocol to implement a one-way notification between the server 504 and one or more clients 504.

Architecture:

FIGS. 5 and 6 show examples of how one-way notification may be implemented according to one non-limiting embodiment. The clients 502 may take a variety of forms such as, but not limited to, a Dell or Sun computer workstation that includes a display, keyboard, and networked operating system software.

Among other things, the server 504 maintains a database storing a plurality of tables. For the sake of clarity, the plurality of tables is described below as including "table-1" and "table-4."

FIG. 5 shows a modified UDP multicast where a change occurred to database table-1 and database table-4. BCP client-1 has registered to receive notifications concerning database table-4, but not database table-1, so a notification message only about database table-4 is sent to BCP client-1. BCP client-2 and client-n have registered to receive notifications about changes to database table-1, but not to database table-4, so a notification message only about database table-1 is sent to BCP client-2 and client-n. FIG. 5 further shows the normal message loop between client and server which is initiated by a client request followed by a server reply.

FIG. 6 shows how the one-way notification may be implemented to send event notifications such as assignment status updates or job status updates to selected clients 502. Each one of the clients 502 has a display and employs a graphical user interface. The display of the BCP client-1 shows an "EGM Collections" GUI, and the respective displays of BCP client-2 and client-n show a "Job Status" GUI. The server 504 is aware of the status of a job being monitored by the BCP client-2 and client-n. Since the "Job Status" GUI is being implemented by BCP client 2 and client-n, the server sends job status notifications to BCP client 2 and client-n. Since the GUI on BCP client-1 does not involve job status, the server 504 does not send job status notifications to BCP client-1.

Figure 7:
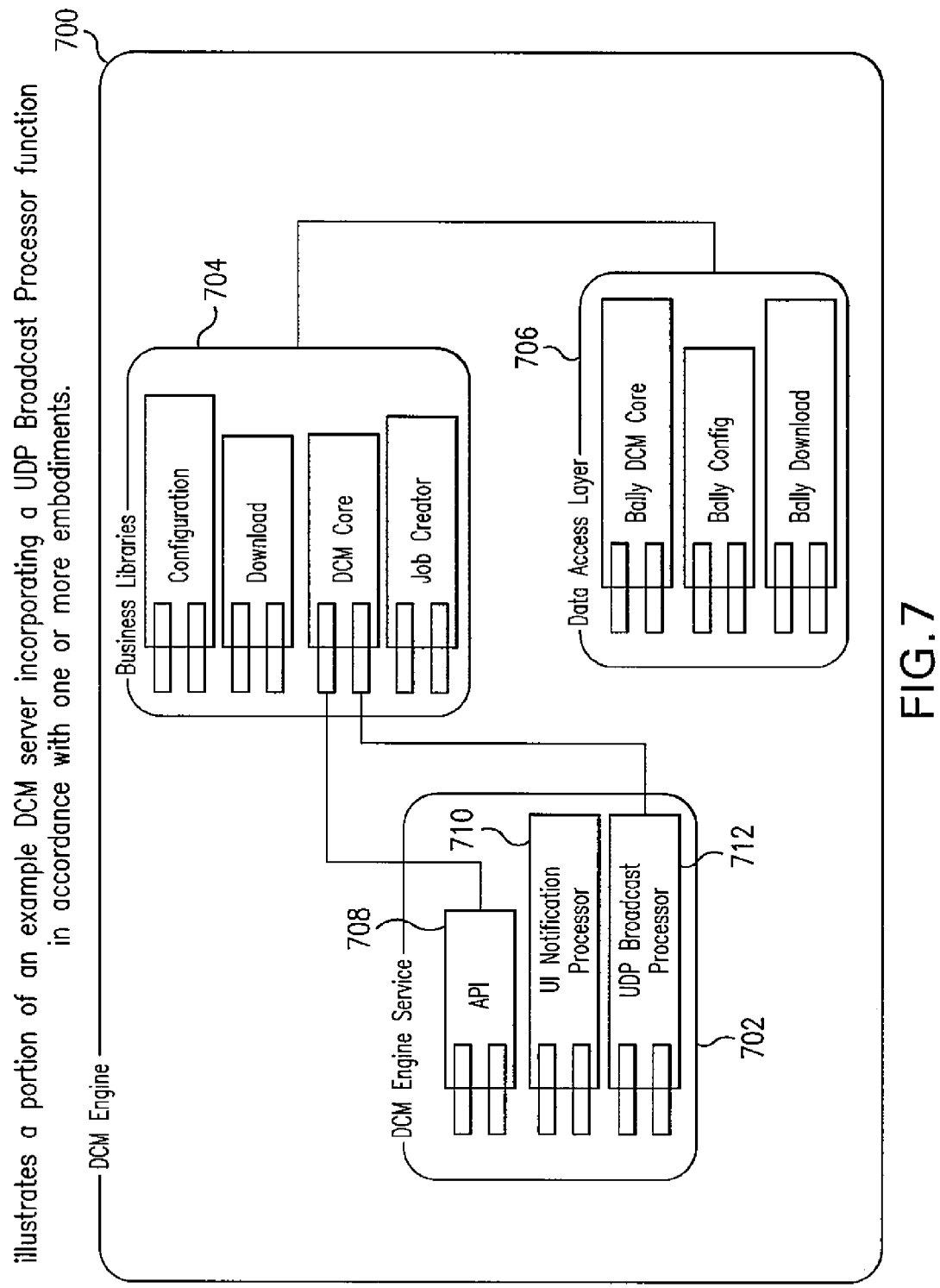
FIG. 7 is a schematic of a DCM server incorporating a UDP Broadcast Processor function according to one nonlimiting embodiment.

FIG. 7 illustrates a portion of an exemplary download and configuration management (DCM) engine 700 that may provide one-way notifications to clients. The DCM engine 700 may employ, among other things, a DCM engine service 702, business libraries 704, and data access layer 706.

The DCM engine service 702 may include an application programming interface suite 708, a user interface (UI) notification processor 710, and a UDP broadcast processor 712. The UDP broadcast processor 712 may be simply one of various components in the DCM engine (server). The UDP broadcast processor 712 may be integrated as part of the DCM server CPU (central processing unit) by including executable UDP broadcast coding performing the functions as described above and utilizing accessible memory for storing information about each client, such as registration information. The UDP broadcast processor 712 may be generally responsible for sending UDP messages to the registered clients in the network. The UDP broadcast processor 712 may send UDP messages to all registered clients which are listening to receive UDP messages on a specific port. This allows one-way, server-to-client(s), communications in what is otherwise a strict client-to-server-to-client architecture.

Figure 8:
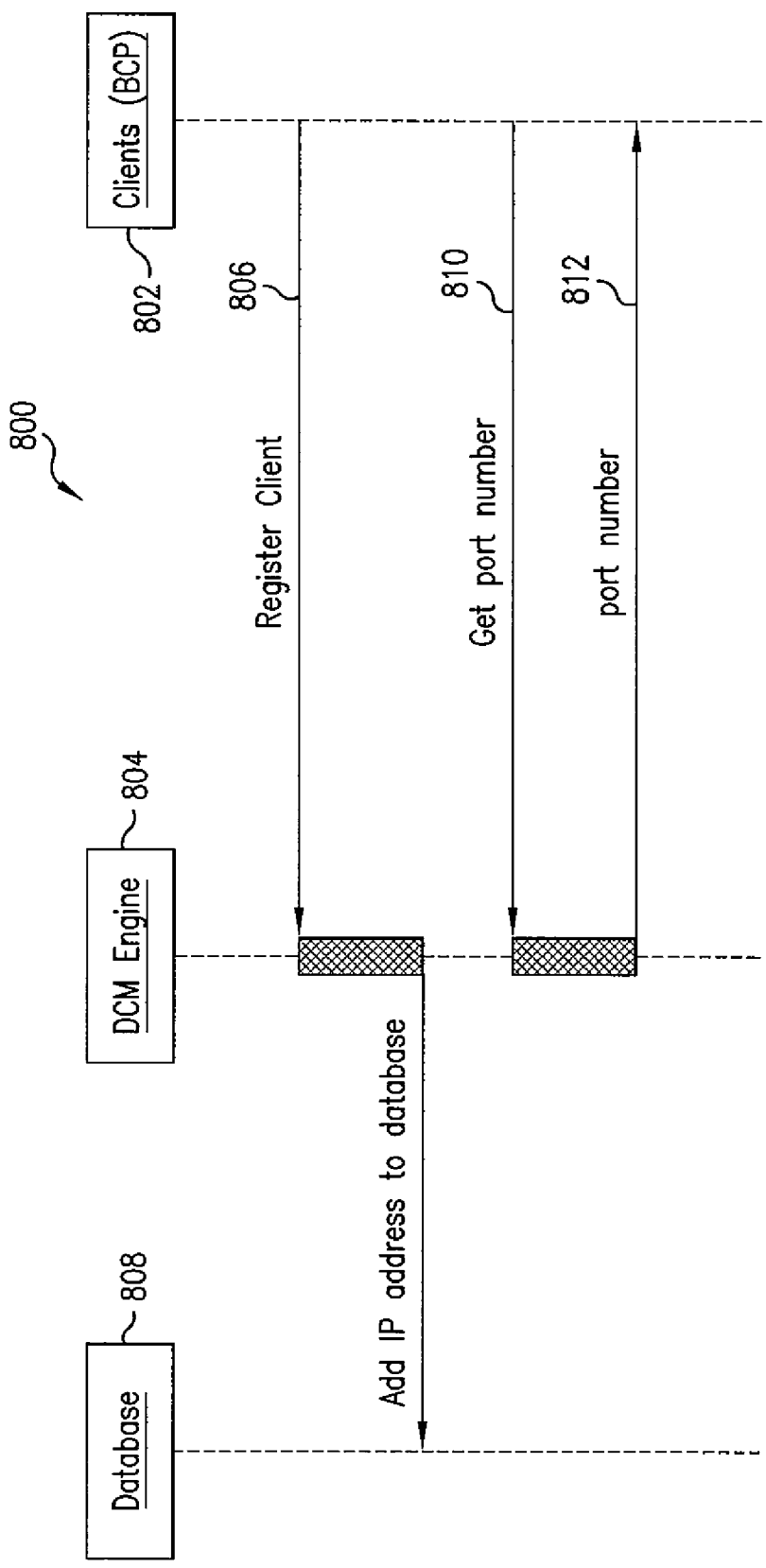
FIG. 8 is a process for registering a client with a DCM Engine according to one nonlimiting embodiment.

FIG. 8 shows a process 800 for registering a client 802 with a DCM Engine 804. The client 802 may be implementing a client-application such as BCP application. The client-application sends a registration request or message 806 to the DCM engine 804. The registration message 806 includes an IP address associated with the client 802. The registration message 806 may also include information indicative of types of notifications to be provided to the client 802.

The DCM engine 804 sends the IP address associated with the client 802 to a database 808, which stores the IP address. The DCM engine 804 may also store in the database 808 information indicative of types of notifications to be provided to the client 802.

The client 802 sends a Port request message 810 to the DCM engine 804. The DCM engine 804 responds to the Port request message 810 by providing the client 804 with a Port number message 812, which includes a port number. The client 802 listens to the port identified by the port number for notifications from the DCM engine 804.

In some embodiments, the client 802 may register with the DCM engine 804 as part of a boot-up or log-in procedure of the client 802. In some embodiments, the client 802 may register with the DCM engine 804 as part as opening/starting an application. In some embodiments, the client 802 may register with the DCM engine 804 at any time. For example, a user of the client 802 might initiate registration of the client 802.

Figure 9:
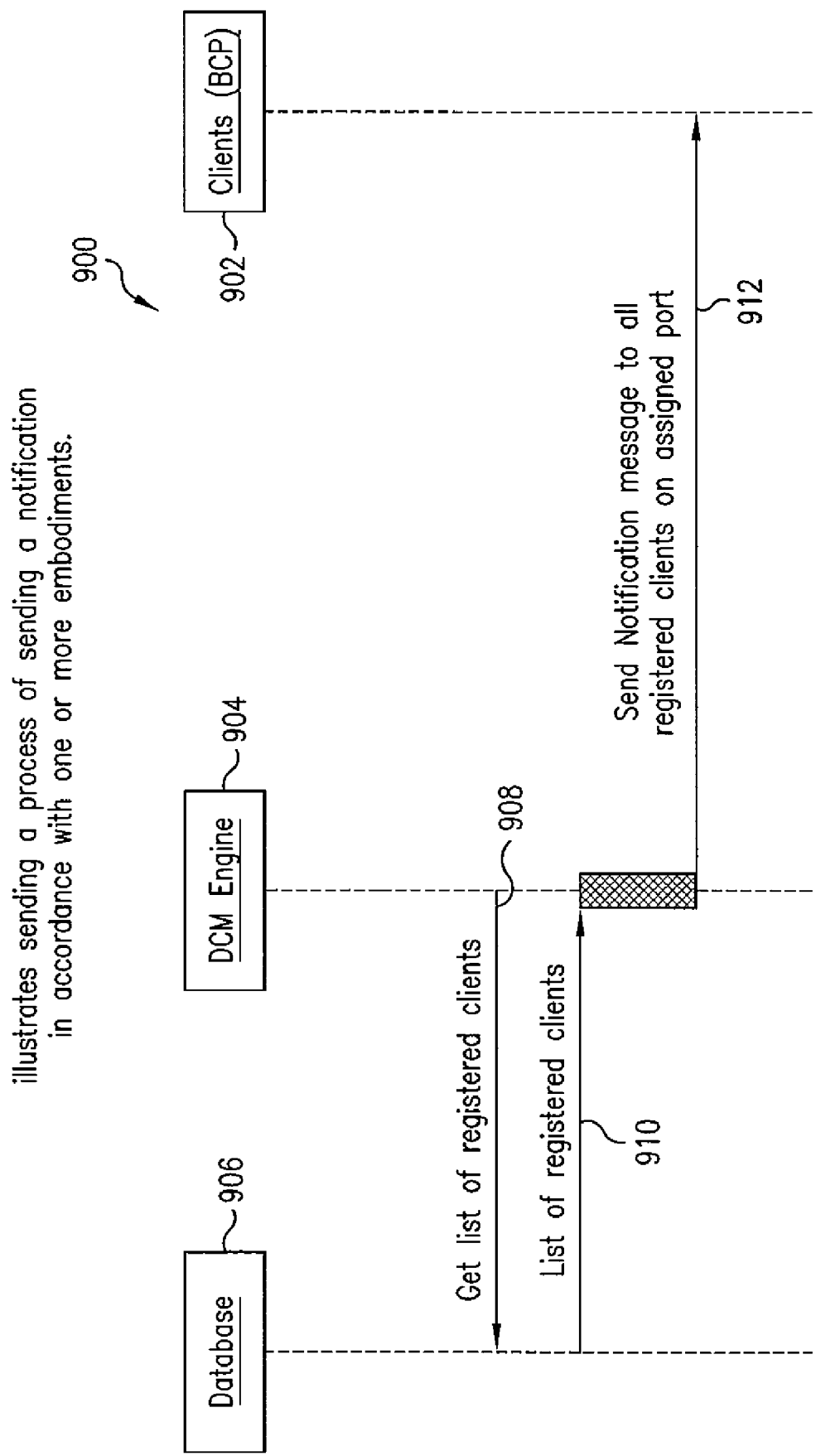
FIG. 9 is a process for a DCM engine to provide notifications to clients according to one nonlimiting embodiment.

FIG. 9 shows a process 900 by which a DCM engine 904 provides notifications to clients 902. The DCM engine 904 sends a request 908 for addresses of registered clients 902 to a database 906. The database 906 sends the addresses 910 of the registered clients 902 to the DCM engine 904. The DCM engine 904 addresses a notification 912 with the addresses of the registered clients 902 and sends the notification 912 to the registered clients 902.

In some embodiments, when the DCM engine 904 wants to send out a notification, the UDP broadcast processor 712 (see FIG. 7) may query the database 906 for a list of clients that have registered for a particular type of notification. The database 904 replies with the list. The UDP broadcast processor then formats and sends the notification to all clients on the list using the assigned port number.

Figure 10:
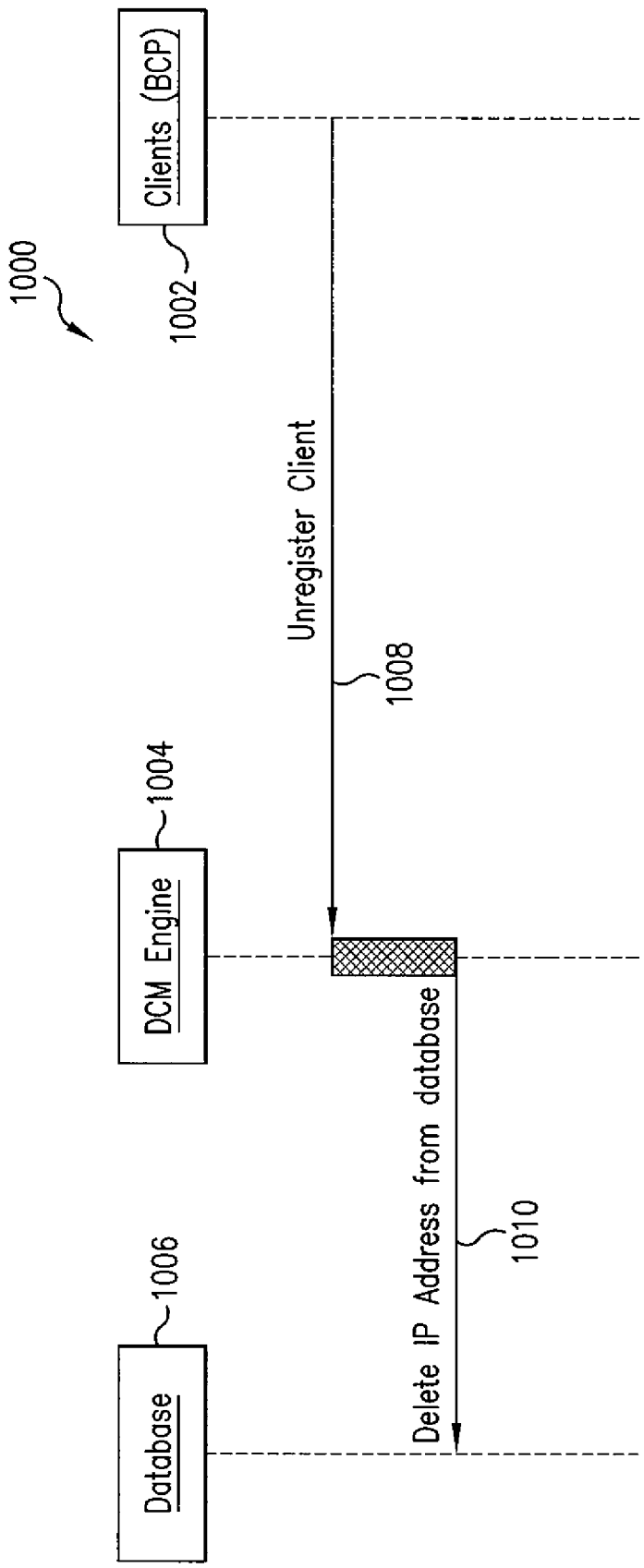
FIG. 10 a process for deregistering a client from a DCM engine according to one nonlimiting embodiment.

FIG. 10 shows a process 1000 of de-registering a registered client 1002. The client 1002 sends an unregister-client request 1008 to a DCM engine 1004. The DCM engine 1004 sends an address delete message 1010 to a database 1006, which deletes an IP address associated with the client 1002 from the database 1006.

In some embodiments, the client 1002 may unregister with the DCM engine 1004 as part of a shut-down or log-out procedure of the client 1002. In some embodiments, the client 1002 may unregister with the DCM engine 1004 as part as closing/ending an application. In some embodiments, the client 1002 may unregister with the DCM engine 1004 at any time. For example, a user of the client 1002 might initiate unregistration of the client 1002.

Example Benefits and Aspects of the modified UDP Broadcast process and mechanism may include:

UDP message may be sent only to the registered clients, not broadcasted to all, which minimizes network traffic;

Enhances system security since only the registered clients receives the UDP message;

Configuration of this system may be easily accomplished without a need to configure network devices in order to support multicast;

Any number of the client machines can be on a different network domain than the DCM engine;

EGM Group Collection Management

In some embodiments, an EGM 306 may be associated with a number of other EGMs 306 to constitute a group of EGMs. In some embodiments, an EGM 306 may belong to any number of groups, and in some embodiments, an EGM group can be assigned to another EGM group allowing for 'nested' collections.

Within the download and configuration management server system 318 (DCM) and a client 500 running an application such as control panel 308, a non-limiting example of which is Bally Control Panel (BCP), a user can associate an EGM 306 with an EGM Collection Group. An EGM group is simply a collection of EGMs. An EGM group can contain other EGM groups, i.e., nested grouping. An EGM can belong to 0 or more EGM groups.

Among other things, the control panel 308 may enable an operator/user of the client 500 and/or control station 320 to:

Create/Modify/Remove an EGM group.

Add/Remove EGMs and EGM collections of an EGM group.

Make a copy of an existing EGM group.

In some embodiments, the download and configuration management server system 318 perform dynamic configuration assignments that may be applied concurrently to respective EGMs of an EGM group, along with dynamic download assignments that may be scheduled independently of the configuration assignments.

For example, a new O/S version download may be scheduled to occur during off-peak hours for Sunday night. A configuration assignment may be scheduled to decrease the payout percentage of the bar top machines during happy hour each day of the week, and a Stars and Stripes configuration can have other configuration changes when a scheduled upcoming tournament is to be sponsored.

All of these assignments may be scheduled and allows for the casino manager to look at his casino from different perspectives and manage the casino effectively.

Figure 11:
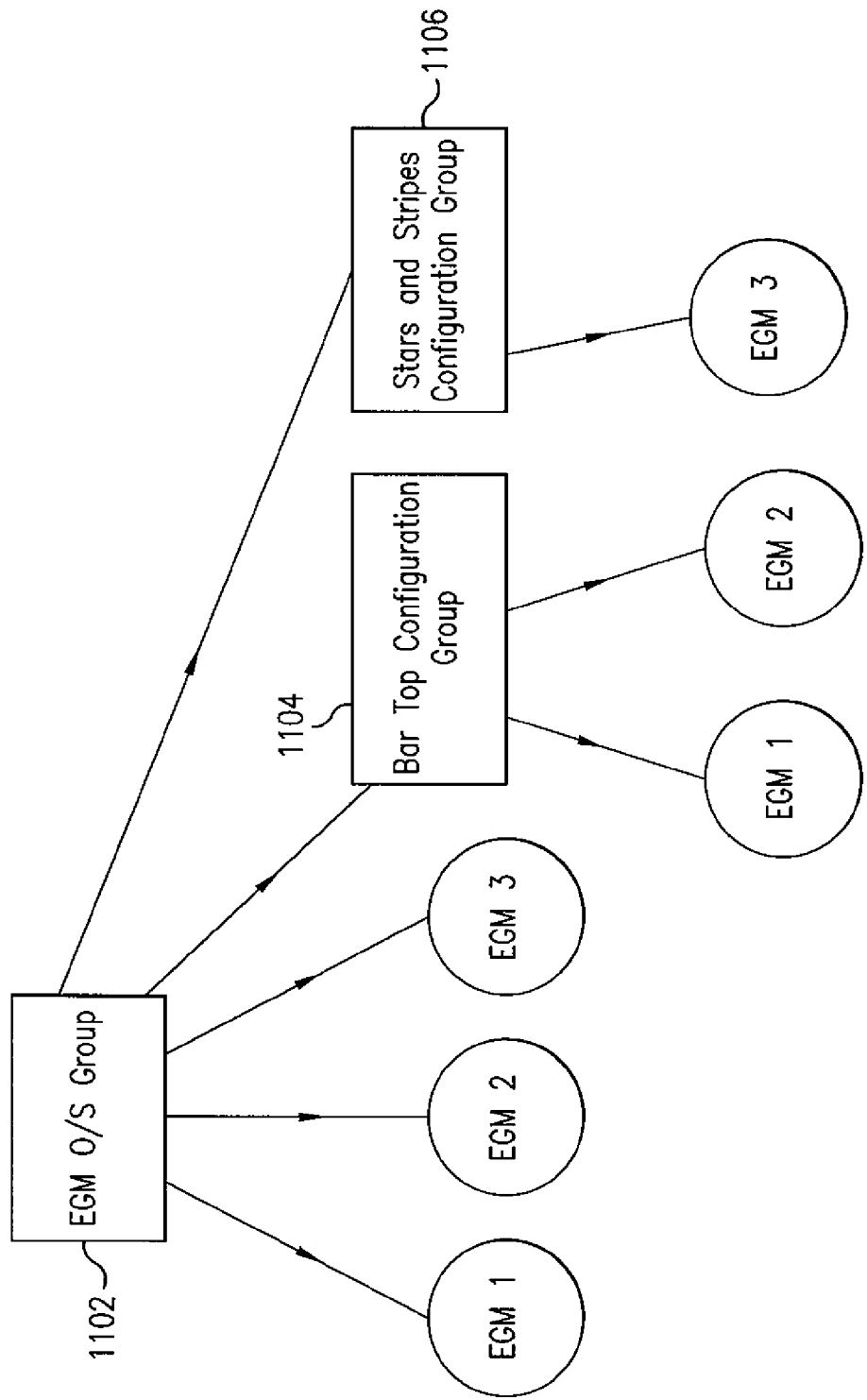
FIG. 11 is a context diagram of associational relationships for a collection of gaming machines according to one nonlimiting embodiment.

Referring to FIG. 11, a collection of gaming machines and grouping or associational relationships is shown. The relationships may be made by including relational coding in the control panel 308, such as a DCM server and a user interface including a display and keyboard. By using conventional relational programming, the features and capabilities of the DCM server may be extended from a single gaming machine or a floor of gaming machines, so that collections and groups of gaming machines may be virtually created. For instance, in FIG. 11, shown by example:

Three EGM collections 1102, 1104, 1106 are generated: one group, EGM O/S group 1102, includes EGM1-EGM3 with the same operating system. Another group, bar top (or counter top) configuration group 1104 includes EGM1 and EGM2 based on casino location, and another group, Star and Stripes group 1106, includes EGM3 based on the game-theme.

EGMs may belong to multiple groups, e.g., EGM1 is part of both the EGM O/S group 1102 and the Bar Top Configuration group 1104.

Nested collections. Both the Bar Top Configuration Group 1104 and Stars and Stripes configuration group 1106 are part of the EGM O/S group 1102.

By selectively grouping, a casino operator can download software specific to gaming machines having a particular operating system (O/S), location on the floor, or game theme, to name a few examples.

Method and system for providing download and configuration job progress tracking and display via host user interface.

Download and configuration capabilities in the gaming environment creates considerable operational challenges. For example, a download may require a considerable volume of gaming content to be transferred over the network. Many casinos are open 24/7, and consequently, some casinos may require a download to take place without disrupting normal gaming activities. In order to not tax the network resources of a casino, a limit on the download bandwidth may be imposed even though doing so may increase the download time. It may not be unusual for some download jobs to take 30 minutes or more. Thus, a way of easily monitoring download progress would be invaluable to casino operators.

A download system may be centralized and "push" the data down to the gaming machines 306. In this case, a content server 390 (see FIG. 3B) pushing the data knows the amount of data that has been downloaded at any time. However, in a "pull" system, where the gaming machines 306 are told where to go for the data and the gaming machines 306 are taking ('pulling') the data from the content server 390, the content server 390 generally does not know the amount of data a given gaming machine 306 has downloaded.

Until recently, the gaming industry has been a collection of proprietary systems and communication protocols. In many cases, a casino had to buy the entire system (games, controllers and backend system) from one company. Most casinos would prefer to use a mix of manufacturers' games on the gaming floor, and then pick the best backend system that suits their needs. Until recently, this was not a realistic expectation.

A few years ago, several gaming entities came together and created the Gaming Standards Association (GSA) in order to define standardized protocols by which games, gaming controllers and backend systems could communicate. The standardized protocols allows interoperability of different manufacturers' equipment, as well as giving casinos freedom to choose whichever manufacturers the casinos want for the various components of a gaming system. One of the GSA protocols is Game-to-System (G2S) protocol, which defines the messages between a gaming machine and a backend system. G2S protocol includes messages for handling software download and configuration of the gaming machines.

Figure 12:
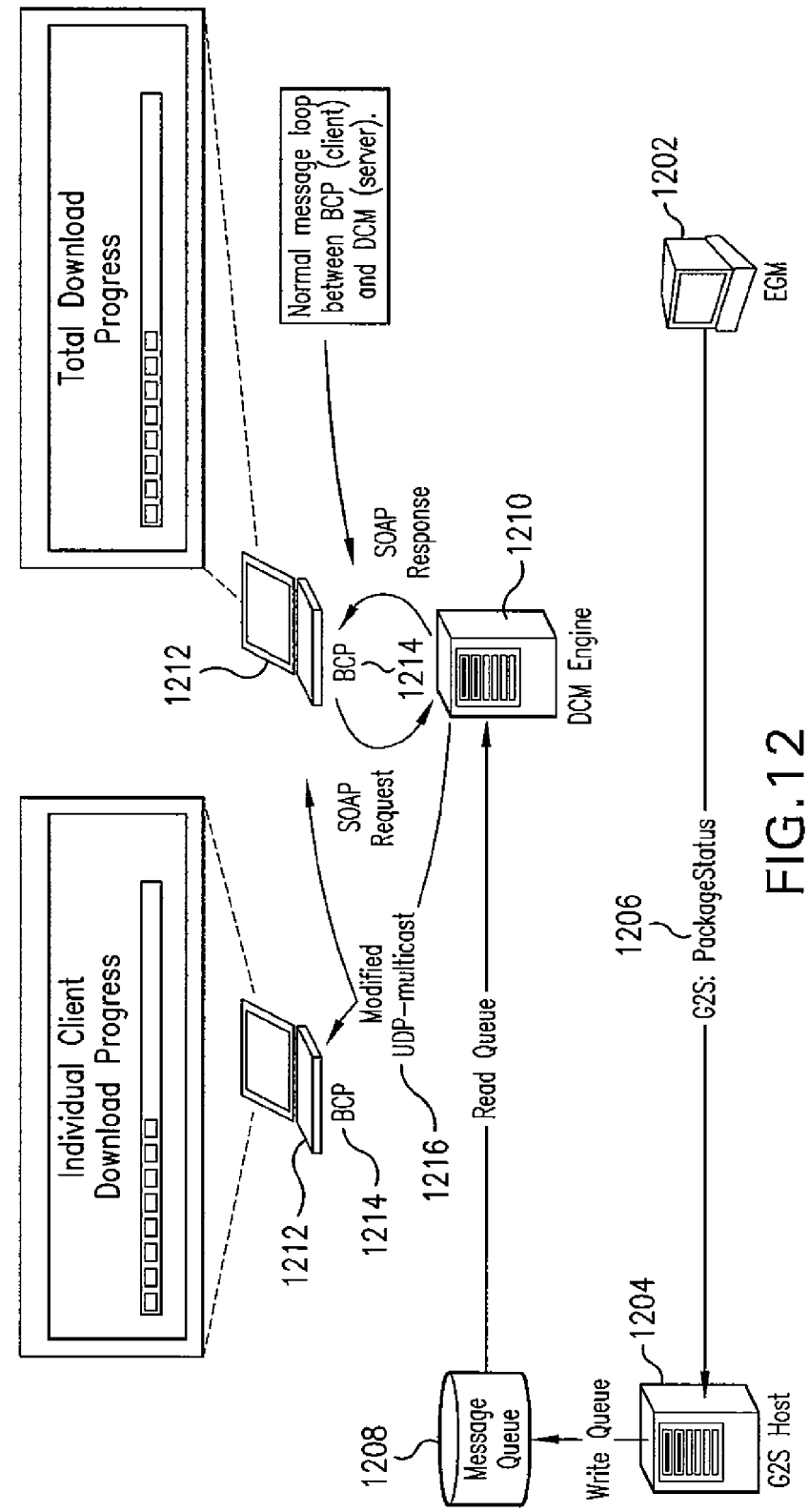
FIG. 12 is a schematic of a portion of a download and configuration system that provides progress that is displayed to clients according to one nonlimiting embodiment.

FIG. 12 shows various components of a download and configuration system 1200, such as a Bally Download and Configuration system, according to one embodiment. The download and configuration system 1200 includes at least one EGM 1202 that is communicatively coupled to a G2S Host 1204.

The download and configuration system 1200 uses standard G2S protocols and messages. The EGM 1202 may convey information such as download progress information to the G2S Host 1204 using G2S messages 1206. For example, the EGM 1202 may use the G2S 'packageStatus' message to convey download progress information.

The G2S Host 1204 may provide messages 1206 form the EGM 1202 to a message queue 1208, which provides the messages to a download and configuration manager (DCM) engine 1210. The download and configuration manager (DCM) engine 1210 read messages 1206 from the message queue 1208 and processes them. The aforementioned communication chain, from the EGM 1202 to the DCM engine 1210, may be implemented using message structure and protocol conforming to standard G2S and standard Microsoft Message Queues (MSMQs).

The download and configuration system 1200 further includes a plurality of communication devices 1212 which may be embodied in computing devices, computer systems, desktop computer, laptop computers, etc. The communication devices 1212 may communicate with the DCM engine 1210 and may implement logic modules, executable instructions, software, etc., that provide a user interface such as a graphical user interface. In some embodiments, the communication devices 1212 and the DCM engine 1210 may have a client-server architecture, where the communication devices 1212 may implement a client-application such as a Bally Control Panel 1214 client-application 1212 that provides, among other things, a graphical user interface.

In a client-server architecture, communications between a Bally Control Panel (BCP) client-application 1214 and the DCM engine 1210 are typically via a standard communication protocol, such as simple object access protocol (SOAP), which is a true client-server architecture where a server never initiates any communication. Therefore, information (like job progress info) that needs to be asynchronously sent to the BCP client-application 1214 cannot be sent via the normal communication channel. In some embodiments, the BCP client-application 1214 may poll the DCM engine 1210 for any possible notification messages. However, polling is inefficient.

In some embodiments, the download and configuration system 1200 is configured to allow for one-way messages from the DCM engine 1210 to the BCP client-application 1214 of the communication devices 1212. The DCM engine 1210 may include a broadcast processor such as the UDP broadcast processor 712 (see FIG. 7) to facilitate one-way messages from the DCM engine 1210 to the BCP client-application 1214 of the communication devices 1210. The DCM engine 1210 may provide registered clients with one-way messages 1216, which may conform to a UDP-multicast message.

In one embodiment, a download progress protocol used between the DCM message engine and other backend applications and/or system 'components'. The packageStatus message is converted into a proprietary one and given to the UDP broadcast processor 712 (see FIG. 7) of the DCM engine 1210 for distribution to the Bally Control Panel (BCP) applications 1214 that have registered with the UDP broadcast processor 712 to receive download/configuration progress notification messages. The UDP Broadcast Processor 712 uses a modified form of UDP-multicast for distributing the notification messages 1216 to the BCP client(s). This is not a true broadcast to all devices on the network which helps to minimize the bandwidth used to notify clients.

This feature provides the ability to view the percentage download progress in the Host UI (part of BCP) using a messaging scheme which overcomes the BCP-initiated protocol used for all other messaging between BCP and DCM (Client-Server). The Host UI displays the progress bar based on the percentage download communicated from the gaming device (downloading entity) to the DCM engine. All downloading gaming devices may also send a 'download complete' message. This information can also be used by the DCM and BCP to estimate future download time and bandwidth requirements.

A method for validating a download or configuration assignment for an EGM or EGM collection.

Figure 13:
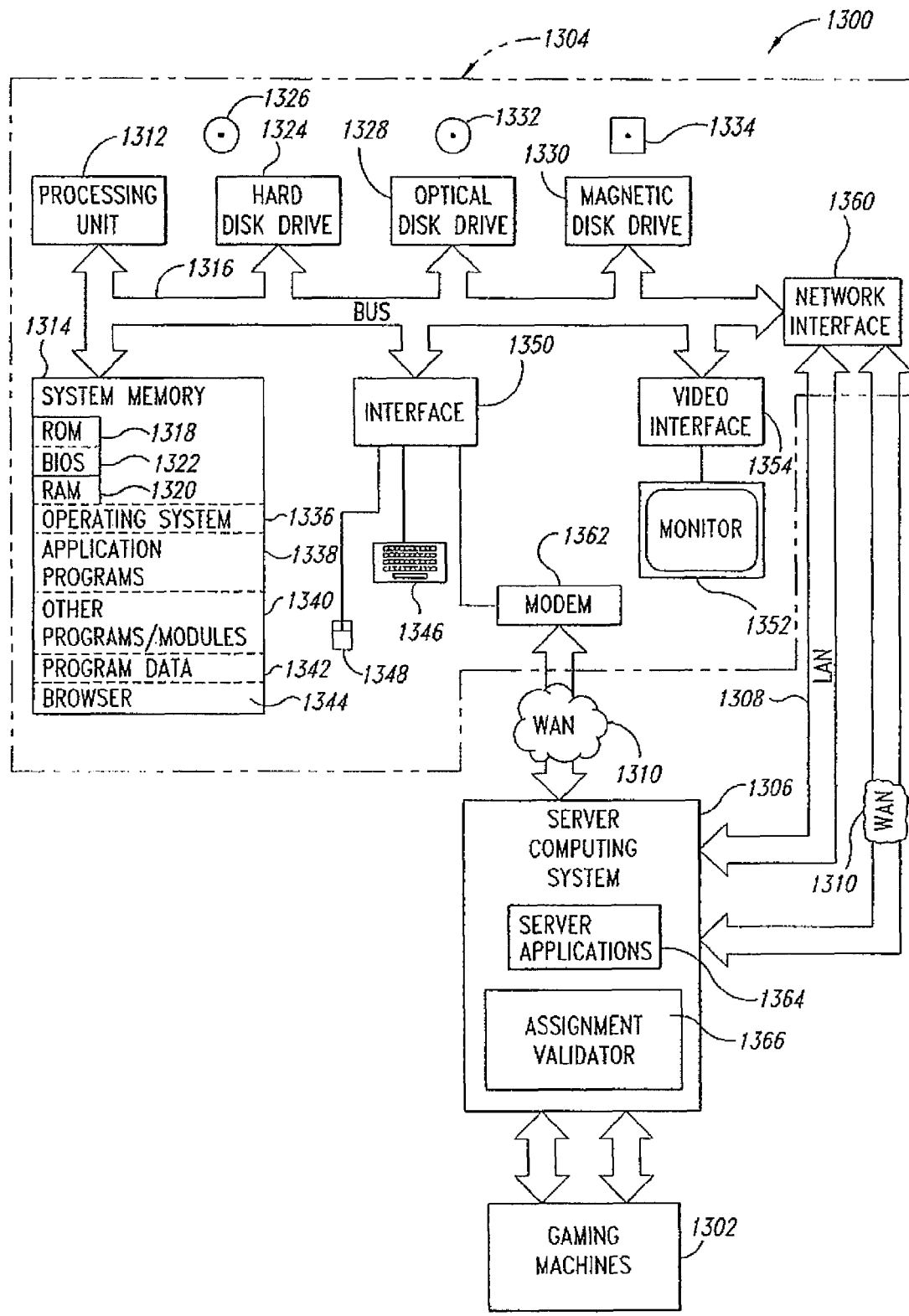
FIG. 13 is a schematic of a gaming environment according to one nonlimiting embodiment.

FIG. 13 and the following discussion provide a brief, general description of a suitable gaming environment 1300 in which the various illustrated embodiments may be implemented. Although not required, the embodiments will be described in the general context of computer-executable instructions, such as program application modules, objects, or macros being executed by a computer. Those skilled in the relevant art will appreciate that the illustrated embodiments as well as other embodiments may be practiced with other computer system configurations, including hand-held devices, multiprocessor systems, microprocessor-based or programmable consumer electronics, personal computers ("PCs"), network PCs, mini computers, mainframe computers, and the like. The embodiments may be practiced in distributed computing environments where tasks or modules are performed by remote processing devices, which are linked through a communications network. In a distributed computing environment, program modules may be located in both local and remote memory storage devices.

FIG. 13 shows the gaming environment 1300 comprising one or more gaming machines 1302, one or more gaming environment controllers 1304, and/or server computing systems 1306 coupled by one or more communications channels, for example one or more local area networks (LANs) 1308 or wide area networks (WANs) 1310. The gaming environment 1300 may employ other computers, such as conventional personal computers, where the size or scale of the system allows.

The gaming environment controller 1304 may take the form of a conventional mainframe or mini-computer that includes a processing unit 1312, a system memory 1314 and a system bus 1316 that couples various system components including the system memory 1314 to the processing unit 1312. The gaming environment controller 1304 will at times be referred to in the singular herein, but this is not intended to limit the embodiments to a single computing system since in typical embodiments, there will be more than one computing system or other device involved. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 1312 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 13 are of conventional design. As a result, such blocks need not be described in further detail herein, as they will be understood by those skilled in the relevant art.

The system bus 1316 can employ any known bus structures or architectures, including a memory bus with memory controller, a peripheral bus, and a local bus.

The system memory 1314 includes read-only memory ("ROM") 1318 and random access memory ("RAM") 1320. A basic input/output system ("BIOS") 1322, which can form part of the ROM 1318, contains basic routines that help transfer information between elements within the gaming environment controller 1304, such as during start-up.

The gaming environment controller 1304 also includes a hard disk drive 1324 for reading from and writing to a hard disk 1326, and an optical disk drive 1328 and a magnetic disk drive 1330 for reading from and writing to removable optical disks 1332 and magnetic disks 1334, respectively. The optical disk 1332 can be a CD-ROM, while the magnetic disk 1334 can be a magnetic floppy disk or diskette. The hard disk drive 1324, optical disk drive 1328 and magnetic disk drive 1330 communicate with the processing unit 1312 via the system bus 1316. The hard disk drive 1324, optical disk drive 1328 and magnetic disk drive 1330 may include interfaces or controllers (not shown) coupled between such drives and the system bus 1316, as is known by those skilled in the relevant art. The drives 1324, 1328 and 1330, and their associated computer-readable media 1326, 1332, 1334, provide nonvolatile storage of computer readable instructions, data structures, program modules and other data for the gaming environment controller 1304. Although the depicted gaming environment controller 1304 employs hard disk 1324, optical disk 1328 and magnetic disk 1330, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Logic modules such as program modules, applications, etc. can be stored in the system memory 1314, such as an operating system 1336, one or more application programs 1338 such as a control panel application and/or download and configuration applications including assignment scheduling and management and application assignment templates, etc. Logic modules such as program modules, applications, etc. can be stored in the other programs or modules 1340 and program data 1342. The system memory 1314 may also include communications programs, for example, player access logic 1344. The player access logic 1344 may allow a player to access a virtual game-entertainment environment via a communication network. For example, in some embodiments, a player may use a Web client such as a commercially available browser. Non-limiting examples of commercially available browsers include Mozilla Firefox developed by Mozilla Foundation based in Mountain View, Calif., USA, Safari developed by Apple Inc. based in Cupertino, Calif., USA., and Internet Explore by Microsoft Corp. based in Redmond, Wash., USA.

While shown in FIG. 13 as being stored in the system memory 1314, the operating system 1336, application programs 1338, other programs/modules 1340, program data 1342 and player access logic 1344 can be stored on the hard disk 1326 of the hard disk drive 1324, the optical disk 1332 of the optical disk drive 1328 and/or the magnetic disk 1334 of the magnetic disk drive 1330.

An operator, such as casino personnel, can enter commands and information into the gaming environment controller 1304 through input devices such as a touch screen or keyboard 1346 and/or a pointing device such as a mouse 1348. Other input devices can include a microphone, joystick, game pad, tablet, scanner, etc. These and other input devices are connected to the processing unit 1312 through an interface 1350 such as a serial port interface that couples to the system bus 1316, although other interfaces such as a parallel port, a game port, a wireless interface, or a universal serial bus ("USB") can be used. A monitor 1352 or other display device is coupled to the system bus 1316 via a video interface 1354, such as a video adapter. The gaming environment controller 1304 can include other output devices, such as speakers, printers, etc.

The gaming environment controller 1304 can operate in a networked environment using logical connections to one or more remote computers and/or devices, for example, the server computing system 1306. The server computing system 1306 can be another personal computer, a server, another type of computer, or a collection of more than one computer communicatively linked together and typically includes many or all of the elements described above for the gaming environment controller 1304. The server computing system 1306 is logically connected to one or more of the gaming environment controllers 1304 under any known method of permitting computers to communicate, for example, through one or more LANs 1308 and/or WANs 1310 such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a LAN networking environment, the gaming environment controller 1304 is connected to the LAN 1308 through an adapter or network interface 1360 (communicatively linked to the system bus 1316). When used in a WAN networking environment, the gaming environment controller 1304 may include a modem 1362 or other device, such as the network interface 1360, for establishing communications over the WAN 1310. The modem 1362 is shown in FIG. 13 as communicatively linked between the interface 1350 and the WAN 1310.

In a networked environment, program modules, application programs, data, or portions thereof, can be stored in the server computing system 1306. In the depicted embodiment, the gaming environment controller 1304 is communicatively linked to the server computing system 1306 through the LANs 1308 and/or WAN 1310, for example with TCP/IP middle layer network protocols. However, other similar network protocol layers are used in other embodiments, such as User Datagram Protocol ("UDP"). Those skilled in the relevant art will readily recognize that the network connections shown in FIG. 13 are only some examples of establishing communication links between computers, and other links may be used, including wireless links.

The server computing system 1306 includes server applications 1364 for the routing of instructions, programs, data and agents between the gaming machines 1302 and the gaming environment controller 1304. For example the server applications 1364 may include conventional server applications such as WINDOWS NT 13.0 Server, and/or WINDOWS 2000 Server, available from Microsoft Corporation in Redmond, Wash. Additionally, or alternatively, the server applications 1364 can include any of a number of commercially available Web servers, such as INTERNET INFORMATION SERVICE from Microsoft Corporation and/or IPLANET from Netscape/America On Line (AOL). The server applications 1364 may include applications for interfacing with a control panel application. The server applications 1364 may also include applications for downloading applications, structured data, data, etc. to gaming machines 1302. The server applications 1364 may also include applications for configuring gaming machines 1302 such as by setting various operational parameters of the gaming machines 1302.

The server computing system 1306 may also include an assignment validator 1366. Among other things, the assignment validator 1366 may comprise an ordered listing of executable instructions for implementing logical functions. In particular, the assignment validator 1366 may include logic for, among other things, validating a download assignment and/or validating a configuration assignment. In other embodiments, the assignment validator may comprise an ordered listing of executable instructions for implementing logical functions and may be implemented at gaming environment controller 1304.

The gaming machines 1302 may include game stations (not shown) such as, but not limited to, one or more electronic gaming machines, poker tables, one or more blackjack tables, roulette tables, keno tables, craps tables, etc. The gaming machines 1302 may include one or more sensors, detectors, input devices, output devices, actuators, and/or controllers such as programmed a microprocessor, DSP, ASIC and/or Field Programmable Gate Array (FPGA) or the like. The controllers may execute one or more gaming applications.

In some embodiments, a casino, a manager may schedule when assignments such as, but not limited to, download assignments and/or configuration assignments occur. Any number of assignments may be applied to an EGM or gaming machine 1302. With this flexibility comes a potential for sending conflicting or contradictory assignments.

An example would be that a bank of gaming machines 1302 may be scheduled to receive a new game theme to add to the list of games a player can choose from. However, the new game theme may require that the gaming machines 1302 also contain a specific version of the O/S in order to support the new game theme. The assignment validator 1366 may, among other things, validate the download assignment of the new game theme and may provide an indication of whether the game theme requires an O/S download that has not yet been scheduled.

The assignment validator 1366 saves the casino manager the headache of downloading code that would not be able to either install and/or execute correctly once installed.

The assignment validator 1366 helps the casino manager/user plan configurations of the gaming machines 1302.

The assignment validator 1366 may validate a download assignment and/or may validate a configuration assignment.

Download Assignment Validation:

The assignment validator 1366 validates a download assignment and calculates the chances of its success based on the current information. The assignment validator 1366 verifies if the download assignment before the download assignment commences downloading to the gaming machines 1302. The assignment validator 1366 verifies whether the download assignment will apply the changes successfully on the gaming machines 1302 at the execution time of the download assignment. In addition, the assignment validator 1366 may inform the user about any reasons that would cause download assignment to fail. Validation checks that may be performed for download assignments may include:

Checks if any download or install assignments are scheduled to occur at the same time. If scheduled, ensure that they are spaced well apart from each other so that they complete.

Checks if any configuration assignments are scheduled at the same time. If scheduled, ensure that they are spaced well apart from each other so that they completed.

Check if any configuration assignments are scheduled to run after the download and install to make the gaming machines 1302 playable.

Configuration Assignment Validation:

The assignment validator 1366 validates a configuration assignment and may calculate, based at least on the current information, the chances of success of the configuration assignment. The assignment validator 1366 may verify whether the configuration assignment will successfully apply changes on the gaming machines 1302 at the execution time of the configuration assignment. The assignment validator 1366 may inform the user about any reasons that would cause the configuration assignment to fail. Validation checks that may be performed for configurations assignments may include:

Checks if the options selected and their associated values in assignment apply to the selected gaming machines 1302.

If the configuration assignment is a game definition assignment and a game theme change, then check if the download and installation of the new game is scheduled to complete before the configuration assignment.

Check if there is any conflicting configuration or download assignments currently scheduled to run at the same time for the gaming machine 1302.

With (in some cases), thousands of possible configuration options that may be modified and the way a casino manager may want to "manage" their floor, the potential for conflicting configurations may frequently occur. The assignment validator 1366 helps the manager in planning floor configurations.

Profile Driven Device Configuration

Gaming machine configuration changes such as denomination, reel speed, game volume, wagers per line and number of available lines and content download changes may be occur on a pre-defined time based schedule, called a profile. A user such as slot manager or other authorized personnel may use a control panel 308 (See FIG. 3) to, among other things, select a gaming machine 306 that is to be changed, select the configuration or content that should be changed, select the values for the configuration or the game theme to be changed, and the time and date profile for the change(s). The user may also use the control panel 308 to submit an assignment with the profile to a server, which may then implement that profile driven set of changes. A profile driven configuration change assignment or instruction set may include a schedule and a set of machines assigned to that schedule.

For example, a slot manager may want to eliminate all penny and nickel denominations from games every Friday night at 5 pm and then add back the nickel denominations on Saturday morning at 9 am but continue to eliminate all penny denominations. The slot manager would create a time based profile that would affect that change precisely at 5 P.M. on every Friday and at 9 A.M. on Saturday. This profile could be created and implemented in advance for one or more machines and then set to run.

Technical Challenges

In a typical casino, there may be several technical and operational challenges to be overcome for creating a configuration change profile that may be executed a wide variety of device types.

First, the user might not be able set absolute values for configuration changes when some gaming machines or devices handle or implement the configuration change in different ways. For example, if the user wants to set the reel spin speed on a gaming machine to a low reel speed; that configuration setting value may be completely different on a Bally machine compared to an IGT machine. A Bally machine may have a scale of 1-5 for reel speed with 1 being slow and 5 being fast compared to an IGT machine that has a scale of 1-10 with 1 being slow and 10 being fast. Instructing the system to change the reel speed to high across all machines on the floor would require a different configuration value for reel speed on a Bally machine and an IGT machine.

Most of the profile driven changes may instruct the machine to change to a specific value that corresponds to a low, medium or high setting. In some embodiments, profile driven changes may instruct the machine to change to a relative value such as a low, medium or high setting, and the machine may translate the relative value to a specific value such as "3". In some embodiments, profile driven changes may instruct the machine to change to a relative value such as a low, medium or high setting, and the machine may retrieve a specific value corresponding to the relative value from a database.

Second, because, in a typical casino, there are different machines from different manufacturers on the floor, and each machine may use a different scale or value range for some configurable options and the type of machine or its settings may have changed between the time the profile was created and the change occurs, then, in some embodiments, the machine is interrogated for the machine's current configuration at the time of the configuration change. Interrogation at or near the time of the configuration change is one way of learning how to make the change in the correct way; by knowing exactly how the machine is configured at the time of the change. Thus, the system may be able to provide a dynamic machine "inventory" at the time that a configuration change is to occur.

Third, there may be a table such as a lookup table or translation table for each game theme/manufacturer that correlates the defined generic gaming machine settings such as low, medium and high settings to a specific gaming machine setting value.

For example, in the case of setting reel speed, a profile driven configuration change may show a generic gaming machine setting of low, medium or high over a time period for one or more gaming machines. These gaming machines may be from a combination of different manufacturers that have a different setting value corresponding to a medium reel speed. When the system implements a profile driven configuration change, the system may interrogate the gaming machines to determine, among other things, the respective manufacturer and the respective game theme for each of the interrogated gaming machines. In some embodiments, based at least on knowledge of the manufacturer of a respective gaming machine system, the system may refer to a lookup table (all in real-time) and lookup a reel speed value corresponding to the desired generic gaming machine setting for medium reel speed.

As another example, a user may want to configure one or more of the gaming machines to have a high reel speed on Friday nights. On one Friday night, a gaming machine may have a first game theme such as a Bally Winning Times game, and then on next Friday night, the gaming machine may have a second game theme such as a Bally Fixin' 2 Win game, where the first and the second game themes have different respective reel speed value ranges. By interrogating the gaming machine before reconfiguring the gaming machine, the system may know the current game theme of the gaming machine, and thereby determine the appropriate specific gaming machine setting value that corresponds to the desired generic gaming machine setting.

Market

A profile driven configuration change may work on a variety of games in the casino or arcade market for class 2 or 3, lottery or central determination.

Profile Driven Device Configurations in a Command and Control System

Figure 16:
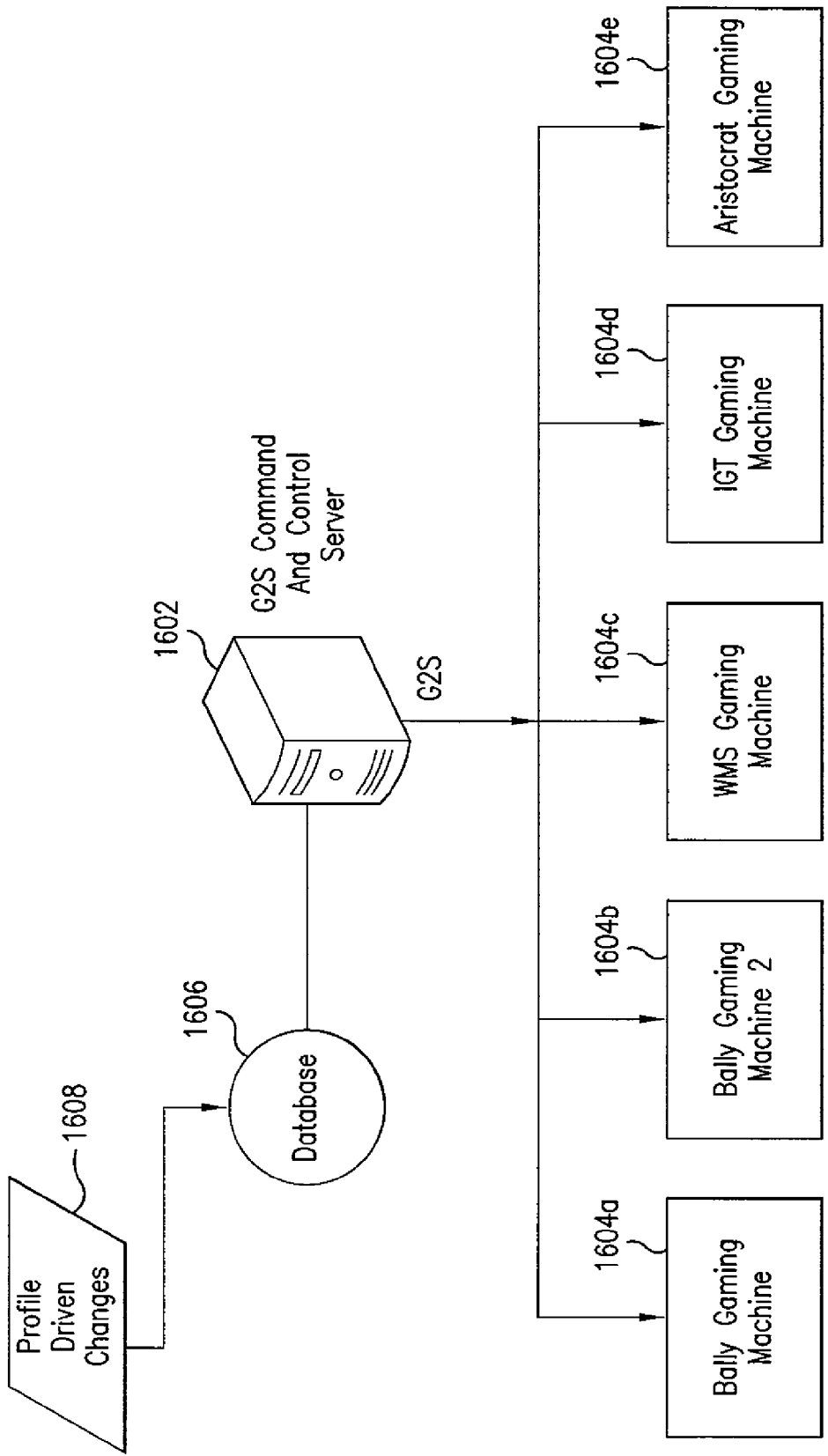
FIG. 16 is a schematic of a command and control server in a gaming environment according to one nonlimiting embodiment.

Referring to FIG. 16, a command and control server 1602 is communicatively coupled to a plurality of gaming machines, individually referenced as 1604*a*-1604*e* and collectively referenced as 1604. The command and control server 1602 is communicatively coupled to a database 1606, which stores a number of profiles 1608 and may also store a number of lookup tables associating gaming machines and values of specific operational parameters to generic settings that may have a relative value.

A casino having a command and control server 1602, which may also include or be embodied in a download and configuration server system, may desire to implement profile driven gaming machines (or other devices) configurations. Among other things, the command and control server 1602 may implement profile driven gaming machines configurations based at least on knowledge of one or more of the following:

1. A profile that defines a configuration value/level over time.
2. A definition of the configuration value that is to be set.
3. A means of knowing the current configuration of the machine that is to be changed.

Time Based Configuration Change Profile

Figure 14A:
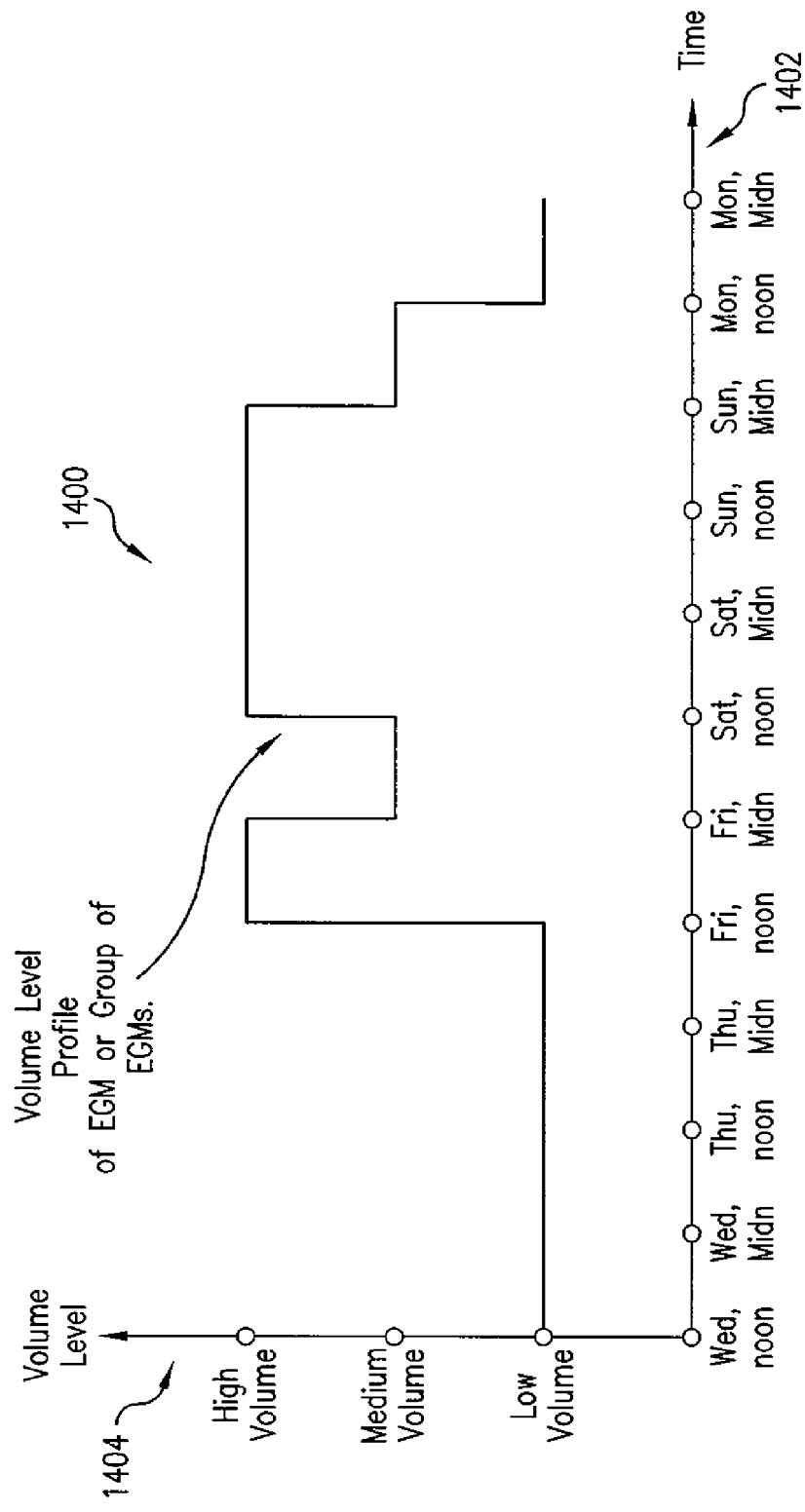
FIG. 14A is a graph of a volume profile according to one nonlimiting embodiment.

FIG. 14A shows an exemplary volume profile 1400 that could be assigned to one or more gaming devices including electronic gaming machines 1604, player interface units 310 such as, but not limited to, commercially available iView displays, signage displays, kiosks, audio systems, etc.

The volume profile 1400 has a horizontal axis 1402 and a vertical axis 1404. The horizontal axis 1402 is in units of time, in this case a unit represents twelve hours. The temporal length of the volume profile 1400 may be set a determined value, in this case a five and one-half days are shown, from Wednesday at noon to Monday at midnight. Also, the duration of any setting can be set to a predetermined length, where durations of different settings may be the same or different.

The vertical axis 1404 shows the value of the generic gaming machine setting that is to be set on the gaming machines relative to time. The vertical axis 1404 is in units of generic gaming machine setting for audible volume, which are low volume, medium volume, and high volume. While the range of the vertical axis 1404 is over three units of generic gaming machine settings in volume profile 1400, other profiles may have wider or smaller ranges corresponding to more or fewer units of generic gaming machine settings, respectively.

It should be noted that the values of the generic gaming machine setting are not specific values such as a specific number like 3. Instead, the values of the generic gaming machine setting are relative values such as low, medium or high level. This is done because each gaming machine or game theme can have a different definition of low volume. For example, a Bally machine has a volume scale of 0-10. An IGT machine might have a volume scale of 0-100 and the command and control system would need to know what to set the volume to when instructed to set the volume to low based on what is on the machine when the change is due to occur.

FIG. 14B shows another exemplary minimum-wager profile 1410 that could be assigned to one or more gaming devices including electronic gaming machines, player interface units 310 such as, but not limited to, commercially available iView displays, signage displays, kiosks, audio systems, etc.

The minimum-wager profile 1410 shows a minimum wager level that may be assigned to one or more gaming machines as a function of time. The minimum-wager profile 1410 has a horizontal axis 1412 and a vertical axis 1414. Just like the volume profile 1400, the horizontal axis 1412 is in units of time. Similar to the volume profile 1400, the vertical axis 1414 shows relative setting values instead of specific setting values.

The vertical axis 1414 shows the value of the generic gaming machine setting that is to be set on the gaming machines relative to time. The vertical axis 1414 is in units of generic gaming machine setting for minimum wager, which are low minimum wager, medium minimum wager, and high minimum wager. While the range of the vertical axis 1414 is over three units of generic gaming machine settings in exemplary profile 1410, other profiles may have wider or smaller ranges corresponding to more or fewer units of generic gaming machine settings, respectively. A profile with generic gaming machine settings such as low, medium, and high may be used to set, among others, the following operational gaming machine parameters:

volume
reel speed
minimum wager
master volume
jackpots

A profile with absolute or specific gaming machine settings may be used to set, among others, the following operational gaming machine parameters:

denominations
game themes
operating systems

In the case of an absolute configuration like denomination, there is no need for a low, medium or high level. The profile can instruct the machine to convert to a specific denomination.

In one embodiment, the command and control server 1602 may use a look-up table when a profile driven change instruction set is scheduled to be made. The look-up table may include information about each gaming machine (or other devices) at the casino. In some embodiments, there may be multiple look-up tables, where different tables are associated with different operational parameters of gaming machines or other devices.

TABLE 2

Gaming Machine Specific Lookup Tables

| Manufacturer | Cabinet Type | Game Theme | Game Volume Level | Game Volume Level Setting |
|---|---|---|---|---|
| Bally | V2020 | Winning Times | low | 2 |
| Bally | Cinevision | Winning Times | medium | 5 |
| Bally | S9e | Winning Times | high | 8 |
| WMS | Bluebird | Top Gun | low | 12 |

TABLE 2-continued

Gaming Machine Specific Lookup Tables

| Manufacturer | Cabinet Type | Game Theme | Game Volume Level | Game Volume Level Setting |
|---|---|---|---|---|
| | Stepper | | | |
| WMS | Bluebird Video | Top Gun | medium | 45 |
| WMS | Bluebird Slant | Top Gun | high | 88 |
| IGT | AVP | Fort Knox | low | 17 |
| IGT | AVP Reel | Fort Knox | medium | 32 |
| IGT | AVP Slant | Fort Knox | high | 49 |
| Novomatic | Novo 1 | Grey Goose | low | 2 |
| Novomatic | Novo 2 | Grey Goose | medium | 6 |
| Novomatic | Novo 3 | Grey Goose | high | 11 |
| ... | | | | |
| ... | | | | |
| ... | | | | |

Table 2 is an exemplary lookup table for volume settings. When a volume change is requested by a profile driven schedule, the command and control server 1602 may interrogate a gaming machine 1604 to obtain the gaming machine's characteristics. The command and control server 1602 may use a lookup table such as Table 2, which may be stored in the database 1606, to implement a profile driven change. The command and control server 1602 may use the lookup table to determine the value of game volume setting corresponding to the generic gaming machine setting of the profile. For instance, the command and control sever 1602 may attempt to change the game volume on floor machines to high on Friday at noon. If the game volume change was to be made on a gaming machine such as WMS 1604c, Bluebird Slant that was running the Top Gun game theme, then the game volume level setting would be 88 as shown in Table 2 above.

Typically, there are hundreds of cabinets on the floor of a casino. In some situations, it may be desired to change the configuration of each cabinet. The command and control sever 1602 may determine a specific game volume setting that corresponds to a generic gaming machine value specified in a profile driven change by using a lookup table such as game volume Table 2. Using Table 2, the command and control sever 1602 may determine the specific game volume setting for a gaming machine 1604 based on knowledge of the gaming machine's manufacturer, cabinet type, game theme.

Slot managers and/or manufacturers may create lookup tables on installation of the command and control sever 1602, and the lookup tables may be changed if new gaming machines and/or game themes are introduced into the casino. In some embodiments, the lookup tables may be changed if there are new generic gaming machine settings such as going from three level settings (e.g., low, medium, high) to five level settings (e.g., very low, low, medium, high, very high).

TABLE 3

Minimum Bet/Wager Lookup Table.

| Manufacturer | Cabinet Type | Theme | Pay Table | Denomination | Minimum Bet | Bet Per Line Options | Minimum Bet Per Line Setting | # of Lines Options | Minimum # of Lines Setting |
|---|---|---|---|---|---|---|---|---|---|
| | | | | LookUp Table - Minimum Bet Bally V2020, Winning Times | | | | | |
| Bally | V2020 | Winning Times | 90% | $0.01 | low - $.60 | 1, 2, 3, 4, 5 | 3 | 1, 3, 5, 9, 15, 20, 50 | 20 |
| Bally | V2020 | Winning Times | 90% | $0.01 | medium - $1.25 | 1, 2, 3, 4, 5 | 3 | 1, 3, 5, 9, 15, 20, 50 | 50 |

TABLE 3-continued

Minimum Bet/Wager Lookup Table.

| Manufacturer | Cabinet Type | Theme | Pay Table | Denomination | Minimum Bet | Bet Per Line Options | Minimum Bet Per Line Setting | # of Lines Options | Minimum # of Lines Setting |
|---|---|---|---|---|---|---|---|---|---|
| Bally | V2020 | Winning Times | 90% | $0.01 | high - $2.50 | 1, 2, 3, 4, 5 | 5 | 1, 3, 5, 9, 15, 20, 50 | 50 |
| Bally | V2020 | Winning Times | 90% | $0.05 | low - $.60 | 1, 2, 3, 4, 5 | 2 | 1, 3, 5, 9, 15, 20, 50 | 9 |
| Bally | V2020 | Winning Times | 90% | $0.05 | medium - $1.25 | 1, 2, 3, 4, 5 | 3 | 1, 3, 5, 9, 15, 20, 50 | 9 |
| Bally | V2020 | Winning Times | 90% | $0.05 | high - $2.50 | 1, 2, 3, 4, 5 | 4 | 1, 3, 5, 9, 15, 20, 50 | 15 |
| Bally | V2020 | Winning Times | 90% | $0.10 | low - $.60 | 1, 2, 3, 4, 5 | 4 | 1, 3, 5, 9, 15, 20, 50 | 3 |
| Bally | V2020 | Winning Times | 90% | $0.10 | medium - $1.25 | 1, 2, 3, 4, 5 | 3 | 1, 3, 5, 9, 15, 20, 50 | 9 |
| Bally | V2020 | Winning Times | 90% | $0.10 | high - $2.50 | 1, 2, 3, 4, 5 | 2 | 1, 3, 5, 9, 15, 20, 50 | 9 |
| WMS Bluebird, Top Gun Minimum | | | | | | | | | |
| WMS | Bluebird | Top Gun | 92% | $0.01 | low - $.60 | 1, 2, 3, 4, 5, 6, 7, 8, 9 | 4 | 1, 5, 9, 15, 50 | 15 |
| WMS | Bluebird | Top Gun | 92% | $0.01 | medium - $1.25 | 1, 2, 3, 4, 5, 6, 7, 8, 9 | 4 | 1, 5, 9, 15, 50 | 50 |
| WMS | Bluebird | Top Gun | 92% | $0.01 | high - $2.50 | 1, 2, 3, 4, 5, 6, 7, 8, 9 | 6 | 1, 5, 9, 15, 50 | 50 |
| WMS | Bluebird | Top Gun | 92% | $0.05 | low - $.60 | 1, 2, 3, 4, 5, 6, 7, 8, 9 | 3 | 1, 5, 9, 15, 50 | 15 |
| WMS | Bluebird | Top Gun | 92% | $0.05 | medium - $1.25 | 1, 2, 3, 4, 5, 6, 7, 8, 9 | 4 | 1, 5, 9, 15, 50 | 9 |
| WMS | Bluebird | Top Gun | 92% | $0.05 | high - $2.50 | 1, 2, 3, 4, 5, 6, 7, 8, 9 | 5 | 1, 5, 9, 15, 50 | 15 |
| WMS | Bluebird | Top Gun | 92% | $0.10 | low - $.60 | 1, 2, 3, 4, 5, 6, 7, 8, 9 | 5 | 1, 5, 9, 15, 50 | 3 |
| WMS | Bluebird | Top Gun | 92% | $0.10 | medium - $1.25 | 1, 2, 3, 4, 5, 6, 7, 8, 9 | 4 | 1, 5, 9, 15, 50 | 3 |
| WMS | Bluebird | Top Gun | 92% | $0.10 | high - $2.50 | 1, 2, 3, 4, 5, 6, 7, 8, 9 | 3 | | 9 |

Another example of a profile driven change would be minimum wager. In this case, an operator wants to control the amount of the minimum wager that a customer makes on a gaming machine. One way to control the amount of the minimum wager on a slot title is by setting slot title to have a number of lines and setting a minimum number of coins to be wager per line.

Here is an example of a lookup table for minimum wager. In this case, only Bally and WMS are show for one of each of their games but other manufacturers would be added as they are connected to the command and control system.

Real-Time Inventory and Interrogation

Referring to FIG. 16, the command and control server 1602 may use G2S to communicate with the gaming machines 1604 and has the capability to interrogate the gaming machines 1604. From the interrogation of a gaming machine 1604, the command and control server 1602 may lean many or all of the gaming machine's settings including game theme, current denominations, current game volume, current game reel speed, current wager options and line options, current host settings and almost all other machine settable parameters. The command and control server 1602 may request and get these values in real-time.

XML Data Structure—Use of XML for Messages

In one embodiment, a user, or an external system, may specify a profile to modify some or any of a gaming machine's available options, or meta options like Minimum wager. A wager profile input file which may be used to set wager amount can easily be formatted to specify a series of times and a list of options and values for any options as shown below:

```
<!-- Showing use for minimum wager />
<ChangeProfile>
  <ChangeInstance StartTime="MM DD YYYY 6:00am">
    <OptionItem name="MinBetAmount", value="Low">
  </ChangeInstance>
  <ChangeInstance StartTime="MM DD YYYY 4:00pm">
    <OptionItem name="MinBetAmount", value="High">
  </ChangeInstance>
</ChangeProfile>
<!-- Showing use for game speed and game volume together* />
<ChangeProfile>
  <ChangeInstance StartTime="MM DD YYYY 6:00am">
    <OptionItem name="BAL_GameSpeed", value="1">
    <OptionItem name="BAL_GameVolume", value="5">
  </ChangeInstance>
  <ChangeInstance StartTime="MM DD YYYY 4:00pm">
    <OptionItem name="BAL_GameSpeed", value="3">
    <OptionItem name="BAL_GameVolume", value="6">
  </ChangeInstance>
</ChangeProfile>
```

When the command and control server 1602 executes the profile, command and control server 1602 may use a table to resolve what each item means on a per EGM basis. The table may be generic and may include columns for OptionName, OptionValue, G2S_DeviceClass, G2S_OptionGroup, G2S_OptionItem, and G2SOptionValue.

When the command and control server 1602 creates a job, the command and control server 1602 may look up the OptionItem Name in the table for the given EGM's theme, paytable, and denomination. If one or more matching rows exists, then the option may be mapped to the actual G2S options, and the command and control server 1602 sends the appropriate command (for example MinBetAmount becomes Bal_MinBetPerLine and Bal_MinNumberOfLines). If no rows match, the command and control server 1602 may still send the command if it happens to match a actual G2SOption for that game. (Like BAL_GameSpeed). If there is still no match, then an error may be logged.

In addition, wildcards in the lookup table may be supported, which may reduce the number of rows. For instance, if the same thing is done for every pay table, then instead of having rows for each pay table, we would just put a * in that column.

In some embodiments, a lookup table may include a manufacture column. In that case, the lookup table may support meta options that may be displayed in the control panel and may allow users to make generic assignments that work across disparate manufacturers. These meta options may be displayed in standard configuration wizards as well as the special profile wizard.

| XML Format of Profile Data |
|---|
| <?xml version="1.0" encoding="utf-8" ?> |
| - <ChangeProfile name="Sample MinBet Profile" author="Haiyang"> |
| - <ChangeInstance startingTime="YYYY-MM-DD 00:00:00"> |
|    <optionItem name="MinBetAmount" value="Low" /> |
|   </ChangeInstance> |
| - <ChangeInstance startingTime="YYYY-MM-DD 00:00:00"> |
|    <optionItem name="MinBetAmount" value="Medium" /> |
|   </ChangeInstance> |
| - <ChangeInstance startingTime="YYYY-MM-DD 00:00:00"> |
|    <optionItem name="MinBetAmount" value="High" /> |
|   </ChangeInstance> |
| - <ChangeInstance startingTime="YYYY-MM-DD 00:00:00"> |
|    <optionItem name="MinBetAmount" value="Medium" /> |
|   </ChangeInstance> |
| - <ChangeInstance startingTime="YYYY-MM-DD 00:00:00"> |
|    <optionItem name="MinBetAmount" value="High" /> |
|   </ChangeInstance> |
| - <ChangeInstance startingTime="YYYY-MM-DD 00:00:00"> |
|    <optionItem name="MinBetAmount" value="Low" /> |
|   </ChangeInstance> |
| - <ChangeInstance startingTime="YYYY-MM-DD 21:00:00"> |
|    <optionItem name="BAL__WaveVolume" value="7" /> |
|    <optionItem name="BAL__LineVolume" value="7" /> |
|   </ChangeInstance> |
| - <ChangeInstance startingTime="YYYY-MM-DD 21:00:00"> |
|    <optionItem name="BAL__WaveVolume" value="6" /> |
|   </ChangeInstance> |
| - <ChangeInstance startingTime="YYYY-MM-DD 21:00:00"> |
|    <optionItem name="BAL__WaveVolume" value="8" /> |
|   </ChangeInstance> |
|   </ChangeProfile> |

The control and command server 1602 may use XML data in the format above to build a visual representation of the profile curve as shown in figures above.

Figure 15:
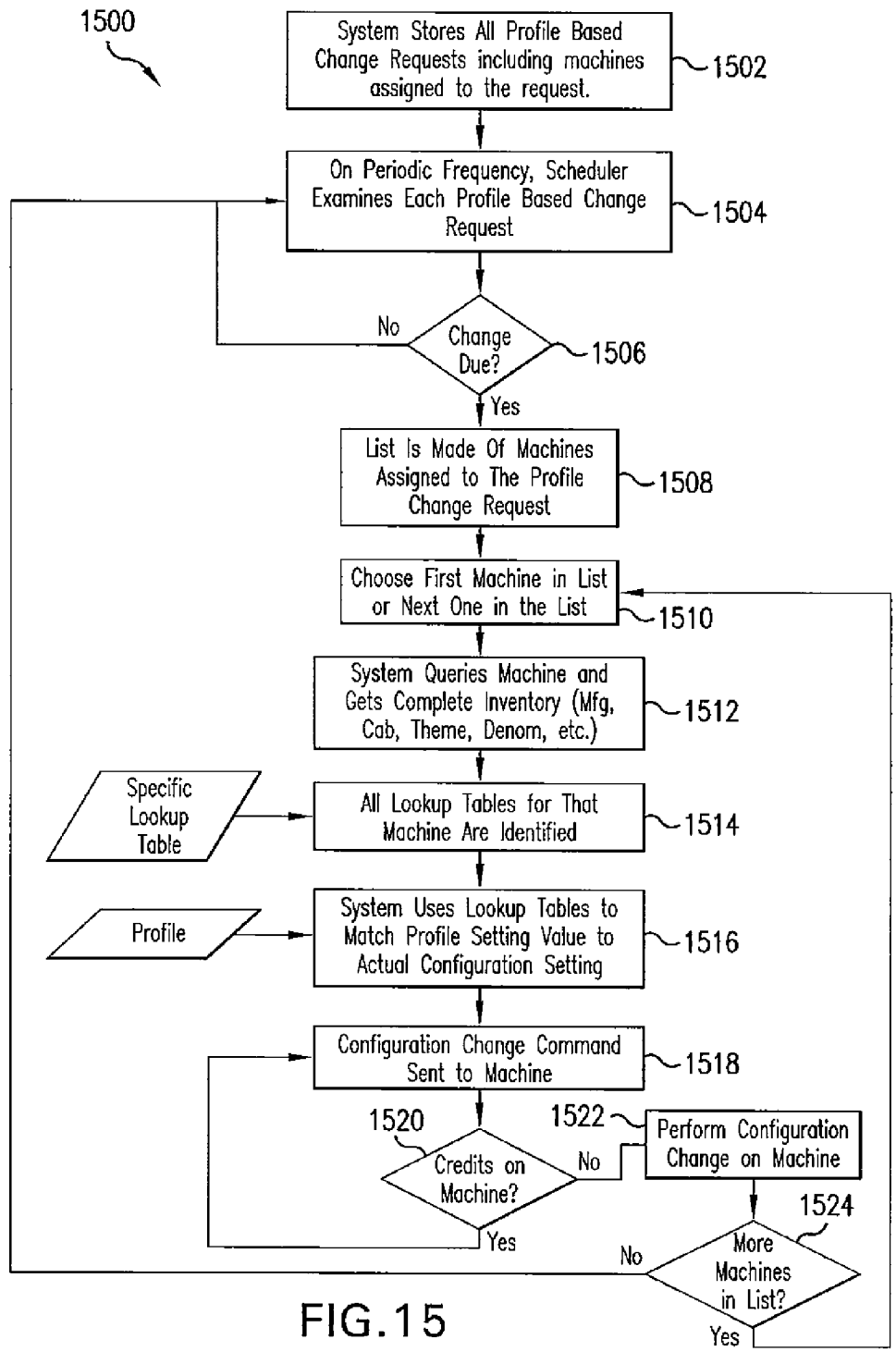
FIG. 15 is a flow diagram of a process flow for generating gaming machine performance tables according to one nonlimiting embodiment.

FIG. 15 shows a method 1500 to configure the gaming machines 1604 according to one embodiments. Various operations depicted in FIG. 15 need not necessarily be performed in the exact order shown. Moreover, some operations can be added, removed, modified, and/or combined.

In one embodiment, the operations represented by the method 1500 can be implemented by computer-readable instructions encoded on or otherwise stored on a computer-readable medium and executable by a processor. For example, some operations of the method 1500 can be implemented in software stored in database 1606 of the command and control server 1602, and executable by a processor such as processing unit 1312.

In one embodiment, one or more of the gaming machines 1604 may include a processing unit similar to processing unit 1312, a storage unit or memory similar to system memory 1314, and a bus similar to bus 1316 coupling the respective processor and storage unit of the gaming machine. The storage unit may also include a hard disk drive similar to hard disk drive 1324 for reading from and writing to a hard disk 1326; an optical disk drive similar to an optical disk drive 1328 for reading from and writing to removable optical disks similar to optical disks 1332; and a magnetic disk drive similar to magnetic disk drive 1330 for reading from and writing to removable magnetic disks similar to magnetic disks 1334. Thus, corresponding operations of the method 1500 that are related to the gaming machines 1604, can also be implemented in software or other computer-readable instructions stored in the storage unit of the gaming machine 1604, and executable by the processor of the gaming machine 1604.

At a block 1502, the command and control center 1602 receives and stores in the storage unit(s) such as database 1606 profile-driven configuration changes 1608 or other profile-based requests to change configuration settings that are input by the user. As previously explained above, the information specified in the profile-driven configuration changes 1608 may include an identification of particular gaming machines 1604 that are assigned to the requests for configuration changes, as well as including generalized and/or specific values for configuration settings.

At a block 1504, a processor, which may be similar to processing unit 1312, of the command and control center 1602 examines the stored profile(s) to determine whether a configuration change is due. In one embodiment, the processor of the command and control center 1602 includes or is coupled to a scheduler that is adapted to examine the stored profile(s) according to a time schedule, such as a periodic frequency of hourly, every 12 hours, every 24 hours, or other timeframe configurable by the user. The scheduler repeatedly examines the stored profile(s) according to the time schedule, until a configuration change is determined to be due at a block 1506.

If the configuration change is determined to be due at the block 1506, the processor of the command and control server 1602 at a block 1508 generates a list of gaming machines 1604 that are to receive configuration changes. In one embodiment, the list of gaming machines 1604 can be generated from the gaming machines specified in the profile.

At a block 1510, the processor of the command and control server 1602 chooses a first gaming machine 1604 from the list. In one embodiment, the command and control server 1602 then interrogates or otherwise queries that first gaming machine 1604 at a block 1512 for current specific values for its configuration settings (e.g., manufacturer, cabinet, game theme, reel speed, current denomination, game volume, wager and line options, etc.). Obtaining the current specific values for configuration settings at the block 1512, for each of the gaming machines 1604, enables the command and control server 1602 to generate an updated inventory of the gaming machines 1604 and their current configuration settings. For instance, certain gaming machines 1604 may have been replaced/removed, or may have had their configuration settings modified between the time that the profile was created and when a configuration change specified in the profile is due. Interrogating the gaming machine(s) 1604 with queries at the block 1512 enables the processor of the command and control server 1602 to determine whether the proposed configuration settings specified in the profile are still appropriate, and to make revisions if appropriate.

In one embodiment, the gaming machine(s) 1304 can provide their current configuration settings at the block 1512 independently of a query from the command and control server 1602. For instance, rather than specifically interrogating the gaming machine(s) 1304, whether via a global interrogation or selective individual interrogations, one embodiment can provide one or more gaming machines 1604 that report their current configuration settings to the command and control server 1602 according to a time schedule and/or in response to some condition being met.

At a block 1514, the processor of the command and control server 1602 accesses or otherwise identifies one or more lookup tables (such as the Table 2 and Table 3 above) that have entries for the gaming machine 1604. At a block 1516, the processor of the command and control server 1602 uses the look-up table(s) to match the information specified in the profile (e.g., the generalized values of the configuration settings indicated in the profile-driven configuration changes 1608) to specific values of current configuration settings. With this use of the look-up tables, the processor of the command and control server 1602 is thus able to provide a translation from the generalized values to specific values for configuration settings.

At a block 1518, the command and control server 1602 generates a configuration change command and sends the generated command to the gaming machine 1604. In one embodiment, the generated command instructs the target gaming machine 1604 to change to the new configuration setting value upon receipt of the command. Thus, the command and control server 1602 can send the generated command to the target gaming machine 1604 just before the time frame when the change is to take effect, thereby directly controlling the timing of the change. In another embodiment, the command and control server 1602 can send the generated command to the target gaming machine 1604 at any suitable length of time (e.g., at a greater lead time) prior to the scheduled configuration change, so that the target gaming machine 1604 can set itself to run or otherwise perform the configuration change when the change is due.

In some situations, the target gaming machine 1604 may have credits that are due or otherwise currently engaged in a game with a player, when the configuration change command is received. Accordingly at a block 1520 for one embodiment, the configuration change is not performed immediately. Rather, for example, the command and control server 1602 can continue to send/re-send the configuration change command to the target gaming machine 1604 if the target gaming machine 1604 has credits that are due or is otherwise currently engaged in a game with a player, until the gaming machine 1604 is ready to perform the configuration change at a block 1522.

The operations described above in blocks 1510-1522 are repeated if the processor of the command and control server 1602 determines at a block 1524 that there are additional gaming machines 1604 in the generated list that are scheduled for configuration changes. When there are no such other gaming machines 1604 scheduled for configuration changes, then the method 1600 reverts back to the block 1504 to examine the stored profiles for upcoming configuration changes that are coming due.

Meta-Options

Electronic gaming machines 1604 may combine hardware and software to deliver gaming applications to customers. The software may include operating system and game software both of which have configurable parameters or options. Each configurable option has a variable name and one or more valid values that can be set; only valid values can be set in the software. Table 4 below includes examples of configurable options, valid option values and the option variable name:

| Software Component | Configurable Option | Valid Option Values | Option Variable Name |
|---|---|---|---|
| Operating System | Jackpot Limit | 0-5000 | Jackpot_Lim |
| Operating System | Download Transfer Speed | 0-2,000,000 | Idle_Sp_Tran |
| Operating System | Bill Stacker Limit | 0-12,000 | B_StackLim |
| Game | Game Volume | 0-10 | G_Vol |
| Game | Bet Per Line | 1, 2, 3, 4, 5, 10, 25, 50 | BP_Line |
| Game | Denomination | 1, 5, 10, 25, 50, 100, 500, 1000 | Denom |

Typically, available configurable options, valid option values and option variable names comprise a set that is unique to each gaming machine manufacturer's operating system and game software. Further, each of the game themes from a single manufacturer can have a completely different configurable option list with unique option values and option variable names so there is a unique set of this data for each manufacturer and game combination.

The operation of the gaming machine 1604 may be changed by making changes to the configurable options within the permitted or valid configurable option values. For example, the game volume may be changed to low by changing the G_Vol option variable to 1 or changed to high by changing the G_Vol option variable to 9. The game volume is controlled by a single configurable option just as the Bill Stacker Limit or wager Per Line is. Changing those individual configurable options to one of the valid option values has an affect on the gaming machine 1604.

In some situations, to efficiently change configurations on a gaming floor the following issues may need to be overcome:

First, for many gaming floor changes, casino directors might not think in terms of absolute values of configuration options; casino directors may think in relative terms such as low, medium and high. As an example, casino directors may think of game volume as low, medium and high. On a busy Friday night, casino directors may want the volume on all electronic gaming machines to be set to high, but casino directors may want to have the game volume set to low after midnight. Casino directors may want to set options like game volume, minimum wager, game speed and other game settings to a subjective or relative value, and the casino directors may think of the functioning of gaming machines in relative terms (fast game, slow game, game volume loud, etc.), even though operational parameters of gaming machines may be set to absolute values.

Second, Casino directors may want to make changes to the floor as a whole, not to individual gaming machines. Casino directors may want to set the entire floor game volume to high with one command. However, as previously described, the game floor typically includes of a wide variety of gaming machines 1604 from different manufacturers, and gaming machines such as 1604a and 1604b may be running different game themes. In addition, one manufacturer's valid option values and/or option variable names may be inconsistent with another manufacturer's valid option values and/or option variable names, and a manufacturer's valid option values and/or option variable names may be inconsistent across different game themes. For example, see Table 5 below.

TABLE 5 look-up table for game volume settings by manufacturer and game themes.

| Manufacturer | Game Theme | Software Component | Configurable Option | Valid Option Values | Option Variable Name |
|---|---|---|---|---|---|
| Bally | Blazing 7s | Game | Game Volume | 0-10 | G_Vol |
| Bally | Bonus 7s | Game | Game Volume | 0-10 | G_Vol |
| Bally | Winning Times | Game | Game Volume | 0-10 | G_Vol |
| Bally | Fixin' to Win | Game | Game Volume | 0-10 | G_Vol |
| IGT | Fort Knox | Game | Game Volume | 1-100 | GameVol |
| IGT | Wheel of Fortune | Game | Game Volume | 1-500 | GameVol |
| WMS | Top Gun | Game | Game Volume | 0-50 | Vol_Gm |
| WMS | Monopoly | Game | Game Volume | 0-50 | Vol_Gm |
| Aristocrat | Double Dolphins | Game | Game Volume | 0-5 | Game_Vol_Level |
| Aristocrat | Queen of the Nile | Game | Game Volume | 0-10 | Game_Vol_Level |

In one embodiment, the aforementioned issues, among other issues, may be resolved by employing a meta-option. A meta-option is a configuration option that does not use an absolute option value as the setting but instead uses a generic or subjective value such as:

- low volume, medium volume, high volume
- slow reel speed, medium reel speed, fast reel speed
- low denomination, medium denomination, high denomination
- small jackpot limit, medium jackpot limit, high jackpot limit
- low minimum wager, medium minimum wager, high minimum wager
- Friday night game mix, Saturday night game mix, Sunday night game mix, Tuesday thru Thursday game mix
- Volume reduction by 30%
- Game speed increase by 20%
- Bet per line increase by 15%
- Number of lines increase by 30%

In one embodiment, a meta-option may be one way of identifying a configuration option(s) change that is associated by business logic to a set of pre-defined configuration option values. Before a meta-option change occurs, the meta-option associated to specific configuration option values is done and is stored in a database such as database 1606 in schema. As one example, a meta-option may be a volume change of the gaming machines 1604.

TABLE 6

Meta-option volume look-up.

| Manufacturer | Game Theme | Configurable Option | Subjective Volume Level | Option Setting | Option Variable Name |
|---|---|---|---|---|---|
| Bally | Blazing 7s | Game Volume | Low | 1 | G_Vol |
| Bally | Blazing 7s | Game Volume | Medium | 5 | G_Vol |
| Bally | Blazing 7s | Game Volume | High | 9 | G_Vol |
| Bally | Bonus 7s | Game Volume | Low | 1 | G_Vol |
| Bally | Bonus 7s | Game Volume | Medium | 5 | G_Vol |
| Bally | Bonus 7s | Game Volume | High | 9 | G_Vol |
| Bally | Winning Times | Game Volume | Low | 1 | G_Vol |
| Bally | Winning Times | Game Volume | Medium | 5 | G_Vol |
| Bally | Winning Times | Game Volume | High | 9 | G_Vol |
| Bally | Fixin' to Win | Game Volume | Low | 1 | G_Vol |
| Bally | Fixin' to Win | Game Volume | Medium | 5 | G_Vol |
| Bally | Fixin' to Win | Game Volume | High | 9 | G_Vol |
| IGT | Fort Knox | Game Volume | Low | 5 | GameVol |
| IGT | Fort Knox | Game Volume | Medium | 50 | GameVol |
| IGT | Fort Knox | Game Volume | High | 85 | GameVol |
| IGT | Wheel of Fortune | Game Volume | Low | 25 | GameVol |
| IGT | Wheel of Fortune | Game Volume | Medium | 250 | GameVol |
| IGT | Wheel of Fortune | Game Volume | High | 400 | GameVol |
| WMS | Top Gun | Game Volume | Low | 8 | Vol_Gm |

TABLE 6-continued

Meta-option volume look-up.

| Manufacturer | Game Theme | Configurable Option | Subjective Volume Level | Option Setting | Option Variable Name |
|---|---|---|---|---|---|
| WMS | Top Gun | Game Volume | Medium | 20 | Vol_Gm |
| WMS | Top Gun | Game Volume | High | 45 | Vol_Gm |
| WMS | Monopoly | Game Volume | Low | 8 | Vol_Gm |
| WMS | Monopoly | Game Volume | Medium | 20 | Vol_Gm |
| WMS | Monopoly | Game Volume | High | 45 | Vol_Gm |
| Aristocrat | Double Dolphins | Game Volume | Low | 1 | Game_Vol_Level |
| Aristocrat | Double Dolphins | Game Volume | Medium | 3 | Game_Vol_Level |
| Aristocrat | Double Dolphins | Game Volume | High | 4 | Game_Vol_Level |
| Aristocrat | Queen of the Nile | Game Volume | Low | 2 | Game_Vol_Level |
| Aristocrat | Queen of the Nile | Game Volume | Medium | 6 | Game_Vol_Level |
| Aristocrat | Queen of the Nile | Game Volume | High | 8 | Game_Vol_Level |

Table 6 shows a meta-option volume look-up table. In the meta-option volume look-up table, generic or subjective volume settings are associated with specific valid configuration option values.

In one embodiment, a casino manager may set a meta-option volume change to set all game volumes to a desired subjective volume level. The command and control server 1602 may use meta-option volume look-up table, which may be stored in database 1606, to find valid configuration names and options, e.g., "option variable name" and "option setting," associated with a subjective volume level for various gaming machines 1604.

For example, if the meta-option change sets the volume of the gaming machines 1604 to low, the command and control server 1602 may interrogate the gaming machines 1604 to determine the current floor configuration, e.g., number and types of gaming machines, current game themes, etc. When the command and control server 1602 interrogates the gaming machine 1604e, the command and control server 1602 determines that the gaming-machine 1604e is an Aristocrat—Queen of the Nile game. The command and control server 1602 may use the meta-option volume look-up table to determine the valid configuration name for gaming machine 1604e is "Game_Vol_Level" and the valid configuration option corresponding to a "subjective volume setting" of "low" is "2." When the command and control server 1602 interrogates another gaming machine such as gaming machine 1604a, the command and control server 1602 may detect that gaming machine 1604a is a Bally gaming machine with a game theme of "Winning Times." The command and control server 1602 may use the meta-option volume look-up table to determine that the "G_Vol" variable of gaming machine 1604a should be set to "1."

Another use of meta-options, among others, is setting a minimum wager level. Setting the minimum wager level may be accomplished by changing the number of lines and/or the wager per line that define the minimum number of credits that can be wagered on a single game play. A meta-option minimum wager look-up table is constructed and includes types of gaming machine and game themes. Typically, a casino may have gaming machines from multiple manufacturers, and in that case, the meta-option minimum wager look-up table typically includes every type of gaming machine at the casino for all of the manufacturers. Table 7 below is an exemplary meta-option minimum wager look-up table:

| Manufacturer | Cabinet Type | Theme | Pay Table | Denomination | Minimum Bet | Bet Per Line Options | Minimum Bet Per Line Setting | Bet Per Line Variable Name | # of Lines Options | Minimum # of Lines Setting | Number of Lines Variable Name |
|---|---|---|---|---|---|---|---|---|---|---|---|
| Bally | V2020 | Winning Times | 90% | $0.01 | low - $.60 | 1, 2, 3, 4, 5 | 3 | B_Lines | 1, 3, 5, 9, 15, 20, 50 | 20 | Num_Lines |
| Bally | V2020 | Winning Times | 90% | $0.01 | medium - $1.25 | 1, 2, 3, 4, 5 | 3 | B_Lines | 1, 3, 5, 9, 15, 20, 50 | 50 | Num_Lines |
| Bally | V2020 | Winning Times | 90% | $0.01 | high - $2.50 | 1, 2, 3, 4, 5 | 5 | B_Lines | 1, 3, 5, 9, 15, 20, 50 | 50 | Num_Lines |
| Bally | V2020 | Winning Times | 90% | $0.05 | low - $.60 | 1, 2, 3, 4, 5 | 2 | B_Lines | 1, 3, 5, 9, 15, 20, 50 | 9 | Num_Lines |
| Bally | V2020 | Winning Times | 90% | $0.05 | medium - $1.25 | 1, 2, 3, 4, 5 | 3 | B_Lines | 1, 3, 5, 9, 15, 20, 50 | 9 | Num_Lines |
| Bally | V2020 | Winning Times | 90% | $0.05 | high - $2.50 | 1, 2, 3, 4, 5 | 4 | B_Lines | 1, 3, 5, 9, 15, 20, 50 | 15 | Num_Lines |
| Bally | V2020 | Winning Times | 90% | $0.10 | low - $.60 | 1, 2, 3, 4, 5 | 4 | B_Lines | 1, 3, 5, 9, 15, 20, 50 | 3 | Num_Lines |
| Bally | V2020 | Winning Times | 90% | $0.10 | medium - $1.25 | 1, 2, 3, 4, 5 | 3 | B_Lines | 1, 3, 5, 9, 15, 20, 50 | 9 | Num_Lines |

-continued

| Manufacturer | Cabinet Type | Theme | Pay Table | Denomination | Minimum Bet | Bet Per Line Options | Minimum Bet Per Line Setting | Bet Per Line Variable Name | # of Lines Options | Minimum # of Lines Setting | Number of Lines Variable Name |
|---|---|---|---|---|---|---|---|---|---|---|---|
| Bally | V2020 | Winning Times | 90% | $0.10 | high - $2.50 | 1, 2, 3, 4, 5 | 2 | B_Lines | 1, 3, 5, 9, 15, 20, 50 | 9 | Num_Lines |
| WMN | Bluebird | Top Gun | 92% | $0.01 | medium - $1.25 | 1, 2, 3, 4, 5, 6, 7, 8, 9 | 4 | Bet_PL | 1, 5, 9, 15, 50 | 50 | Number_L |
| WMN | Bluebird | Top Gun | 92% | $0.01 | high - $2.50 | 1, 2, 3, 4, 5, 6, 7, 8, 9 | 6 | Bet_PL | 1, 5, 9, 15, 50 | 50 | Number_L |
| WMN | Bluebird | Top Gun | 92% | $0.05 | low - $.60 | 1, 2, 3, 4, 5, 6, 7, 8, 9 | 3 | Bet_PL | 1, 5, 9, 15, 50 | 15 | Number_L |
| WMN | Bluebird | Top Gun | 92% | $0.05 | medium - $1.25 | 1, 2, 3, 4, 5, 6, 7, 8, 9 | 4 | Bet_PL | 1, 5, 9, 15, 50 | 9 | Number_L |
| WMN | Bluebird | Top Gun | 92% | $0.05 | high - $2.50 | 1, 2, 3, 4, 5, 6, 7, 8, 9 | 5 | Bet_PL | 1, 5, 9, 15, 50 | 15 | Number_L |
| WMN | Bluebird | Top Gun | 92% | $0.10 | low - $.60 | 1, 2, 3, 4, 5, 6, 7, 8, 9 | 5 | Bet_PL | 1, 5, 9, 15, 50 | 3 | Number_L |
| WMN | Bluebird | Top Gun | 92% | $0.10 | medium - $1.25 | 1, 2, 3, 4, 5, 6, 7, 8, 9 | 4 | Bet_PL | 1, 5, 9, 15, 50 | 3 | Number_L |
| WMN | Bluebird | Top Gun | 92% | $0.10 | high - $2.50 | 1, 2, 3, 4, 5, 6, 7, 8, 9 | 3 | Bet_PL | 1, 5, 9, 15, 50 | 9 | Number_L |
| IGT | AVP | Fort Knox | 94% | $0.01 | low - $.60 | 2, 4, 6, 8 | 2 | Bet | 1, 2, 4, 7, 9, 12, 20 | 1 | Lines |
| IGT | AVP | Fort Knox | 94% | $0.01 | medium - $1.25 | 2, 4, 6, 8 | 4 | Bet | 1, 2, 4, 7, 9, 12, 20 | 2 | Lines |
| IGT | AVP | Fort Knox | 94% | $0.01 | high - $2.50 | 2, 4, 6, 8 | 6 | Bet | 1, 2, 4, 7, 9, 12, 20 | 4 | Lines |
| IGT | AVP | Fort Knox | 94% | $0.05 | low - $.60 | 2, 4, 6, 8 | 2 | Bet | 1, 2, 4, 7, 9, 12, 20 | 4 | Lines |
| IGT | AVP | Fort Knox | 94% | $0.05 | medium - $1.25 | 2, 4, 6, 8 | 2 | Bet | 1, 2, 4, 7, 9, 12, 20 | 7 | Lines |
| IGT | AVP | Fort Knox | 94% | $0.05 | high - $2.50 | 2, 4, 6, 8 | 4 | Bet | 1, 2, 4, 7, 9, 12, 209 | 9 | Lines |
| IGT | AVP | Fort Knox | 94% | $0.10 | low - $.60 | 2, 4, 6, 8 | 2 | Bet | 1, 2, 4, 7, 9, 12, 20 | 9 | Lines |
| IGT | AVP | Fort Knox | 94% | $0.10 | medium - $1.25 | 2, 4, 6, 8 | 2 | Bet | 1, 2, 4, 7, 9, 12, 20 | 12 | Lines |
| IGT | AVP | Fort Knox | 94% | $0.10 | high - $2.50 | 2, 4, 6, 8 | 2 | Bet | 1, 2, 4, 7, 9, 12, 20 | 20 | Lines |

In the meta-option minimum wager look-up table, generic or subjective minimum wager/betting settings are associated with specific valid configuration option values.

In one embodiment, a casino manager may set a meta-option minimum wager change to set all game minimum wagers to a desired subjective minimum wager level. The command and control server 1602 may meta-option minimum wager look-up table, which may be stored in database 1606, to find valid configuration names and options, e.g., "option variable name" and "option setting," associated with a subjective minimum wager level, e.g., low minimum bet, medium minimum bet, high minimum bet, for various gaming machines 1604.

For example, if the meta-option change sets the minimum wager of the gaming machines 1604 to low minimum bet, the command and control server 1602 may interrogate the gaming machines 1604 to determine the current floor configuration, e.g., number and types of gaming machines, current game themes, etc. Based on an interrogation of one of the gaming machines, the command and control server 1602 may determine that the interrogated gaming machine is an IGT—Fort Knox—94%—Penny Game. The command and control server 1602 may use the meta-option minimum wager look-up table to determine that valid configuration names for the gaming machine are "Bet" and "Lines," which have valid configuration options corresponding to the low minimum bet setting of "2" and "1," respectively. When the command and control server 1602 interrogates another gaming machine such as gaming machine 1604b, the command and control server 1602 may detect that gaming machine 1604b is a Bally—Winning Times—90%—Nickel game. The command and control server 1602 may use the meta-option minimum wager look-up table to determine that the "B_Lines" variable and the "Num_Lines" variable of gaming machine 1604b should be set to "2" and "9," respectively.

The meta-option solves the issues noted above with traditional configuration options.

First, the meta-option is more intuitive and understandable to the slot floor director.

Second, the meta-option is one practical way to set an option across a diverse floor with machines that 1) have different valid option values and 2) name the option variable in different ways.

Third, the meta-option the setting of floor-wide parameters or global parameters that are not necessarily defined by one single configuration option. In one embodiment, a meta-option may be nested into another meta-option. For example, a nested meta-option may include a meta-option volume change and a meta-option minimum wager change applied globally and/or across a floor of the casino.

Figure 17:
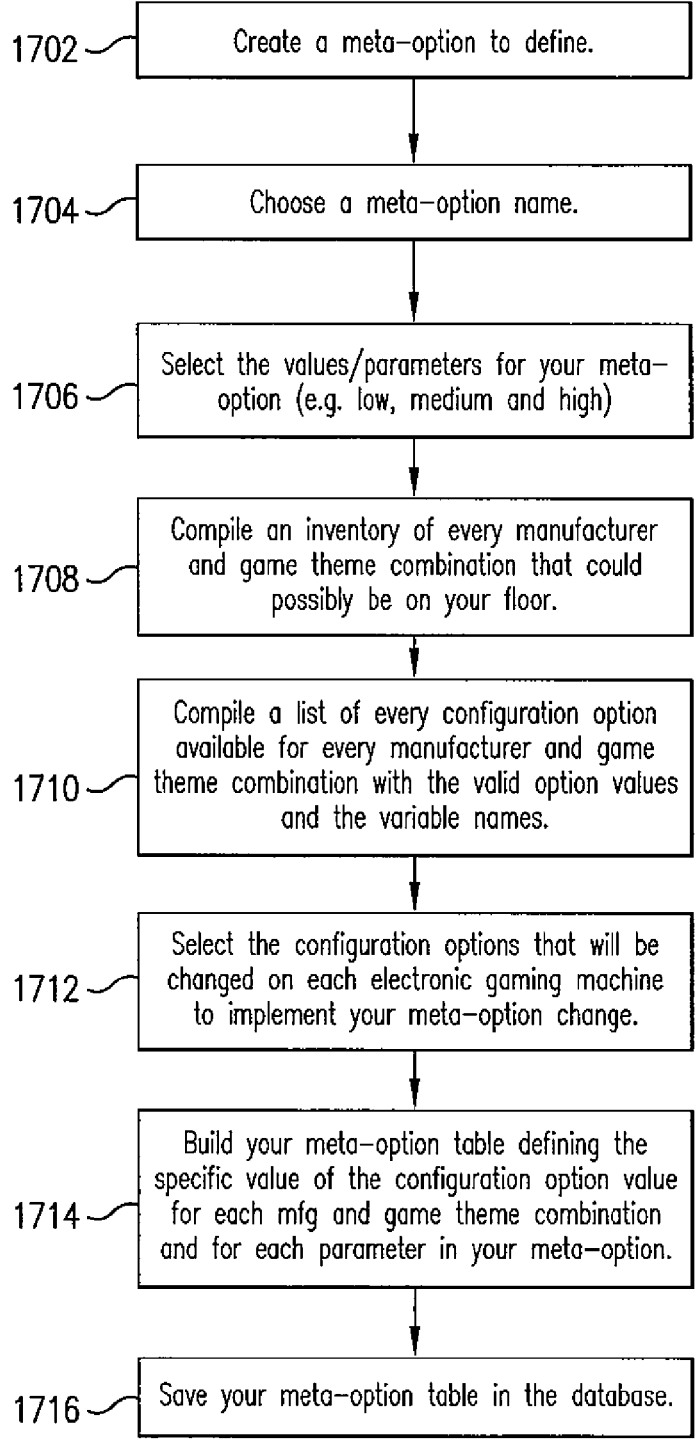
FIG. 17 is a flow diagram of a process for creating a meta-option according to one nonlimiting embodiment.

FIG. 17 shows a process 1700 for creating a meta-option.

At 1702, a meta-option is defined. The meta-option is the change that may be applied to one or more electronic gaming machines. Examples of meta-options are volume level, slot game reel speed, game mix and minimum wager.

At 1704, the meta-option is named or identified for future reference.

At 1706, the meta-option values are established. In some embodiments, the meta-option values may be generic/subjective values. In some embodiments, the meta-option values may be relative values. Examples of the meta option values include, but are not limited to, low, medium and high or slow or fast or % of current value.

At 1708, an inventory of all possible manufacturer and game theme combination is compiled.

At 1710, configuration options for a gaming machine and game themes combination are compiled into a list/table. For each of the configuration options, valid configuration option values and variable names may also be compiled into the list/table.

At 1710, specific configuration options are selected to be changed on each electronic gaming machine to achieve the desired change effect. For example, if the meta-option change is to set all volumes to low, the specific configuration option may be game volume. If the meta-option change is to set the speed of all slot game themes to fast, the specific configuration option may be reel speed. If the meta-option change is to set all minimum wagers to high, the specific configuration options may be wagers per line and number of lines.

At 1710, a meta-option look-up table that cross-references the meta-option values (e.g. low, medium and high) of the meta-option to variable names and to valid option values for each manufacturer and game theme combination.

At 1712, the meta-option look-up table is committed to the database for future use by an application like a profile driven gaming machine configurator.

Figure 18:
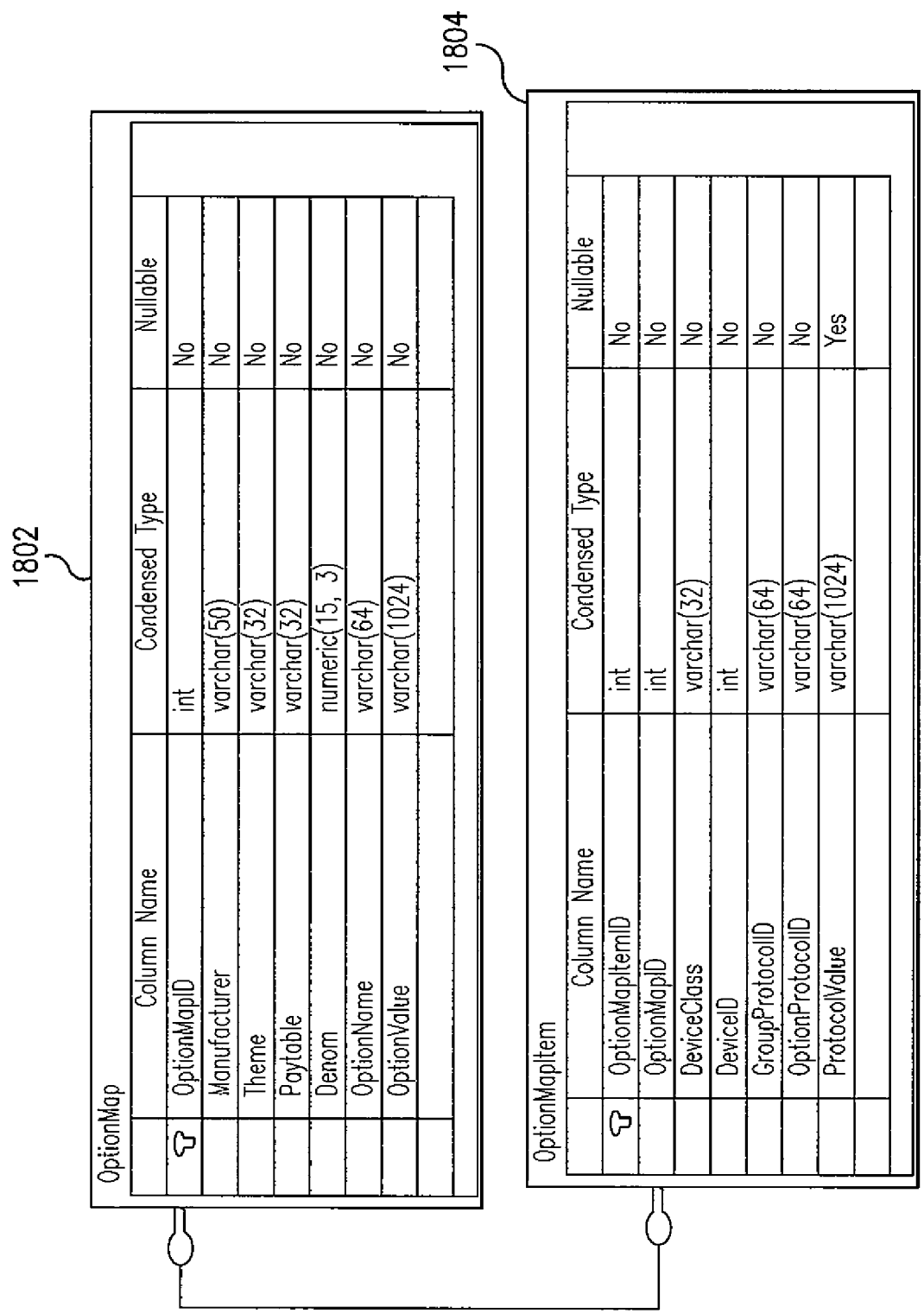
FIG. 18 is a diagram of a look-up table definition schema according to one nonlimiting embodiment.

Referring to FIG. 18, a first table definition schema 1802 is logically coupled to a second table definition schema 1804. The first table definition schema 1802 and the second table definition 1804 may be part of a meta-option look-up table stored in database 1606.

The database 1606 may take a variety of forms including, but not limited to, a structured query language (SQL) database. A database schema of database 1606 defines a meta-option look-up table.

Download and Configuration Engine for a Gaming System

A gaming environment may include a download and configuration management (DCM) engine. A DCM engine may command and control of a download and configuration system. Clients command and control the DCM system by consuming/using the application programming interface (API) extended by the DCM engine. This API is exposed to clients via many different protocols (UDP, SOAP, TCP, Named Pipes, custom protocols) which are all callable at the same time. This allows the DCM system to interface with many different systems, technologies and platforms.

A DCM engine facilitates communication between the G2S Host & DCM system Databases, manages the execution of assignments and their status, and contains most of the system's business logic.

A DCM engine may be a Component of SOA architecture which delivers solutions to business agility and with flexibility. Because this service exists independently of one another as well as of the underlying IT infrastructure, they can be combined and reused with maximum flexibility.

The functionality of a DCM engine may be made available for access (consumption) by other systems, clients. One goal, among others, of the consumption process is to deliver new, dynamic applications that enable increased productivity and enhanced insight into business performance. Users can consume the composed service through a number of avenues, including Web portals, rich clients, various business applications, complex services, or cross-functional business processes.

A DCM engine is well defined by XML messages & invokable Interfaces. Each interaction is independent of each and every other interaction and the interconnect protocols of the communicating devices (i.e., the infrastructure components that determine the communication system do not affect the interfaces). Because interfaces are platform-independent, a client from any device using any operating system in any language can use the service.

Figure 19:
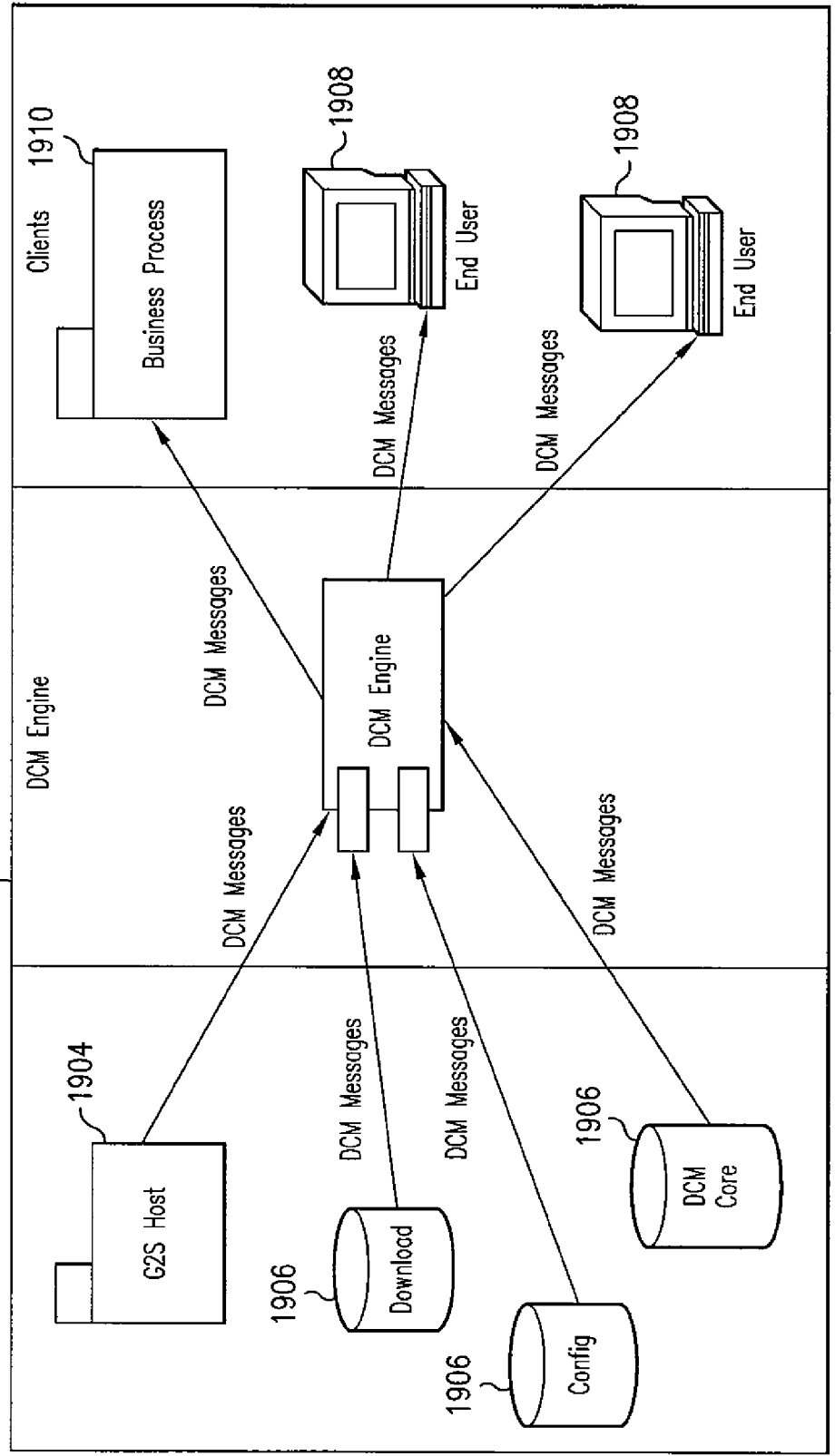
FIG. 19 is a schematic of a networked system including a DCM engine (server) according to one nonlimiting embodiment.

Referring to FIG. 19, a networked system 1900 may include a download and configuration management (DCM) engine (server) 1902 in accordance with one or more embodiments. DCM Engine 1902 may run on a collection of technologies such as SOAP & XML. Interactions between a communicating system and the DCM Engine 1902 may be done by XML messages through SOAP protocol. The DCM Engine 1902 may communicate to a G2S Host 1904 and with various databases 1906.

Due to the decoupled nature of the networked system 1900, the DCM engine 1904 may maintain DCM system state information during processing and system interactions. The DCM engine 1904 may maintain DCM system state information by persisting state information using a key/value dictionary. The DCM engine 1904 includes a DCM engine state management that, among other things, functions to persist and maintain the state of DCM operations even after a communication failure.

The DCM Engine 1902, which may run as a Microsoft Windows service, may be able to run by itself on a separate server. In some embodiments, the server running the DCM engine 1902 does not run any G2S Hosts or any Databases. In some embodiments, the DCM Engine 1902 may be physically disconnected from the G2S Host 1904 and may run on its own processes and may remotely connect to the G2S host 1904, which may run on its own processes. In that case, the DCM engine 1902 may maintain state information about the status of scheduled DCM assignments. Whenever there is a change in the status of a Download, Install or Configuration on a respective gaming machine, the G2S Host 1904 is updated by the respective gaming machine through G2S messages, which are based on the operations. Thus, the status of the various operations is known via the G2S messages, which may be validated. The G2S messages may be stored to a database by the G2Shosts for persistence (see FIG. 2A). Based on the statuses of the operations, the messages get updated on a DCM Message Queue and corresponding databases. From this DCM Message Queue, the messages are read and, as per the various operations. Status updates that correspond to the messages read by the DCM message queue are sent to end users 1908 or business process 1910 which invoked them.

Figure 20:
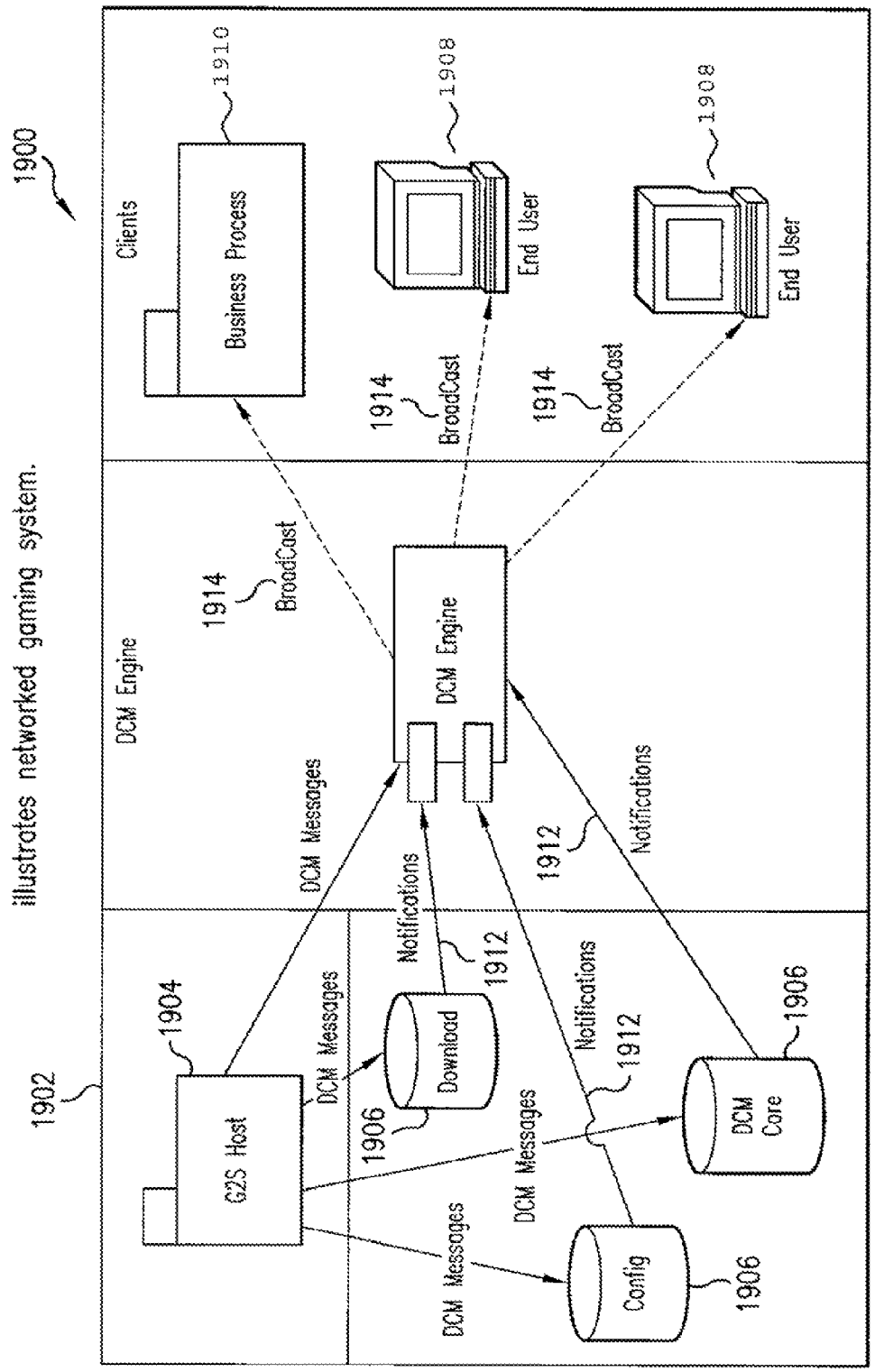
FIG. 20 is a schematic of a networked system including a DCM engine (server) recovering from a power failure according to one nonlimiting embodiment.

Referring to FIG. 20, in the case of a power or communication failure, the DCM Engine 1902 might not be able to communicate with the G2S Host 1904. When the power or communication link has been restored, the DCM Engine 1904 receives the status notifications 1912 from the various databases 1906. The DCM engine 1904 may broadcast status updates 1914 to registered end users 1908 and/or business processes 1910 in order to update registered end users 1908 and/or business processes 1910 as to the status of DCM jobs such as download jobs and configuration jobs.

Among other things, the DCM Engine 1902 processes each message from a DCM Job status message queue. The DCM Engine 1902 identifies a respective Job ID from a respective message and gets assignment or job bundle information from the database 1906. The DCM Engine 1902 parses through the assignment or job bundle identifying the next assignment or job to be run, which may depend on the on error conditions of the previous assignment or job. The DCM engine 1902 includes a Work Flow module that then calls a JobCreator passing in a new Job ID that has to be executed. This cycle is executed for each job in that job-bundle or assignment until all the jobs are executed.

The DCM Engine 1902 offers intelligence that manages multiple client requests to ensure that execution of requests are guaranteed, efficient, and prioritized based on a predetermined priority schedule.

Assignment Templates in a gaming configuration and download system.

Casino personal may use an assignment-creator/modifier application for creating assignment templates for jobs such as jobs for downloads and configurations. The assignment-creator/modifier application may be stored on a control station 320 or client 502 or a server such as casino management system server 304. The assignment-creator/modifier application may have a client-server architecture.

An assignment template is a reusable Download and Configuration Manager (DCM) assignment describing what G2S download or configuration options are to be used.

An assignment template allows the user of the DCM system to save commonly created assignments as reusable assignment templates for later use, which saves time because the user does not need to routinely create common assignments.

The assignment-creator/modifier application reduces the complexity associated with creating assignments with advanced configurations which require additional effort in comparison with common assignments. An assignment template may apply to any download and configuration assignment for any G2S enabled gaming device regardless of the manufacturer.

The following example demonstrates the use of an Assignment Template named 'Fast Reel Speed'. The saved Assignment Template has been reopened and becomes an "assignment under construction". Now changes can be made before it is submitted for approval and executed.

Referring to FIG. 21, a top level window or screen 2100a of an assignment-creator/modifier graphical user interface (GUI) is shown. Such window or screen 2100a may be displayed on a display at a control station 320 or client 502. Other windows or screens 2100b-2100e, shown in FIGS. 22-25, respectively, may also be displayed on a display at a control station 320 or client 502.

When an assignment-creator/modifier application first loads, the user (e.g., casino personnel) is presented with a graphical user interface that includes an input box, Name, 2102 and an input box, Description, 2104. The user provides an assignment name or identifier in the input box 902 and provides information describing the assignment template being created using input box 2104. Among other things, the user may describe the function of the assignment template and any other information that the user may decide to input.

The assignment-creator/modifier application GUI also includes a save button 2106a, a back button 2108, a next button 2110, and a cancel button 2112. The back button 2108 and next button 2110 are used to navigate between screens 2100a-2100e of the assignment-creator/modifier application GUI. In screen 2100a, the back button 2108 is inoperative because screen 2100 is the top level screen of the assignment-creator/modifier application GUI and is shaded to signify inoperability.

The save button 2106 is used to save a copy of the current assignment template being created, and the cancel button 2112 causes the assignment-creator/modifier application to quit. If the current assignment template being created has not yet been saved, then information provided by the user is not saved if the cancel button 2112 is selected. If the current assignment template has been saved, then information provided since the most recent save is not saved if the cancel button 2112 is selected. The assignment-creator/modifier application GUI includes a box, Version, 2114 that displays the current version of the assignment being created.

Figure 22:
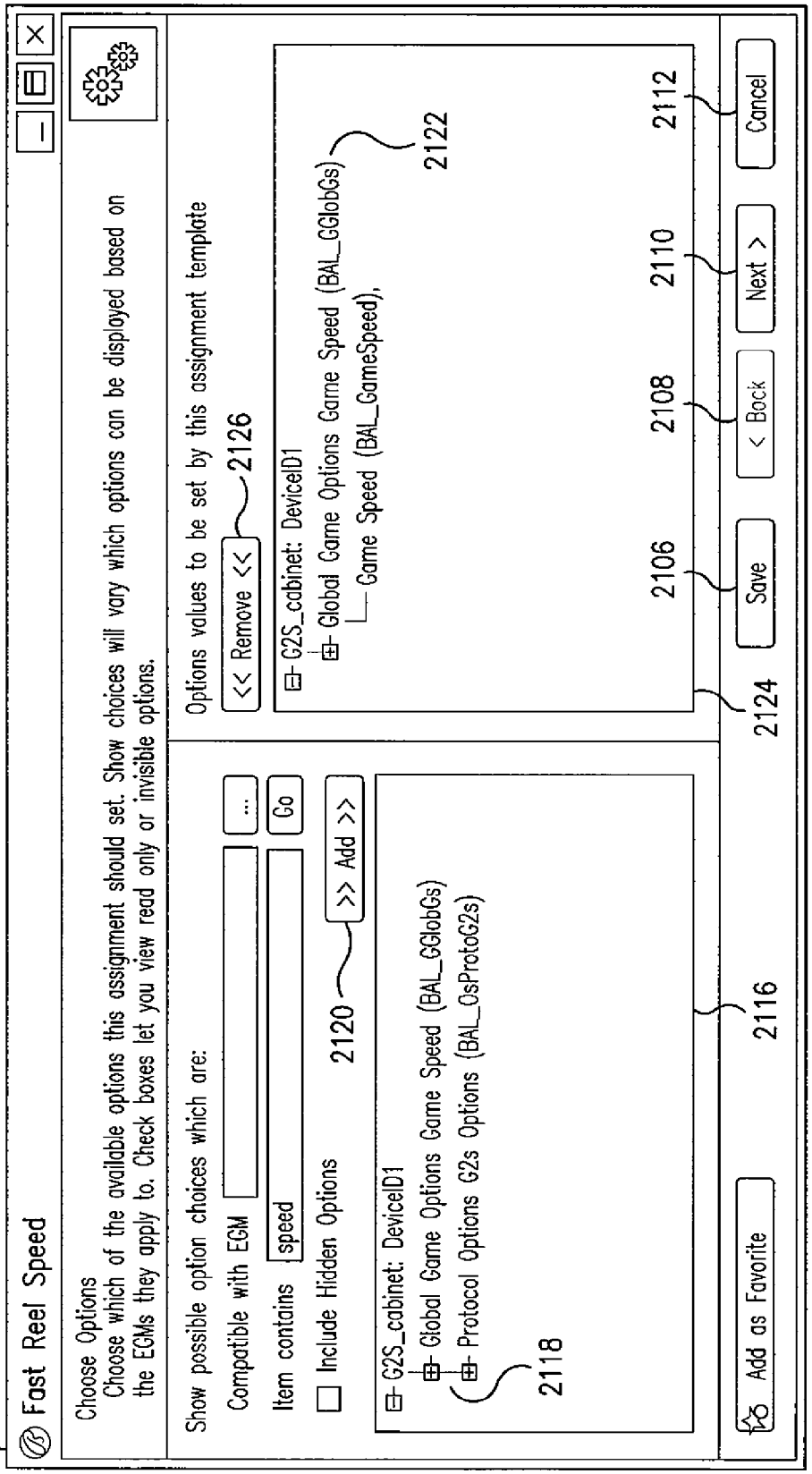
FIG. 22 is a screen print showing a graphical user interface (GUI) display panel of an assignment-creator/modifier program according to one nonlimiting embodiment.

Referring to FIG. 22, the lower level window or screen 2100b of the assignment-creator/modifier graphical user interface (GUI) is shown. The screen 2100b allows a user to choose which options may be set by the assignment template being created. A window 2116 displays selectable options 2118 for the assignment template being created. The selectable options 2118 may have a tree structure where the branches are expandable and collapsible.

The user selects an option and clicks on an add button 2120. The selected option 2122 is then displayed in a window 2124. In some embodiments, once an option has been selected, the option is no longer displayed in window 2116. The user may de-select any one of the selected options 2122 by using a remove button 2126. The user selects the option to be de-selected and actuates by for example clicking on the remove button 2126. After the remove button 2126 has been actuated, the option for de-selection is removed from window 2124.

In some embodiments, once an option has been added to window 2124, the option is no longer displayed in window 2116. Similarly, once an option has been removed from window 2124, the option is only displayed in window 2116.

Figure 23:
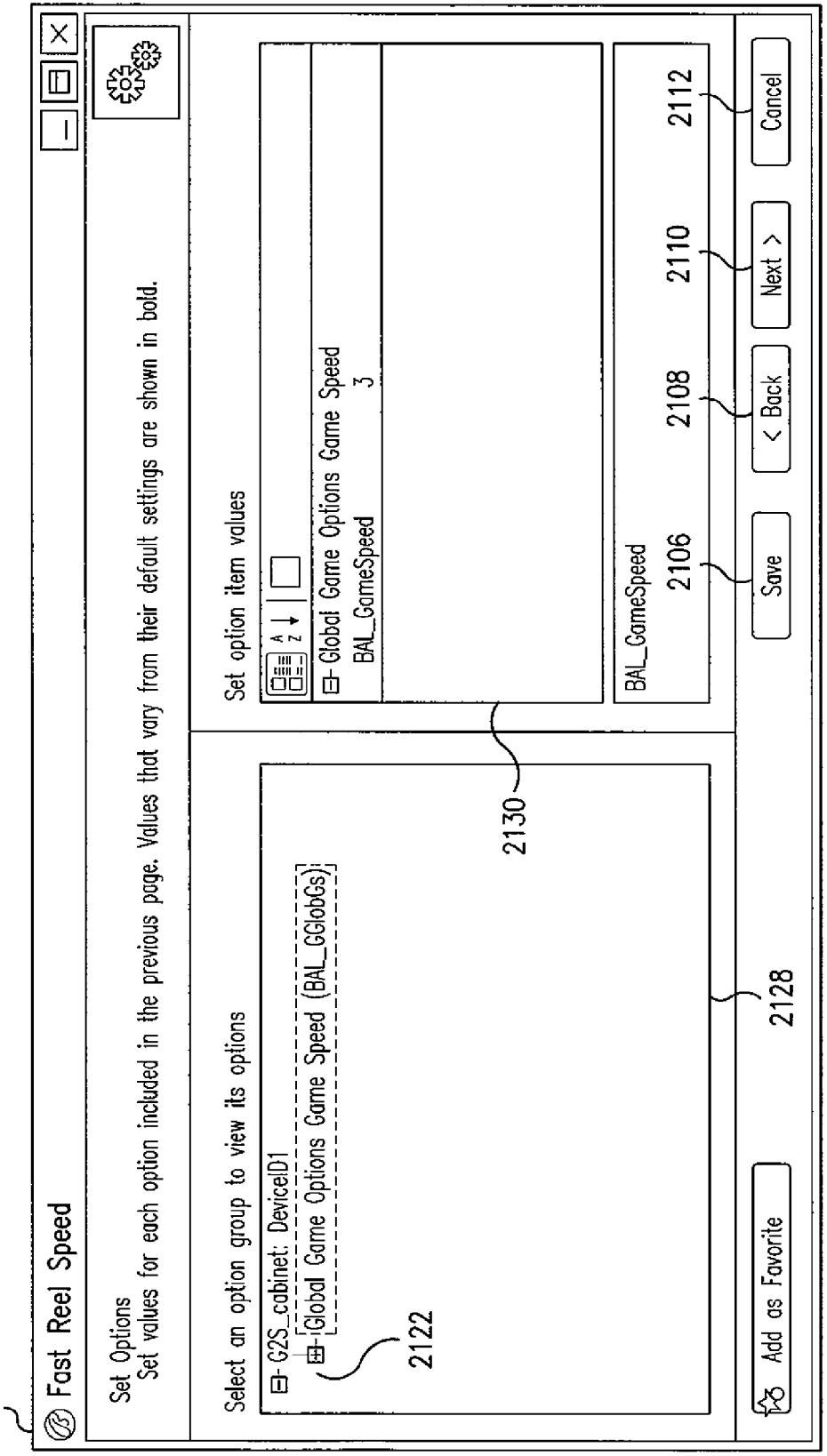
FIG. 23 is a screen print showing a graphical user interface (GUI) display panel of an assignment-creator/modifier program according to one nonlimiting embodiment.

Referring to FIG. 23, the lower level window or screen 2100c of the assignment-creator/modifier graphical user interface (GUI) is shown. The screen 2100c allows a user to change the value for the configuration options which remain in the assignment. The user selects one of the selected options 2122 in window 2128. In window 2130, the user sets a value for the option.

Figure 24:
FIG. 24 is a screen print showing a graphical user interface (GUI) display panel of an assignment-creator/modifier program according to one nonlimiting embodiment.

Referring to FIG. 24, the lower level window or screen 2100d of the assignment-creator/modifier graphical user interface (GUI) is shown. The screen 2100c allows the user review the completed assignment as "applied" in a window 2132. If the user decides to change assignment as applied, the user may use back button 2108 to navigate to the appropriate screen.

Referring to FIG. 25, the lower level window or screen 2100e of the assignment-creator/modifier graphical user interface (GUI) is shown. The screen 2100e includes a window 2134 that allows the user to review the completed and applied assignment. Typically, a supervisor reviews the current and applied assignment template. The window 2100e includes a finish button 2136, which is used to save the completed and applied assignment.

Another novel feature when scheduling an assignment is that one can make the assignment 'temporary'. This is a mechanism by which a DCM operator can schedule option changes that may be in effect for a limited period of time. When the time expires, the system automatically runs a job to restore the EGM's options to their previous state. This saves the operator from having to schedule two jobs, and also relieves them of the burden of knowing what to do to restore the previous state.

One example of the use of the GUI display panel would be to Configure the attract sound for the Halloween weekend to be 'spooky' across many game themes. When the override expires, the system may restore the sound to each of them correctly without the operator needing to know in each case what that value was. This is accomplished in part by keeping track of each option change the system makes in the DCM engine programming, such as with modules for an Option Item Assigned Value and Configuration.

Assignment Bundle

Figure 26A:
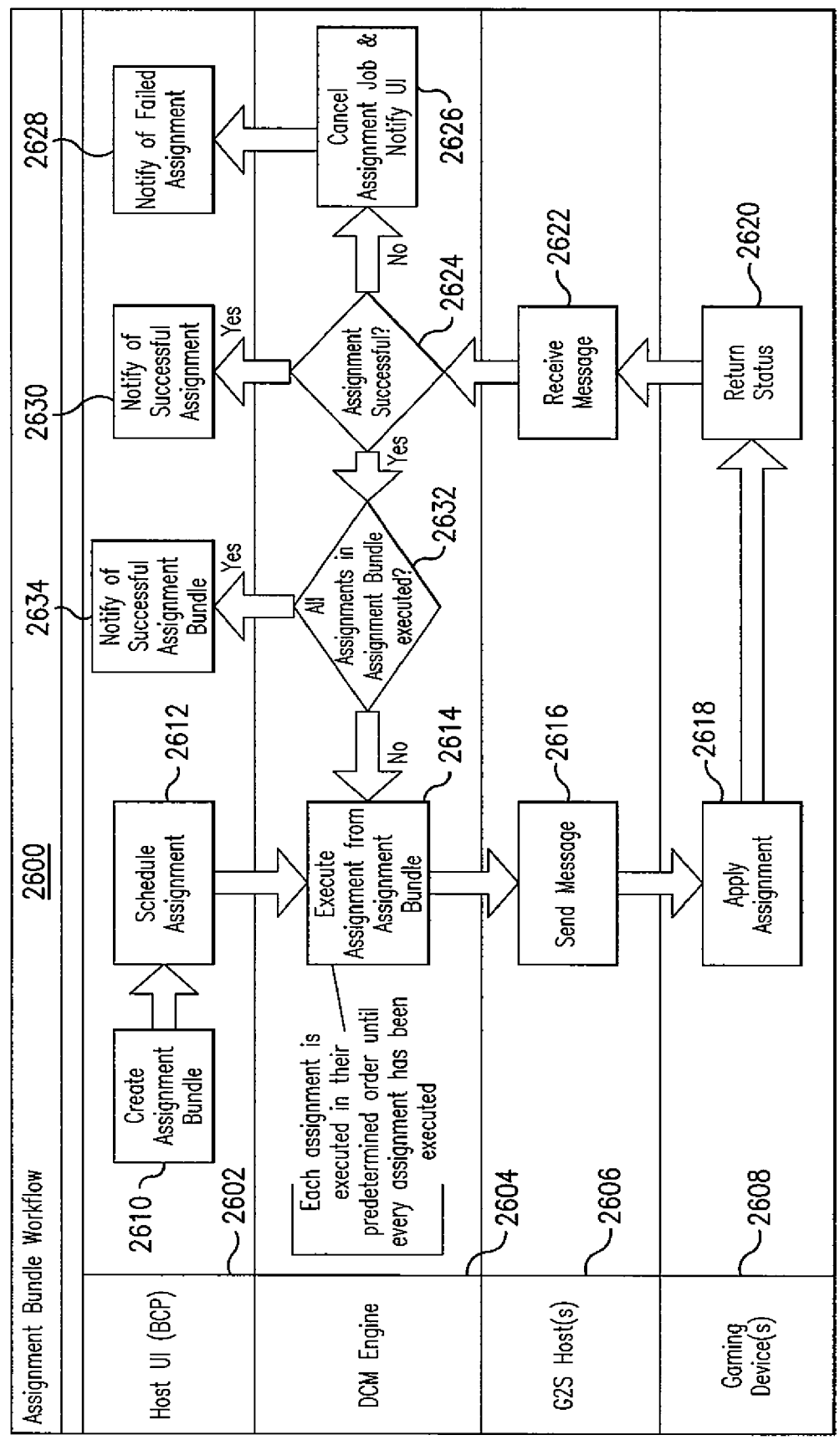
FIG. 26A is a flow diagram of a procedure for creating and implementing a bundle assignment according to one nonlimiting embodiment.

FIG. 26A is a flow diagram of a procedure 2600 for creating and implementing a bundle assignment. Various portions of the procedure 2600 may be performed at a control station or client 2602 having a host user interface (UI), and other portions of the procedure may be performed at a DCM engine 2604, a G2S Host 2606, and a gaming machine or gaming device 2608.

At 2610, a user of the client 2602 creates an assignment bundle. The assignment bundle may be a collection of jobs. In some situations, the various jobs in the assignment bundle may be processed sequentially, and in other situations, some or all of the various jobs may be processed concurrently. In some embodiments, the user may define the sequence in which the jobs are processed. In other embodiments, logic of the download and configuration management server system 318 may define the sequence in which the jobs are processed.

Normally, the client 2602 is running assignment-bundle software that presents an assignment-bundle graphical user interface and which may be integrated in the control panel 308. When an assignment-bundle application first loads, the user (e.g., casino personnel) is presented with a graphical user interface for creating an assignment bundle.

Figure 26B:
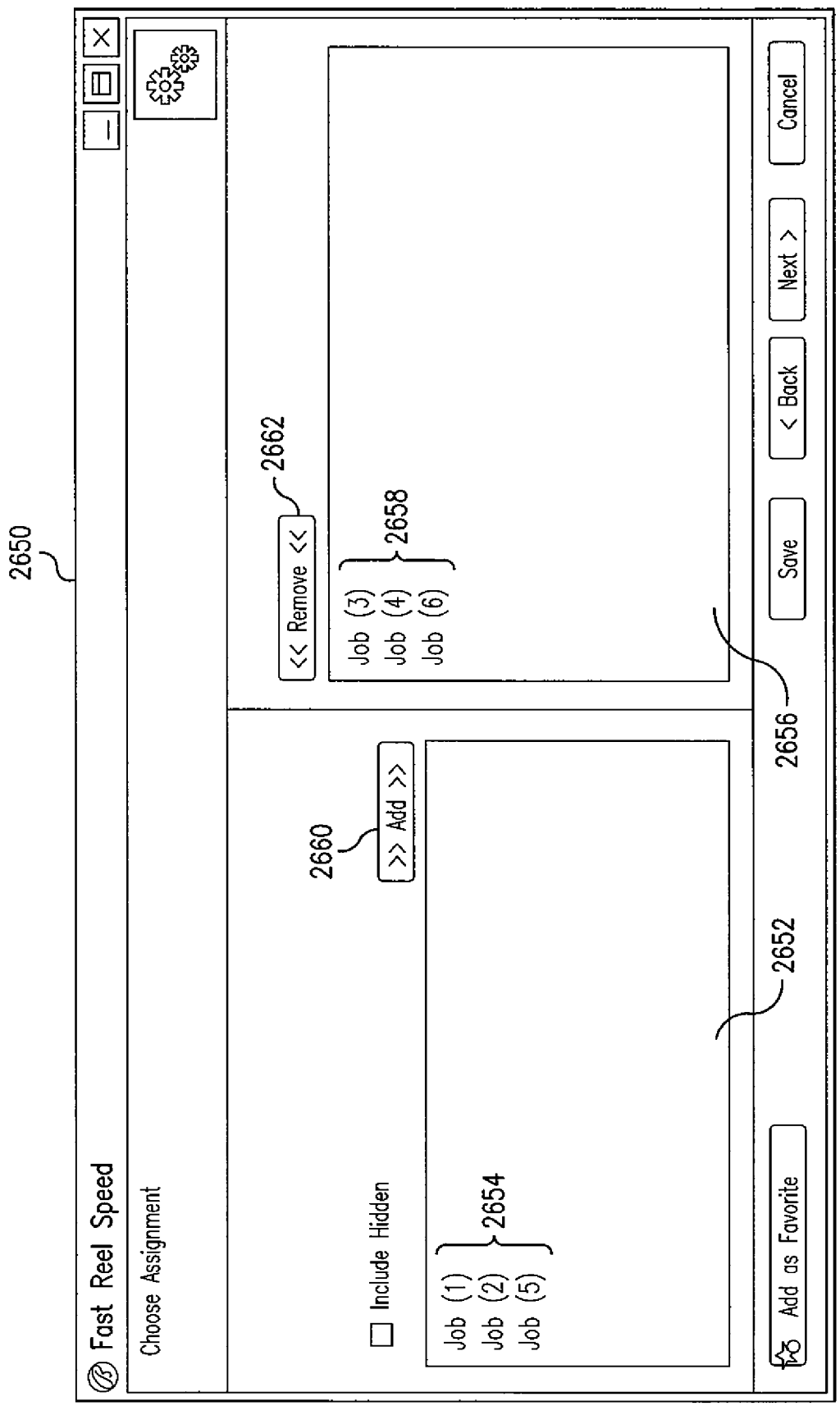
FIG. 26B is a window of an assignment-bundle graphical user interface according to one nonlimiting embodiment.

Referring to FIG. 26B, a top level window or screen 2650 of an assignment-bundle graphical user interface (GUI) is shown. Such window or screen 2650 may be displayed on a display at the client 2602 via the host user interface of the client 2602. A window 2652 shows possible jobs 2654 that may be included in an assignment bundle such as Download, Install & Various Options to be configured on the EGM(s). A window 2656 shows jobs 2658 that have been selected for inclusion in the assignment bundle. Add button 2660 allows the user to add one of the possible jobs 2654 to the number of selected jobs 2658. Remove button 2662 allows the user to delete one of the selected jobs 2658, and the deleted job is then listed in the possible jobs 2654. The user may specify an execution sequence for the selected jobs 2658.

The assignment bundle may be applied to multiple gaming devices on the floor. Workflow may be configured in such way that once the DCM Engine 2604 picks up a job from a Queue and the assignment has been processed on the EGM, the DCM Engine 2604 may determine to pick the next job from the same Queue to be processed on those EGMS. Typically, the DCM Engine 2604 may determine to pick the next job based on the status of the current job.

At 2612, the assignment bundle is submitted for processing at a scheduled time, which is typically after the time the assignment bundle was submitted, but the scheduled time may be the same as the time at which the assignment bundle was submitted. The assignment bundle may be submitted to the download and configuration management server system 318.

At 2614, a job of the assignment bundle is executed. In some embodiments, the DCM engine 2604 executes the jobs in accordance with the predetermined sequence.

At 2616, the G2S host 2606 sends a message to the gaming device 2608, where the gaming device 2608 is the target of the current or immediately preceding job being executed at the DCM engine 2604. For example, the current job being executed by the DCM engine 2604 may be an assignment to download content to the gaming device 2608, and the G2S host 2606 may send the message while the job to download content is still being executed at the DCM engine 2606, or the G2S host 2606 may send the message once the job to download content is no longer being executed at the DCM engine 2606.

At 2618, the gaming device 2608 applies the current job. For example, the gaming device 2608 may begin downloading content from a content server. Similarly, the gaming device 2608 may apply configuration changes, which causes the gaming device to be reconfigured.

At 2620, the gaming device 2608 returns status information of the gaming device 2608. For example, the status information may indicate an amount of content that has been downloaded or current configuration settings, etc.

At 2622, the G2S host 2606 receives a message from the gaming device 2608 that includes the status information. The status information is provided to the DCM engine 2606.

At 2624, the DCM engine 2606 determines whether the current job has been performed success or is being performed successfully. If the determination is "no," then the process continues at 2626, where the DCM engine 2604 cancels the current job. In some situations, if one job in an assignment bundle is cancelled, then all subsequent jobs of the assignment bundle that have not yet been executed by the DCM engine 2604 are also cancelled. In some situations, if one job in an assignment bundle is cancelled, then subsequent jobs of the assignment bundle that have not yet been executed by the DCM engine 2604 may still be executed. The DCM engine 2604 notifies the client 2602 of the failure of the job, and then, at 2628, the client 2602 notifies the user of the failed job.

On the other hand, if the determination at 2624 is "yes," the DCM engine 2604 notifies the client 2602 of the success of the job, and then, at 2630, the client 2602 notifies the user of the successful completion of the job.

In addition, the determination at 2624 is "yes," then at 2632, the DCM engine 2604 determines whether there are any more jobs in the assignment bundle. If the determination is "no," then the DCM engine 2604 notifies the client 2602 of the success of the assignment bundle, and then, at 2634, the client 2602 notifies the user of the successful completion of the assignment bundle.

On the other hand, if the determination at 2632 is "no," the process continues at 2614, where the DCM engine 2604 begins execution of a job of the assignment bundle that has not yet been executed.

User Authorization System

Figure 27:
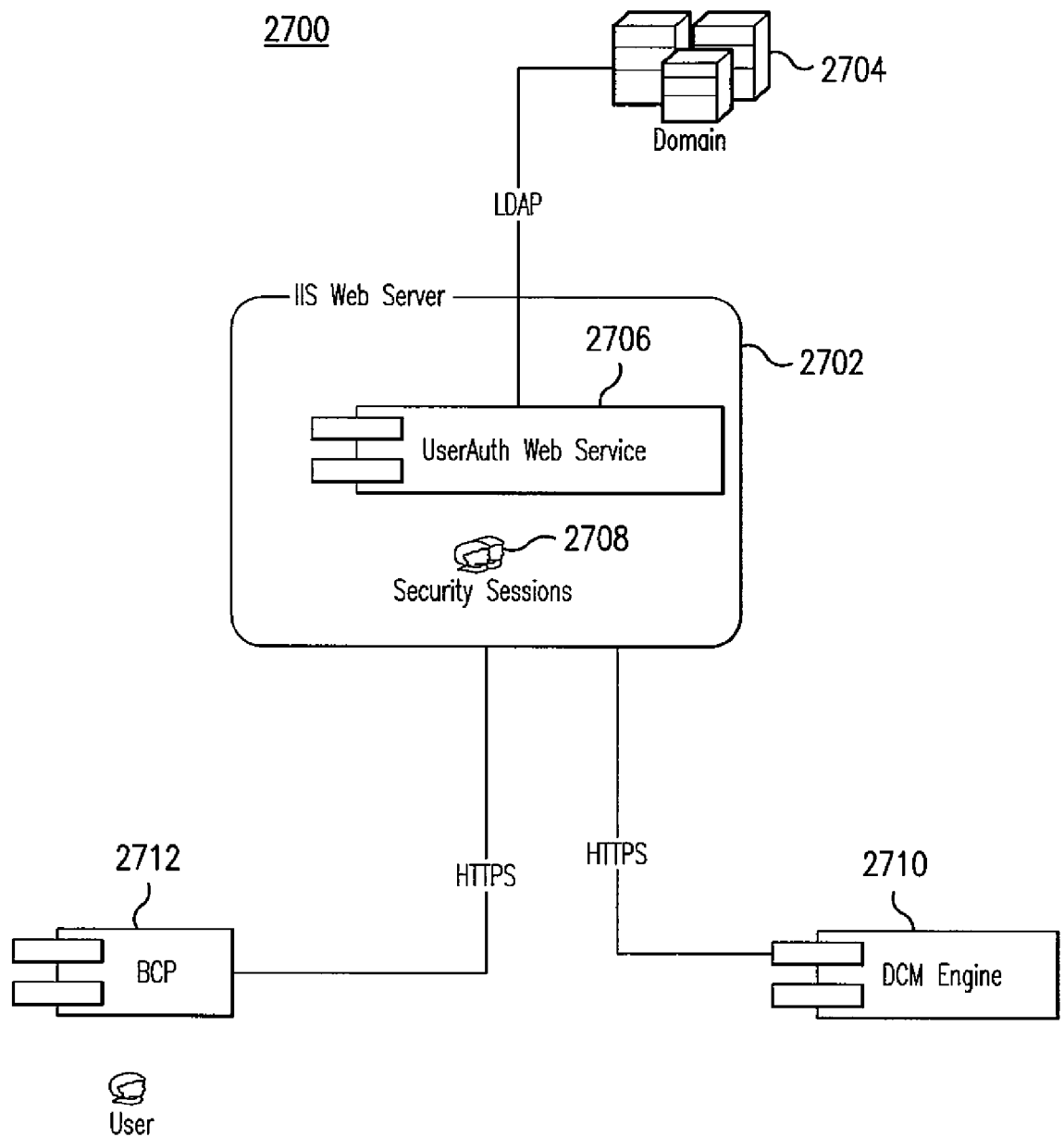
FIG. 27 is a schematic of a networked gaming system including a DCM engine including a User Authorization Web Service according to one nonlimiting embodiment.

Referring to FIG. 27, a user-authorization (Authweb) system 2700 is shown and which may be a Service Oriented security system. The architecture of the Authweb system 2700 follows Service Oriented Architecture (SOA), which offers the advantage of being interoperable with various systems and technologies.

The Authweb system 2700 includes a web server 2702 such as an internet information server and a security store 2704 that is communicatively coupled to the web server 2702. The web server 2702 hosts a user-authorization web service 2706 and caches user security credentials in a memory for current user security sessions 2708.

The security store 2704 stores user security credentials for users of the Authweb system 2700. Among other things, the security store 2704 provides requested user security credentials to the web server 2702. The security store 2704 may also determine whether a logon request is valid based at least on information provided in the logon request.

The security store 2704 may take a variety of forms including one or more servers running a version of Microsoft Windows operating system, one or more databases, one or more servers running a version of UNIX operating system or Linux operating system, etc. In the embodiment shown in FIG. 27, the security store 2704 includes one or more servers running a version of Microsoft Windows operating system, which comprise a Windows server domain, and the web server 2702 communicates with the Windows server domain via lightweight directory access protocol (LDAP).

The web server 2702 is communicatively coupled to a DCM engine 2710 and a control station or computing device or the like running an application such as a control panel 2712, which may take the form of a Bally control panel. Communications between the control panel 2712 and the user-authorization web service 2706 may be via a communication protocol such as hypertext transfer protocol over secure socket layer (HTTPS), as may be the communications between the DCM engine 2710 and the user-authorization web service 2706.

A user may use the control panel 2712 to log into a system and/or the DCM engine 2710. The user-authorization web service 2706 may be a gateway to the system and/or the DCM engine 2710. The user-authorization web service 2706 receives login information from the control panel 2712 are retrieves a security credential that corresponds to the login information. The retrieved security credential is cached in a memory of the web server 2702. Upon successfully logging in, a security session 2708 is established at the user-authorization web service 2706. From time-to-time, the user-authorization web service 2706 may use the cached security credential and may maintain the session of the control panel 2712 and/or create a new session.

The Client or Control Panel:

Among other things, the client or control panel 2712 may do the following:
1. Defines SoapHeader attribute using "UserAuthHeader", which may be applied to XML web method to process
2. Defines a public attribute—"UserAuthHeader", which contains "UserToken" and "UserName" properties that may be updated by "AuthWeb" during the process. All of properties of "UserAuthHeader" may be checked before the web method is executed for Soap Header validation
3. Assigns operation permission to each web method based on Role-based access policy defined in Authorization store. Before the web method is called, the web method needs to send its operation permission to UserAuthWeb to match the users' permission so as to decide if user has proper rights to run the called web method. The checking process is executed by UserAuthWeb based on users' token, users' operation, and application name.

The AuthWeb or User-Authorization Web Service:

Among other things, the AuthWeb or user-authorization web service 2706 may do the following:
1. Check operation permissions, which are defined by an authorization store, that are sent by client applications to determine if user has proper rights to perform a secured task.
2. Check client application name, users' token, and users' operation.
3. Get users' session from Http runtime cache if user if running there,
4. Check users' session on Logon Credential, which consists of users' name, application name, authority name, user password, terminal name attributes
5. Check users' session on Logon Lease, which consists of Logon Token, session minutes, password expiration time attributes
6. Retrieve specific user account information from active directory
7. Retrieve user account list being defined in active directory
8. Create a new user account inside active directory
9. Reset and change user password inside active directory
10. Enable and disable specific user account inside active directory
11. Lock and unlock specific user account inside active directory
12. Add user account to a specific user group
13. Remove user account from a specific user group
14. Add or delete a computer from active directory organization unit
15. Retrieve operation definitions from authorization store The Interaction:
1. Client web application is using "UserAuthHeader" attribute as Soap Header to define web methods. This attributes contains user logon information that may be updated by AuthWeb using session current runtime cache.
2. AuthWeb retrieves information from both Active Directory and Authorization Store.
3. AuthWeb compares user session information on logon credential and logon lease to make sure if current user has enough rights and permissions to run requested secured operations being defined by authorization store policy.

The User Authorization System offers a single role based authorization security solution for multiple systems, platforms, and technologies.

Figure 28:
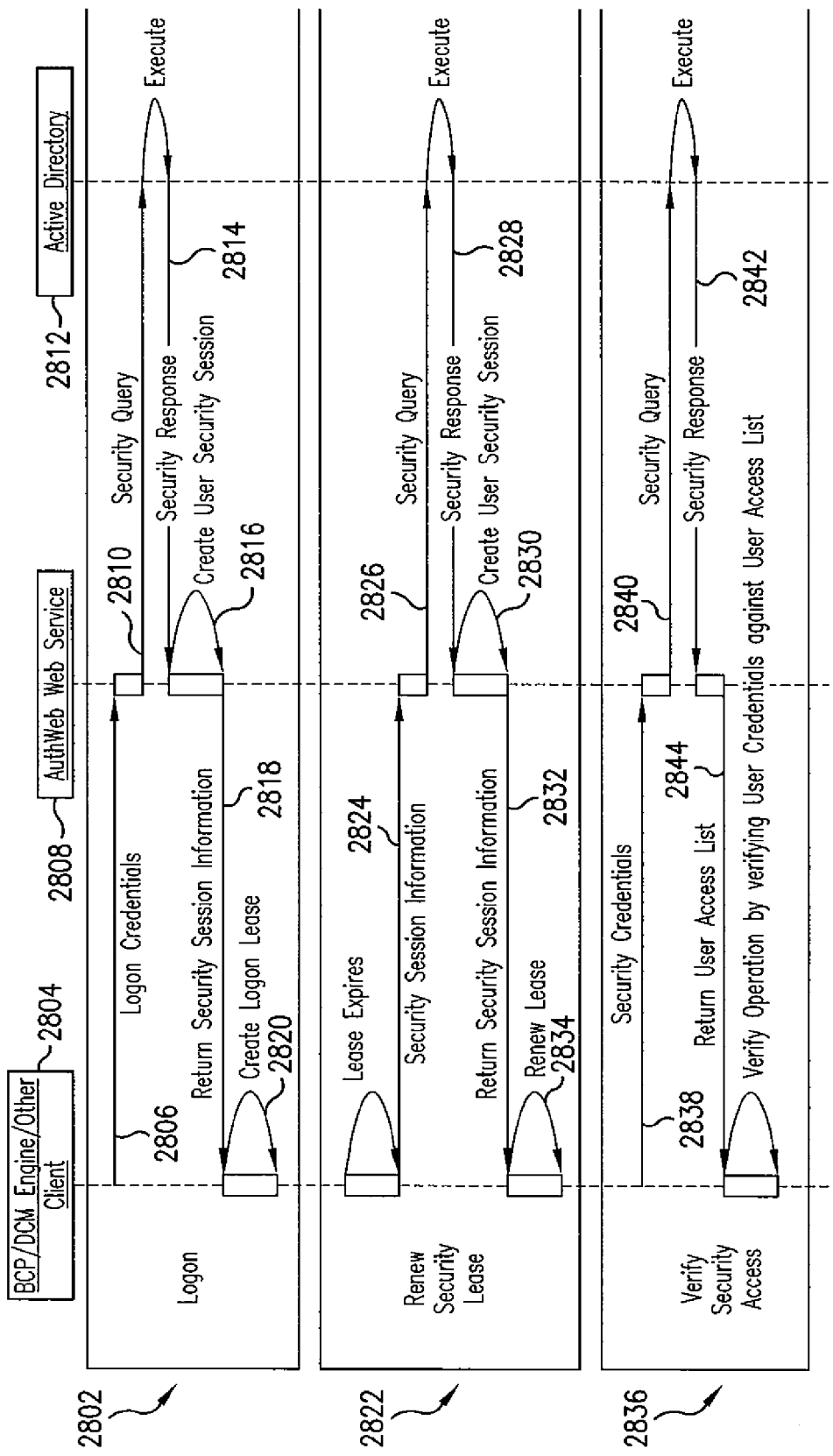
FIG. 28 illustrates a process flow of a networked gaming system including a DCM engine including a User Authorization Web Service according to one nonlimiting embodiment.

Referring to FIG. 28, a logon process 2802 is shown. A client application 2804 such as a Bally control panel provides logon credentials 2806 such as a user-name and password to a user-authorization web service 2808. The user-authorization web service 2808 sends a security query 2810 to a security store 2812. The security query may include information indicative of the logon credentials and/or may include the security credentials themselves.

The security store 2812 sends a security response 2814 to the user-authorization web service 2808. The security response 2814 may carry security credentials and/or information indicative of whether allow the application 2804 to logon. In some embodiments, the security store 2812 may determine whether a logon request from the application 2804 is valid based at least on information carried by the security query 2810. For example, the security store 2812 may compare security credentials carried by the security query 2810 with valid security credentials stored in the security store. If the security store 2812 determines that the logon request is valid, the security store 2812 may include a user security credential for a user account that is associated with the logon credentials in the security response 2814. If the security store 2812 determines that the logon request is invalid, the security store 2812 may include information indicative of the invalidity of the logon request in the security response 2814. In some embodiments, if the security store 2812 determines that the logon request is invalid, the security store 2812 will not include user security credentials in the security response 2814, and the absence of the user security credential is an indicator that the logon request is invalid.

Based at least in part on the security response 2814, the user-authorization web service 2808 may create a user security session 2816 and provide security session information 2818 to the client application 2804. The security response 2814 may include a user security credential that is associated with a user account that matches the logon credentials 2808. In some embodiments, the user security session 2816 may expire after a period of time, and the security session information 2818 may include a token or information indicative of when the user security session 2816 will expire.

The client application 2804 may create a logon lease 2820. If the logon lease 2820 expires, then the client application 2804 may be logged out.

FIG. 28 also shows a process 2822 to renew the security lease 2820. Before the logon lease 2820 expires, the client application 2804 sends security session information 2824 to the user-authorization web service 2808. In some embodiments, the user-authorization web service 2808 sends a security query 2826 to the security store 2812, which returns a security response 2828. In some embodiments, the user-authorization web service 2808 may have cached security response 2814. Based at least in part on the security response 2828 (or security response 2814), the user-authorization web service 2808 may create or renew a user security session 2830 and provide security session information 2832 to the client application 2804. The security session information 2832 may include a token or information indicative of when the renewed or newly created user security session 2830 will expire. The client application 2804 may create a new logon lease 2834 or renew the prior logon lease based at least on the security session information.

FIG. 28 also shows a process 2836 to verify security access. The client application 2804 sends security credentials 2838 to the user-authorization web service 2808. The user-authorization web service 2808 sends a security query 2840 to the security store 2812, which returns a security response 2842. The security response 2842 may include a user access list, which may define access levels granted to the user of the client application 2804. The user-authorization web service 2808 may provide user access list 2844 to the client application 2804. The client application 2804 may create verify operations requested by the user via the user access list 2844.

Figure 29:
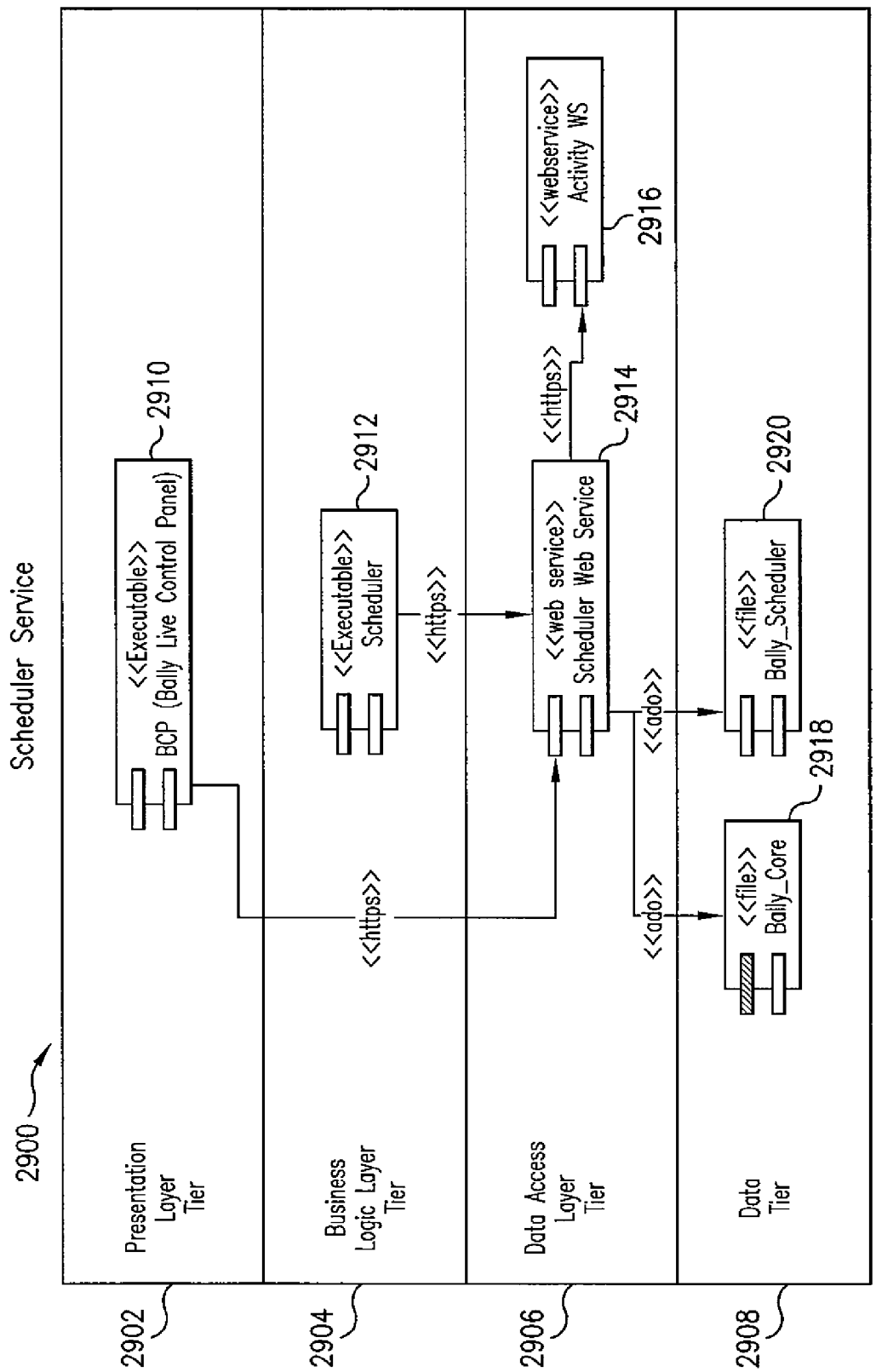
FIG. 29 is a block diagram of a scheduler service in a gaming network according to one nonlimiting embodiment.

Referring to FIG. 29, an example block diagram of a scheduler service 2900 is shown. The scheduler service 2900 includes a presentation layer 2902, a business logic layer 2904, a data access layer 2906, and a data tier 2908. The presentation layer 2902 includes an application 2910 such as a control panel or Bally control panel. The business logic layer 2904 includes a scheduler 2912. The data access layer 2906 includes a scheduler web service 2914 and an activity web server 2916. The data tier 2908 includes a core database 2918 and a scheduler database 2920.

The scheduler web service 2914 communicates with the application 2910, the scheduler 2912, the activity web server 2916, the core database 2918 and the scheduler database 2920. Among other things, the scheduler web service 2914 updates schedule information in the scheduler database 2920 to schedule a service. The activity web server 2916 is a gateway to other systems. The activity web server 2916 initiates a service based at least on the schedule information in the scheduler database 2916.

The Scheduler (Scheduler Service) may be implemented as an executable program. There are two types of Scheduling: Download Scheduling and Config Scheduling.

Configuration assignments may be run in order by schedule type: Permanent, Permanent with start date, Re-occurring Override, One Time Override. Within a schedule type, the assignment with the earlier start date may be initiated first. Within matching start dates, assignments having static collections may be initiated before dynamic; if still tied, those assignments with earlier create dates may be initiated first. Configuration assignments of permanent and permanent with start date may only contain static collections.

Download Scheduling gets the start date that download process begins. It may take an indeterminate amount of time for the downloaded package to be ready to be installed on a given EGM. Also, to avoid download conflict, if multiple download assignments exist for the same module type on an EGM, the assignment with the latest creation date takes precedence.

The Scheduler may use the Schedule database.

An example Scheduler Composition may include:

| Subcomponent | Description |
| --- | --- |
| Error Handlers | Process and gracefully handle exceptions |
| Logging | Output of event and diagnostics |

Example Interactions may include:
Scheduler listens to Schedule database
Scheduler interacts with Schedule Web service The Web Service may use a Windows® Server version 2000 or 2003 (hereby incorporated by reference) with the following Windows® components running:
.net Framework version 2.0
Internet Information Server (IIS)

Processing—The Scheduler Service may query the Schedule database for jobs that are scheduled to be run. The Scheduler may initiate the processing of the jobs by notifying the GUI Download Web Service or the GUI Configuration Web Service.

Interface/Exports—The Scheduler Service may consume the Activity Web Service to log its processing events. It also interacts with the Schedule SQL database with ActiveX Data Objects (ADO) commands.

Figure 30:
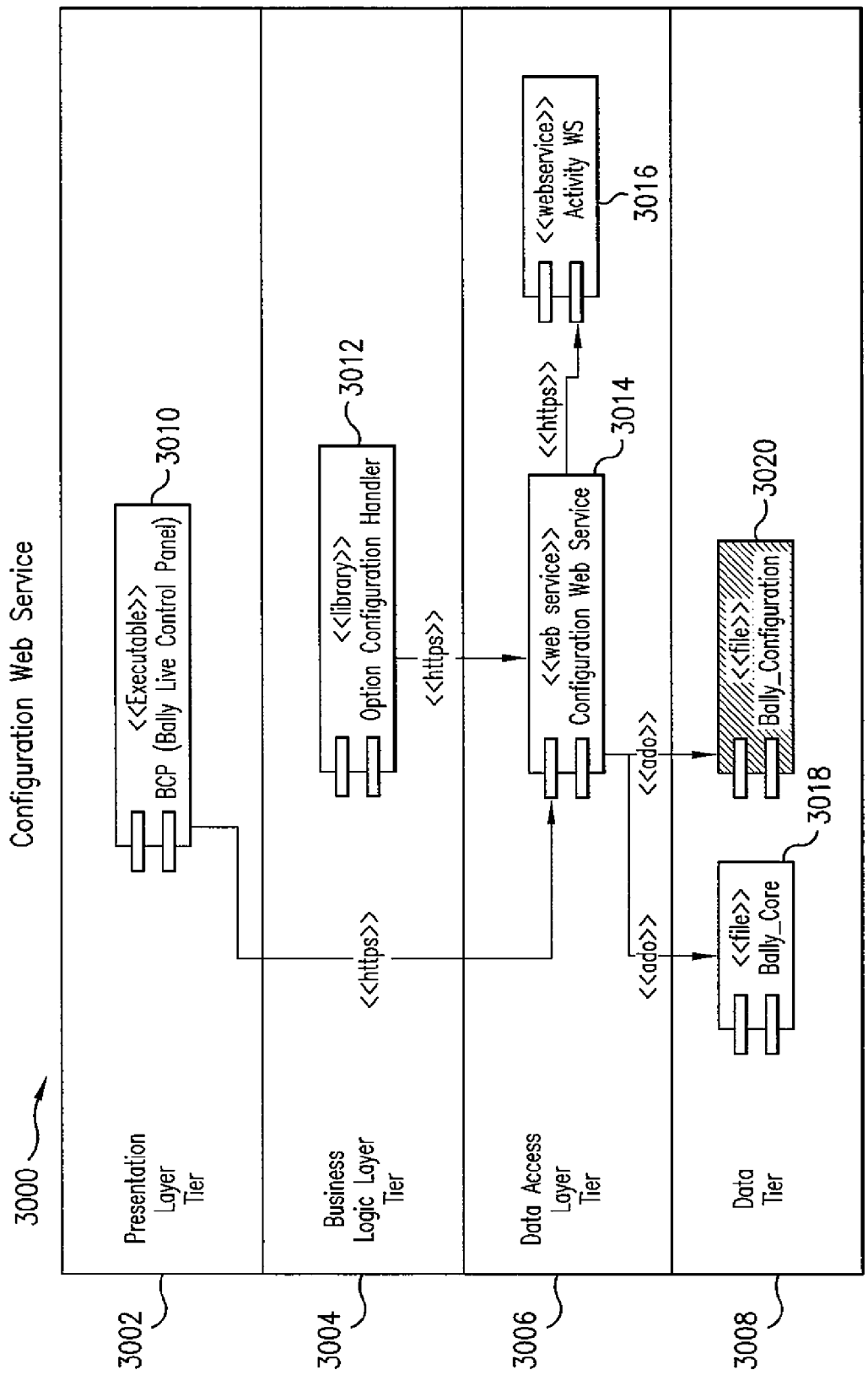
FIG. 30 is a block diagram of a user interface download web service in a gaming network according to one nonlimiting embodiment.

Referring to FIG. 30, an example block diagram of a user interface download Web service 3000 is shown.

The download Web service 3000 includes a presentation layer 3002, a business logic layer 3004, a data access layer 3006, and a data tier 3008. The presentation layer 3002 includes an application 3010 such as a control panel or Bally control panel. The business logic layer 3004 includes an option configuration handler 3012. The data access layer 2906 includes a configuration web service 3014 and an activity web server 3016. The data tier 3008 includes a core database 3018 and a configuration database 3020.

The configuration web service 3014 communicates with the application 3010, the option configuration handler 3012, the activity web server 3016, the core database 3018 and the configuration database 3020.

Classification—Web Service

Definition—The purpose of this Web Service is to expose Web Methods to consuming components to allow the interaction with the Download database. The data access logic required for the BCP to interact with the Download database may be contained within the Download Web Service.

The GUI Download Web Service may responsible for interacting with the Data Tier for those components that are consuming its exposed methods.

The BCP may consume this Web Service and utilize its Web Methods to create and read necessary Download data in the database.

The intent is for the GUI Download Web Service to be used explicitly by the BCP as communication layer with the Download database.

Example Constraints may include:
Consuming components may need to communicate via the Simple Object Access Protocol (SOAP) in order to consume the Web Service
The Web Service may publish a Web Service Description Language (WSDL) to describe the Web service, the message format and protocol details.

The Web Service may return its requested results in the form of a Serialized DataSet.

An example Composition may include:

| Subcomponent | Description |
| --- | --- |
| SOAP Proxy | Communication |
| Data Access Handlers | Process requests made by consuming components by communicating with the database with ActiveX Data Objects (ADO) logic |
| Error Handlers | Process and gracefully handle exceptions |
| Logging | Output of event and diagnostics |

Example Interactions may include:

The GUI Download Web Service may interact specifically with the Control Panel (BCP) via Simple Object Access Protocol (SOAP).

The GUI Download Web Service may interact with the Download SQL database with ActiveX Data Objects (ADO) logic.

The Web Service may require a Windows® Server version 2000 or 2003 with the following Windows components running:

.net Framework version 2.0

Internet Information Server (IIS)

Processing—The GUI Download Web Service may process requests made by consuming components. The requests are made by the consuming component calling the GUI Download Web Services exposed Web Methods. A successfully request is dependent upon the consuming component calling a Web Method by supply the appropriate query parameters as dictated by the Web Service Description Language (WSDL) file. The Web Service processes the request by executing its embedded Business Logic while logging exceptions and events. The resulting output is returned to the consuming component.

Interface/Exports

The GUI Download Web Service may consume the Activity Web Service to log its processing events. It also interacts with the Download SQL database with ActiveX Data Objects (ADO) commands. Its capabilities are exposed as Web Methods which are accessed via the Simple Object Access Protocol (SOAP).

While the example embodiments have been described with relation to a gaming environment, it will be appreciated that the above concepts can also be used in various non-gaming environments. For example, such rewards may be used in conjunction with purchasing products, e.g., gasoline or groceries, associated with vending machines, used with mobile devices or any other form of electronic communications. Accordingly, the disclosure should not be limited strictly to gaming.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/987,338, filed Nov. 12, 2007, are incorporated herein by reference, in their entirety. Aspects of the embodiments can be modified, if necessary to employ concepts of the various patents, applications and publications to provide yet further embodiments.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An authorization system to selectively provide user access to a download and configuration system in a casino, comprising:
   a plurality of gaming machines coupled to a first communications network in a casino;
   a download and configuration system, communicatively coupled to the first communications network and to a second communications network, that provides content that modifies at least one other respective gaming machine of the plurality of gaming machines, wherein the respective gaming machine receives content from the download and configuration system;
   a plurality of control devices communicatively coupled to the second communications network;
   a security store that stores a plurality of security credentials and a plurality of user access lists, each respective security credential associated with a user account, and each user access list associated with a respective user account, the security store being accessible only by a security query, the security store configured to provide a respective security response in response to receiving a respective security query, wherein for a valid security query, the security response includes at least one of a respective security credential or a respective user access list, wherein the respective security credential provides authorization for the user account associated therewith to logon to the download and configuration system, and wherein the respective user access list defines an authorization to access at least a portion of the download and configuration system granted to the user account associated therewith;
   a user-authorization system communicatively coupled to the download and configuration system, the security store and the plurality of control devices, the user-authorization system configured to access the security store to provide the respective security query to the security store in response to receiving, from a respective control device, a logon request for a respective user account and configured to selectively grant or deny the respective user account access to the at least a portion of the download and configuration system in response to the respective security response from the security store by causing access to operations requested by the respective user account to be verified against the respective user access list,
   wherein the security store is accessible only by the user-authorization system.

2. The computing system claim 1 wherein a given user uses a given control device of the plurality of control devices to send a given logon request for a given user account to the user-authorization system, wherein the user-authorization system initiates a given user security session for the given user account in response to receiving a given security response carrying a given security credential that is associated with the given user account, and the user-authorization system includes a buffer that buffers the given security credential associated with the given user account while the given user security session is active.

3. The authorization system of claim 2 wherein the given control device that sent the given logon request creates a logon lease in response to the user-authorization system granting the given user account access to the download and configuration system, wherein the given user security session for the given user account is active during a time period in which the logon lease has not expired.

4. The authorization system of claim 3 wherein from time to time, the given control device provides the user-authorization system with session information to request a renewal of the given logon lease, and the given control device determines whether to renew the given logon lease based at least on given security session information provided from the user-authorization system.

5. The authorization system of 4 wherein the user-authorization system is configured to respond to a respective request to renew a respective logon lease for a respective user account by providing a respective security query to the security store which responds by providing a respective security response, and the user-authorization system is further configured to determine whether to create, or not to create, another user security session or to extend, or not to extend, a current user security session based at least on the respective security response and at least on the respective buffered security credential associated with the respective user account, and the user-authorization system is further configured to determine whether to provide, or not, respective security session information granting renewal of the respective logon lease based at least on the respective security response and at least on the respective buffered security credential associated with the respective user account.

6. The authorization system of claim 2 wherein a respective control device is configured to provide a respective user account at the respective control device with an amount of access to the download and configuration system based at least on a respective user access list associated with the respective user account, wherein the respective user access list is loaded onto the respective control device.

7. The authorization system of claim 6 wherein the user-authorization system is configured to determine whether to provide a respective user access list associated with a respective user account to a respective control device based at least on the buffered security credential associated with the respective user account, where the user account associated with the respective user access list is accessing the download and configuration system from the respective control device.

8. A computer implemented method of selectively providing user access to a download and configuration system in a casino, comprising:
   receiving a respective logon request that includes respective logon credentials from a user account at a respective control device of a plurality of control devices at a user-authorization system, wherein the user account is one of a plurality of user accounts, and wherein the respective logon request is for accessing a download and configuration system that modifies at least one other gaming machines in a casino;
   in response to the received respective logon request, sending a security query to a security store that is accessible only by a security query sent by the user-authorization system and that stores a plurality of user security credentials and a plurality of user access lists, wherein each user security credential is associated with a respective user account of the plurality of user accounts and each user access list is associated with a respective user account of the plurality of user accounts, and wherein the respective security query includes information indicative of the logon credentials carried by the respective logon request;

receiving, at the user-authorization system, a respective security response from the security store that carries information indicative of whether access to the download and configuration system should be granted;

determining whether to grant the respective logon request based at least on the information carried by the respective security response at the user-authorization system;

if the determination of whether to grant the respective logon request is to grant the respective logon request, buffering the respective user security credential associated with the respective user account that sent the respective logon request in a buffer of the user-authorization system, and providing the respective user account with security session information;

receiving a respective user access list from the security store for the respective user account that sent the respective logon request;

providing the respective user account with the respective user access list, wherein the respective user access list limits an amount of access to the download and configuration system granted to the respective user account; and in response to an access to operations request from the respective user account, causing access to operations requested by the respective user account to be verified against the respective access list.

9. The computer implemented method of claim 8 wherein determining whether to grant the respective logon request based at least on the information carried by the respective security response at the user-authorization system includes determining to grant the respective logon request based at least on the respective user security credential associated with the respective user account that sent the respective logon request, wherein the information carried by the respective security response includes the respective user security credential associated with the respective user account that sent the respective logon request.

10. The computer implemented method of claim 8 comprising:

comparing the information indicative of the logon credentials with valid logon credential information associated with the user account that sent the respective logon request;

determining whether the respective logon request is valid based at least on the comparison of the information indicative of the logon credentials with valid logon credential information;

determining whether to include the respective user security credential associated with the respective user account that sent the respective logon request in the respective security response based at least on a determination that the respective logon request is valid; and sending the respective security response from the security store to the user-authorization system, wherein the respective security response carries the respective user security credential associated with the respective user account that sent the respective logon request, and wherein the respective security response carries the respective user security credential associated with the respective user account that sent the respective logon request only if the respective logon request is valid.

11. The computer implemented method of claim 8 comprising:

creating, at the user-authorization system, a respective user security session for the respective user account that sent the respective logon request in response to determining to grant the respective logon request.

12. The method of claim 11 comprising:

from time to time, receiving a respective logon lease renewal request from a respective user account that is logged in and granted access to the download and configuration system;

retrieving from the buffer of the user-authorization system a respective user security credential that is associated with the respective user account;

determining whether to grant the respective logon lease renewal based at least on the retrieved respective user security credential; and if the determination of whether to grant the respective logon lease renewal is to grant the respective logon lease renewal, providing the respective user account with security session information indicative of a renewed logon lease.

13. The computer implemented method of claim 12 wherein the respective logon lease renewal includes respective logon credentials, and wherein determining whether to grant the respective logon lease renewal based at least on the retrieved respective user security credential includes comparing the respective logon credentials with valid login credential information associated with the respective user account.

* * * * *